United States Patent
Tseng et al.

(10) Patent No.: US 11,555,986 B2
(45) Date of Patent: Jan. 17, 2023

(54) IMAGING OPTICAL LENS ASSEMBLY, IMAGE CAPTURING UNIT AND ELECTRONIC DEVICE

(71) Applicant: LARGAN PRECISION CO., LTD., Taichung (TW)

(72) Inventors: Yu-Tai Tseng, Taichung (TW); Yu-Chun Ke, Taichung (TW); Kuo-Jui Wang, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 36 days.

(21) Appl. No.: 17/103,699

(22) Filed: Nov. 24, 2020

(65) Prior Publication Data

US 2021/0080695 A1    Mar. 18, 2021

Related U.S. Application Data

(63) Continuation of application No. 16/112,666, filed on Aug. 25, 2018, now Pat. No. 10,908,391.

(30) Foreign Application Priority Data

Jul. 12, 2018  (TW) .................................. 107124063

(51) Int. Cl.
 *G02B 13/00* (2006.01)
 *G02B 9/34* (2006.01)

(52) U.S. Cl.
 CPC ............. *G02B 13/004* (2013.01); *G02B 9/34* (2013.01)

(58) Field of Classification Search
 CPC .. G02B 13/0045; G02B 1/041; G02B 13/004; G02B 9/62
 See application file for complete search history.

(56) References Cited

U.S. PATENT DOCUMENTS

| | | | |
|---|---|---|---|
| 9,329,361 B1 * | 5/2016 | Liu ...................... | G02B 13/004 |
| 10,209,495 B2 * | 2/2019 | Tsai ..................... | G02B 13/008 |
| 2011/0122510 A1 | 5/2011 | Uchida | |
| 2013/0258490 A1 | 10/2013 | Ishihara | |
| 2015/0077622 A1 | 3/2015 | Ueno et al. | |
| 2015/0130992 A1 | 5/2015 | Hsu | |
| 2017/0235099 A1 | 8/2017 | Tsai | |
| 2018/0095243 A1 | 4/2018 | Wu | |
| 2019/0049696 A1 | 2/2019 | Bone | |

FOREIGN PATENT DOCUMENTS

| | | | |
|---|---|---|---|
| CN | 106970453 A | | 7/2017 |
| CN | 207764463 U | * | 8/2018 |
| JP | H09-061710 H | | 3/1997 |
| WO | 2019169856 A | | 9/2019 |

OTHER PUBLICATIONS

IN Office Action in Application No. 201834034846 dated Mar. 1, 2021.

* cited by examiner

*Primary Examiner* — Alicia M Harrington
(74) *Attorney, Agent, or Firm* — Maschoff Brennan

(57) ABSTRACT

An imaging optical lens assembly includes four lens elements which are, in order from an object side to an image side: a first lens element, a second lens element, a third lens element and a fourth lens element. Each of the four lens elements has an object-side surface facing toward the object side and an image-side surface facing toward the image side. At least one of all lens surfaces of the four lens elements is aspheric and has at least one inflection point.

20 Claims, 32 Drawing Sheets

IMAGING OPTICAL LENS ASSEMBLY, IMAGE CAPTURING UNIT AND ELECTRONIC DEVICE

RELATED APPLICATIONS

This application is a continuation patent application of U.S. application Ser. No. 16/112,666, filed on Aug. 25, 2018, which claims priority to Taiwan Application 107124063, filed on Jul. 12, 2018, which is incorporated by reference herein in its entirety.

BACKGROUND

Technical Field

The present disclosure relates to an imaging optical lens assembly, an image capturing unit and an electronic device, more particularly to an imaging optical lens assembly and an image capturing unit applicable to an electronic device.

Description of Related Art

With the development of semiconductor manufacturing technology, the performance of image sensors has been improved, and the pixel size thereof has been scaled down. Therefore, featuring high image quality is one of the indispensable features of an optical system nowadays.

Furthermore, due to the rapid changes in technology, electronic devices equipped with optical systems are developed towards multi-functionality for various applications, and therefore the functionality requirements for the optical systems have been increasing. However, it is difficult for a conventional optical system to obtain a balance among the requirements such as high image quality, low sensitivity, a desirable size of the aperture, miniaturization or required field of view. Accordingly, the present disclosure provides an optical system satisfying the aforementioned requirements.

SUMMARY

According to one aspect of the present disclosure, an imaging optical lens assembly includes four lens elements. The four lens elements are, in order from an object side to an image side, a first lens element, a second lens element, a third lens element and a fourth lens element. Each of the four lens elements has an object-side surface facing toward the object side and an image-side surface facing toward the image side. The object-side surface of the fourth lens element is convex in a paraxial region thereof. At least one of all lens surfaces of the four lens elements is aspheric and has at least one inflection point. Each of at least three of the four lens elements has an Abbe number smaller than 38.0. When an f-number of the imaging optical lens assembly is Fno, a central thickness of the third lens element is CT3, a central thickness of the fourth lens element is CT4, and a chief ray angle at a maximum image height of the imaging optical lens assembly is CRA, the following conditions are satisfied:

$0.70 < Fno < 1.70;$ $0 < CT4/CT3 \leq 0.83;$ and $15.0[deg.] < CRA < 50.0[deg.].$ According to another aspect of the present disclosure, an imaging optical lens assembly includes four lens elements. The four lens elements are, in order from an object side to an image side, a first lens element, a second lens element, a third lens element and a fourth lens element. Each of the four lens elements has an object-side surface facing toward the object side and an image-side surface facing toward the image side. The image-side surface of the fourth lens element is concave in a paraxial region thereof. At least one of all lens surfaces of the four lens elements is aspheric and has at least one inflection point. Either an absolute value of a curvature radius of the object-side surface of the fourth lens element or an absolute value of a curvature radius of the image-side surface of the fourth lens element is smallest among absolute values of curvature radii of all lens surfaces of the four lens elements. When a maximum value among all Abbe numbers of the four lens elements of the imaging optical lens assembly is Vmax, and an f-number of the imaging optical lens assembly is Fno, the following conditions are satisfied:

$10.0 < Vmax < 38.0;$ and $0.70 < Fno < 1.70.$

According to still another aspect of the present disclosure, an imaging optical lens assembly includes four lens elements. The four lens elements are, in order from an object side to an image side, a first lens element, a second lens element, a third lens element and a fourth lens element. Each of the four lens elements has an object-side surface facing toward the object side and an image-side surface facing toward the image side. The image-side surface of the fourth lens element is concave in a paraxial region thereof. At least one of all lens surfaces of the four lens elements is aspheric and has at least one inflection point. When a maximum value among all Abbe numbers of the four lens elements of the imaging optical lens assembly is Vmax, a curvature radius of the object-side surface of the second lens element is R3, a curvature radius of the image-side surface of the second lens element is R4, a focal length of the imaging optical lens assembly is f, a focal length of the second lens element is f2, and a focal length of the fourth lens element is f4, the following conditions are satisfied:

$10.0 < Vmax < 38.0;$ $R3/R4 < 3.0;$ $-2.0 < f/f2 \leq 0.77;$ and $-0.45 < f/f4 < 1.5.$ According to yet another aspect of the present disclosure, an image capturing unit includes one of the aforementioned imaging optical lens assemblies and an image sensor, wherein the image sensor is disposed on an image surface of the imaging optical lens assembly.

According to yet still another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An imaging optical lens assembly includes four lens elements. The four lens elements are, in order from an object side to an image side, a first lens element, a second lens element, a third lens element and a fourth lens element.

There can be an air gap in a paraxial region between every adjacent lens element of the imaging optical lens assembly; that is, each of the first through the fourth lens elements can be a single and non-cemented lens element. The manufacturing process of cemented lenses is more complex than the non-cemented lenses, particularly when an image-side surface of one lens element and an object-side surface of the following lens element need to have accurate curvatures to ensure both lenses being highly cemented. In addition, during the cementing process, those two lens elements might not be highly cemented due to misalignment and it is thereby not favorable for the image quality. Therefore, having an air gap in a paraxial region between every adjacent lens element of the imaging optical lens assembly in the present disclosure is favorable for preventing the problem associated with the cemented lens elements and increasing the flexibility in shape design of the lens elements so as to reduce the size of the imaging optical lens assembly and correct aberrations.

The first lens element can have an object-side surface being convex in a paraxial region thereof; therefore, it is favorable for strengthening the light converging capability so as to reduce the total track length of the imaging optical lens assembly. The first lens element can have an image-side surface being concave in a paraxial region thereof; therefore, it is favorable for correcting astigmatism.

The third lens element can have positive refractive power; therefore, it is favorable for reducing the size of the imaging optical lens assembly. The third lens element can have an image-side surface being convex in a paraxial region thereof; therefore, it is favorable for adjusting the incident angle of light on the fourth lens element so as to enlarge an image surface.

Figure 31:
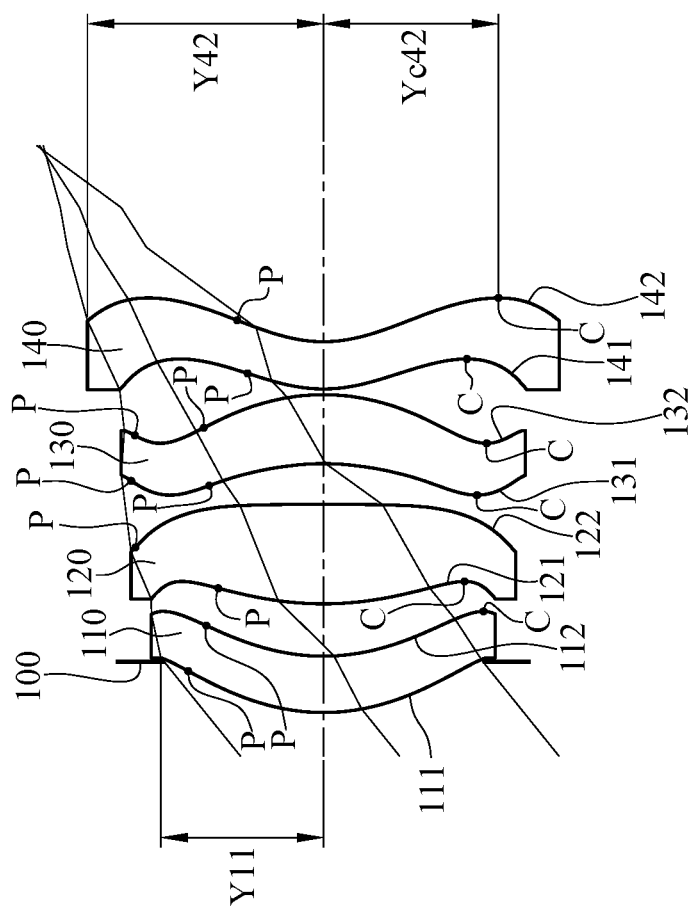
FIG. 31 shows a schematic view of Y11, Y42, Yc42 and critical points and inflection points of each lens element according to the 1st embodiment of the present disclosure.

The fourth lens element can have an object-side surface being convex in a paraxial region thereof; therefore, it is favorable for the fourth lens element to correct field curvature. The fourth lens element can have an image-side surface being concave in a paraxial region thereof; therefore, it is favorable for reducing the back focal length so as to reduce the total track length of the imaging optical lens assembly. The object-side surface of the fourth lens element can have at least one critical point in an off-axis region thereof; therefore, it is favorable for adjusting the incident angle of light on the fourth lens element so as to reduce surface reflection and thereby increasing illuminance on the peripheral region of the image surface and preventing stray light. The image-side surface of the fourth lens element can have at least one critical point in an off-axis region thereof; therefore, it is favorable for correcting off-axis field curvature and adjusting peripheral light rays so as to increase illuminance on the peripheral region of the image surface. Please refer to FIG. 31, which shows a schematic view of critical points C of the fourth lens element according to the 1st embodiment of the present disclosure.

According to the present disclosure, at least one lens surface among object-side surfaces and image-side surfaces of the first lens element, the second lens element, the third lens element and the fourth lens element is aspheric and has at least one inflection point. Therefore, it is favorable for increasing the shape variation of the lens elements so as to correct aberrations and thereby improve image quality, and it's also favorable for reducing the size of the imaging optical lens assembly. Preferably, each of at least two lens surfaces among all the lens surfaces of the four lens elements can be aspheric and can have at least one inflection point. More preferably, each of at least three lens surfaces among all the lens surfaces of the four lens elements can be aspheric and can have at least one inflection point. Please refer to FIG. 31, which shows a schematic view of inflection points P of the four lens elements according to the 1st embodiment of the present disclosure.

According to the present disclosure, each of at least three of the four lens elements of the imaging optical lens assembly can have an Abbe number smaller than 38.0. Therefore, since a lens material having a low Abbe number generally features a stronger refractive capability, the lens elements made of a low Abbe number material is favorable for correcting aberrations and enlarging aperture stop; in addition, when the imaging optical lens assembly is operated within a wavelength range of infrared light, the requirement of chromatic aberration correction is relatively low, so the lens elements made of a low Abbe number material can be used to correct other kind of aberrations. Preferably, each of the four lens elements of the imaging optical lens assembly can have an Abbe number smaller than 38.0. According to the present disclosure, the Abbe number of one lens element is obtained from the following equation: $V=(Nd-1)/(NF-NC)$, wherein V is the Abbe number of said lens element, Nd is the refractive index of said lens element at the wavelength of helium d-line (587.6 nm), NF is the refractive index of said lens element at the wavelength of hydrogen F-line (486.1 nm), and NC is the refractive index of said lens element at the wavelength of hydrogen C-line (656.3 nm).

According to the present disclosure, either an absolute value of a curvature radius of the object-side surface of the fourth lens element or an absolute value of a curvature radius of the image-side surface of the fourth lens element can be the smallest among all absolute values of curvature radii of the lens surfaces of the four lens elements (the object-side surface of the first lens element through the image-side surface of the fourth lens element). Therefore, it is favorable for adjusting the shape of each lens element so as to minimize the imaging optical lens assembly and obtain a suitable back focal length; also, it is favorable for reducing the sensitivity of the imaging optical lens assembly so as to improve the manufacturing yield rate.

According to the present disclosure, each of at least three of the first lens element, the second lens element, the third lens element and the fourth lens element can be meniscus in a paraxial region thereof. Therefore, it is favorable for correcting aberrations and keeping the imaging optical lens assembly compact, and it's also favorable for the imaging optical lens assembly featuring a large aperture stop. A lens element which is meniscus in a paraxial region thereof indicates that an object-side surface and an image-side surface of the lens element are respectively convex and concave in a paraxial region thereof, or are respectively concave and convex in a paraxial region thereof.

According to the present disclosure, each of at least three of the first lens element, the second lens element, the third lens element and the fourth lens element can have at least one critical point in an off-axis region thereof. Therefore, it is favorable for increasing the shape variation of the lens elements so as to improve peripheral image quality and reduce the size of the imaging optical lens assembly; in addition, when the imaging optical lens assembly is operated within a wavelength range of infrared light, the lens elements are weaker at refracting light rays, so the aforementioned condition is favorable for further improving image quality. Preferably, each of the four lens elements of the imaging optical lens assembly can have at least one critical point in an off-axis region thereof. Please refer to FIG. 31, which shows a schematic view of critical points C of each lens element according to the 1st embodiment of the present disclosure.

When a maximum value among all Abbe numbers of the four lens elements of the imaging optical lens assembly is Vmax, the following condition can be satisfied: $Vmax<38.0$. Therefore, since a lens material having a low Abbe number generally features a stronger refractive capability, the lens elements made of a low Abbe number material is favorable for correcting aberrations and enlarging aperture stop; in addition, when the imaging optical lens assembly is operated within a wavelength range of infrared light, the requirement of chromatic aberration correction is relatively low, so the lens elements made of a low Abbe number material can be used to correct other kind of aberrations. Preferably, the following condition can be satisfied: $10.0<Vmax<38.0$. More preferably, the following condition can also be satisfied: $14.0<Vmax<32.0$.

When an f-number of the imaging optical lens assembly is Fno, the following condition can be satisfied: $0.50<Fno<2.20$. Therefore, it is favorable for providing the imaging optical lens assembly with sufficient size of aperture stop for wider applications; furthermore, the imaging optical lens assembly operated within a wavelength range of infrared light can have better imaging capability. Preferably, the following condition can also be satisfied: $0.70<Fno<1.70$.

When a central thickness of the third lens element is CT3, and a central thickness of the fourth lens element is CT4, the following condition can be satisfied: $0<CT4/CT3<1.60$. Therefore, it is favorable for the third lens element and the fourth lens element to work with each other so as to reduce the size on the image side of the imaging optical lens assembly. Preferably, the following condition can also be satisfied: $0<CT4/CT3\leq0.83$.

Figure 32:
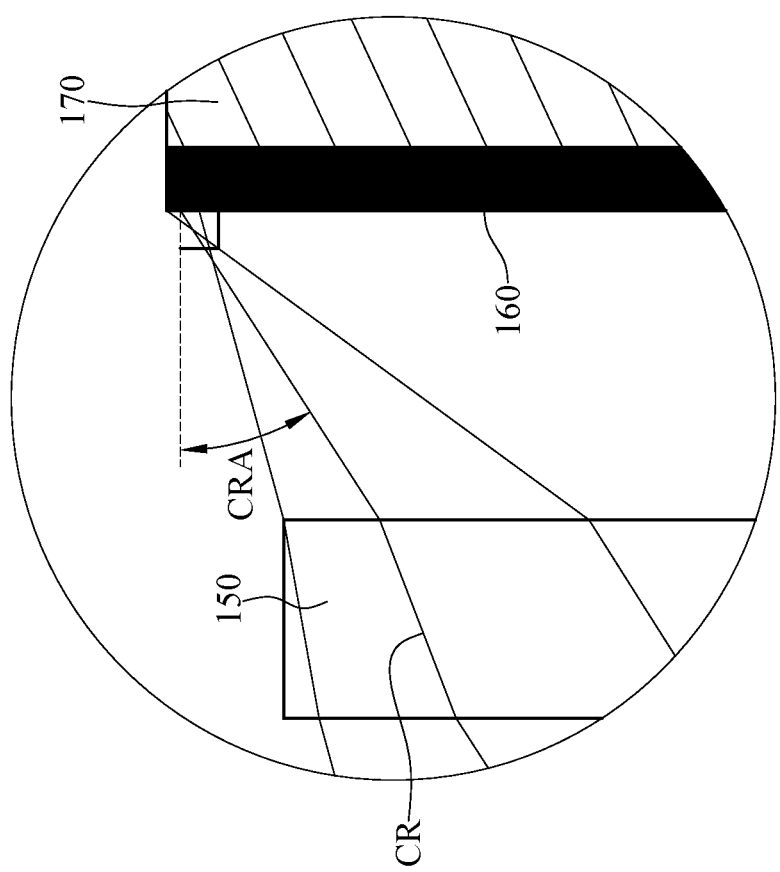
FIG. 32 shows a schematic view of CRA according to the 1st embodiment of the present disclosure.

When a chief ray angle at a maximum image height of the imaging optical lens assembly is CRA, the following condition can be satisfied: $15.0 [deg.]<CRA<50.0 [deg.]$. Therefore, it is favorable for improving the response efficiency of an image sensor and adjusting the field of view and size of the imaging optical lens assembly. Please refer to FIG. 32, which shows a schematic view of CRA according to the 1st embodiment of the present disclosure, wherein a chief ray CR is projected on the image surface 160 at the maximum image height, and the angle between a normal line of the image surface 160 and the chief ray CR is CRA.

When a curvature radius of an object-side surface of the second lens element is R3, and a curvature radius of an image-side surface of the second lens element is R4, the following condition can be satisfied: $R3/R4<3.0$. Therefore, it is favorable for adjusting the shape of the second lens element so as to reduce sensitivity, thereby improving manufacturing yield rate. Preferably, the following condition can be satisfied: −3.9<R3/R4<3.0. More preferably, the following condition can also be satisfied: −1.1<R3/R4<1.3.

When a focal length of the imaging optical lens assembly is f, and a focal length of the second lens element is f2, the following condition can be satisfied: −2.0<f/f2≤0.77. Therefore, it is favorable for preventing overly strong refractive power of the second lens element so as to reduce aberrations such as spherical aberration.

When the focal length of the imaging optical lens assembly is f, and a focal length of the fourth lens element is f4, the following condition can be satisfied: −0.83<f/f4<2.0. Therefore, it is favorable for preventing overly strong refractive power of the fourth lens element so as to obtain a suitable back focal length and reduce incident angle of light rays on the image surface. Preferably, the following condition can also be satisfied: −0.45<f/f4<1.5.

When an axial distance between the second lens element and the third lens element is T23, and the central thickness of the third lens element is CT3, the following condition can be satisfied: 0<T23/CT3≤0.82. Therefore, it is favorable for the third lens element to correct aberrations on the object side of the imaging optical lens assembly.

When the focal length of the imaging optical lens assembly is f, a focal length of the first lens element is f1, and the focal length of the second lens element is f2, the following condition can be satisfied: −3.00<f/f1+f/f2≤1.00. Therefore, it is favorable for the first lens element and second lens element to work with each other so as to correct aberrations. Preferably, the following condition can also be satisfied: −1.80<f/f1+f/f2<0.90.

When the focal length of the second lens element is f2, and the focal length of the fourth lens element is f4, the following condition can be satisfied: −2.00<f2/f4<10.0. Therefore, it is favorable for obtaining a balance between proper field of view and compactness of the imaging optical lens assembly. Preferably, the following condition can also be satisfied: −1.50<f2/f4<4.00.

When an Abbe number of the first lens element is V1, an Abbe number of the second lens element is V2, an Abbe number of the third lens element is V3, and an Abbe number of the fourth lens element is V4, the following condition can be satisfied: 40.0<V1+V2+V3+V4<120.0. Therefore, proper material selection of the lens elements is favorable for improving image quality. Preferably, the following condition can also be satisfied: 50.0<V1+V2+V3+V4<110.0.

When a maximum effective radius of the object-side surface of the first lens element is Y11, and a maximum effective radius of the image-side surface of the fourth lens element is Y42, the following condition can be satisfied: 1.0<Y42/Y11<2.4. Therefore, adjusting the ratio of outer diameters of the object side and the image side of the imaging optical lens assembly is favorable for obtaining a balance between proper field of view and compactness of the imaging optical lens assembly. Please refer to FIG. 31, which shows a schematic view of Y11 and Y42 according to the 1st embodiment of the present disclosure.

When a vertical distance between a critical point on the image-side surface of the fourth lens element and an optical axis is Yc42, and the maximum effective radius of the image-side surface of the fourth lens element is Y42, the following condition can be satisfied: 0.10<Yc42/Y42<0.90. Therefore, it is favorable for adjusting the shape of the fourth lens element so as to correct field curvature, and thus improve peripheral image quality. Please refer to FIG. 31, which shows a schematic view of Yc42 and Y42 according to the 1st embodiment of the present disclosure.

When an axial distance between the object-side surface of the first lens element and the image surface is TL, the following condition can be satisfied: 0.50 [mm]<TL<8.0 [mm]. Therefore, it is favorable for the imaging optical lens assembly to have a suitable total track length so as to be applicable to various applications such as portable devices.

When the axial distance between the object-side surface of the first lens element and the image surface is TL, and the maximum image height of the imaging optical lens assembly (half of a diagonal length of an effective photosensitive area of an image sensor) is ImgH, the following condition can be satisfied: 1.0<TL/ImgH<3.0. Therefore, it is favorable for obtaining a balance between short total track length and large image surface.

When the Abbe number of the first lens element is V1, the Abbe number of the second lens element is V2, the Abbe number of the third lens element is V3, the Abbe number of the fourth lens element is V4, an Abbe number of the i-th lens element is Vi, and an Abbe number of the j-th lens element is Vj, the following condition can be satisfied: 0.55<Vi/Vj<1.80, wherein i=1, 2, 3 or 4; j=1, 2, 3 or 4; and i≠j. Therefore, a proper selection of materials of the lens elements is favorable for correcting aberrations. Preferably, the following condition can also be satisfied: 0.60<Vi/Vj<1.67.

According to the present disclosure, at least three of the first lens element, the second lens element, the third lens element and the fourth lens element can be made of plastic material. Therefore, it is favorable for reducing the weight of the imaging optical lens assembly, and increasing the flexibility in shape design of the lens elements, such that the size of the imaging optical lens assembly can be reduced. Preferably, all the four lens elements of the imaging optical lens assembly can be made of plastic material.

When half of a maximum field of view of the imaging optical lens assembly is HFOV, the following condition can be satisfied: 20 [deg.]<HFOV<60 [deg.]. Therefore, the field of the view is configured in a range suited to applications of the imaging optical lens assembly.

When the focal length of the imaging optical lens assembly is f, and a focal length of the third lens element is f3, the following condition can be satisfied: −1.0<f/f3<2.0. Therefore, it is favorable for the third lens element to have proper refractive power so as to the total track length of the imaging optical lens assembly.

When the focal length of the imaging optical lens assembly is f, the focal length of the third lens element is f3, and the focal length of the fourth lens element is f4, the following condition can be satisfied: 0<f/f3+f/f4<4.0. Therefore, it is favorable for adjusting the refractive power on the image side of the imaging optical lens assembly so as to reduce the total track length and prevent overly large incident angle of light rays on the image surface. Preferably, the following condition can also be satisfied: 0.35≤f/f3+f/f4<3.0.

When the curvature radius of the object-side surface of the second lens element is R3, and the focal length of the imaging optical lens assembly is f, the following condition can be satisfied: −1.14<R3/f<36.0. Therefore, it is favorable for adjusting the shape of the second lens element so as to correct aberrations generated by the first lens element.

When the focal length of the imaging optical lens assembly is f, and a composite focal length of the second lens element and the third lens element is f23, the following condition can be satisfied: 0.78≤f23/f<6.2. Therefore, it is favorable for the second lens element and third lens element to work with each other so as to adjust the incident direction of light rays onto the fourth lens element, and thus reduce the size of the imaging optical lens assembly and increase the image surface area.

When a central thickness of the second lens element is CT2, and the central thickness of the fourth lens element is CT4, the following condition can be satisfied: 0.90<CT2/CT4<3.0. Therefore, adjusting the central thickness of the lens elements is favorable for balancing the distribution of the lens elements of the imaging optical lens assembly so as to correct aberrations and reduce the total track length.

When a curvature radius of the image-side surface of the third lens element is R6, and the curvature radius of the object-side surface of the fourth lens element is R7, the following condition can be satisfied: R6/R7<−0.70. Therefore, it is favorable for balancing the lens surface shape on the third lens element and the fourth lens element so as to correct off-axis aberrations.

When the curvature radius of the object-side surface of the fourth lens element is R7, and the curvature radius of the image-side surface of the fourth lens element is R8, the following condition can be satisfied: 0<R7/R8<1.41. Therefore, it is favorable for adjusting the shape of the fourth lens element so as to correct off-axis aberrations.

When a curvature radius of the object-side surface of the first lens element is R1, and a curvature radius of the image-side surface of the first lens element is R2, the following condition can be satisfied: 0<R2/R1<2.65. Therefore, it is favorable for adjusting the shape of the first lens element so as to correct astigmatism.

When the focal length of the imaging optical lens assembly is f, and the curvature radius of the image-side surface of the third lens element is R6, the following condition can be satisfied: −2.08≤f/R6<0. Therefore, it is favorable for preventing overly curved image-side surface of the third lens element so as to reduce manufacturing problems.

When the axial distance between the object-side surface of the first lens element and the image surface is TL, and an entrance pupil diameter of the imaging optical lens assembly is EPD, the following condition can be satisfied: 1.0<TL/EPD<3.0. Therefore, it is favorable for obtaining a balance between total track length and size of aperture stop, and it's also favorable for the imaging optical lens assembly featuring a large aperture stop. Preferably, the following condition can be satisfied: 1.0<TL/EPD<2.0.

When the focal length of the imaging optical lens assembly is f, and the focal length of the first lens element is f1, the following condition can be satisfied: −1.0<f/f1<2.0. Therefore, it is favorable for strengthening the light converging capability of the imaging optical lens assembly.

According to the present disclosure, the imaging optical lens assembly can be operated within infrared light having a wavelength range of 750 nanometers (nm) to 1600 nm. Therefore, it is favorable for reducing the disturbance of visible light when operated within infrared light so as to be used to applications such as motion capturing and 3D (three-dimensional) image capturing applications; furthermore, it's also favorable for the imaging optical lens assembly to be applied in low-light conditions, such as photographing at night.

When a maximum value among maximum effective radii of all lens surfaces of the four lens elements of the imaging optical lens assembly is Ymax, and a minimum value among maximum effective radii of all lens surfaces of the four lens elements of the imaging optical lens assembly is Ymin, the following condition can be satisfied: 1.0<Ymax/Ymin<2.5. Therefore, adjusting the outer diameter of the imaging optical lens assembly is favorable for balancing between the field of view and the size of the imaging optical lens assembly and being configured with a large aperture stop.

According to the present disclosure, when the parameters (e.g., refractive index and focal length) of the imaging optical lens assembly, the image capturing unit and the electronic device are not specifically defined, these parameters may be determined according to the operating wavelength range; that is, when the operating wavelength range is a wavelength range of visible light (e.g., 350 nm to 750 nm), these parameters are defined at the wavelength of helium d-line (587.6 nm); when the operating wavelength range is a wavelength range of infrared light (e.g., 750 nm to 1600 nm), these parameters are defined at the wavelength of 940 nm.

According to the present disclosure, the aforementioned features and conditions can be utilized in numerous combinations so as to achieve corresponding effects.

According to the present disclosure, the lens elements of the imaging optical lens assembly can be made of either glass or plastic material. When the lens elements are made of glass material, the refractive power distribution of the imaging optical lens assembly may be more flexible. The glass lens element can either be made by grinding or molding. When the lens elements are made of plastic material, the manufacturing cost can be effectively reduced. Furthermore, surfaces of each lens element can be arranged to be aspheric, which allows more control variables for eliminating aberrations thereof, the required number of the lens elements can be reduced, and the total track length of the imaging optical lens assembly can be effectively shortened. The aspheric surfaces may be formed by plastic injection molding or glass molding.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, an image surface of the imaging optical lens assembly, based on the corresponding image sensor, can be flat or curved, especially a curved surface being concave facing towards the object side of the imaging optical lens assembly.

According to the present disclosure, an image correction unit, such as a field flattener, can be optionally disposed between the lens element closest to the image side of the imaging optical lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the imaging optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging optical lens assembly and thereby provides a wider field of view for the same.

According to the present disclosure, the imaging optical lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
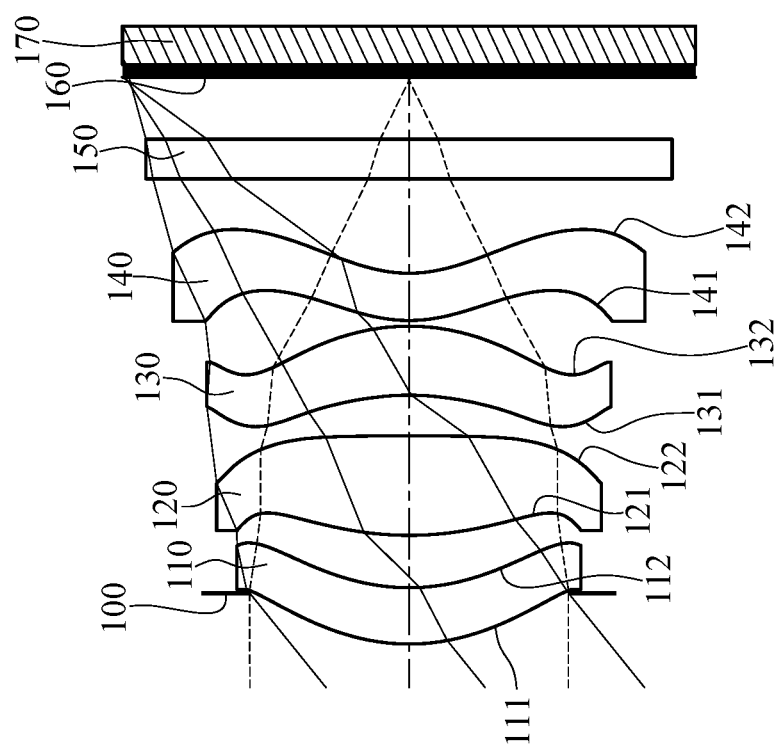
FIG. 1 is a schematic view of an image capturing unit according to the 1st embodiment of the present disclosure.
Figure 2:
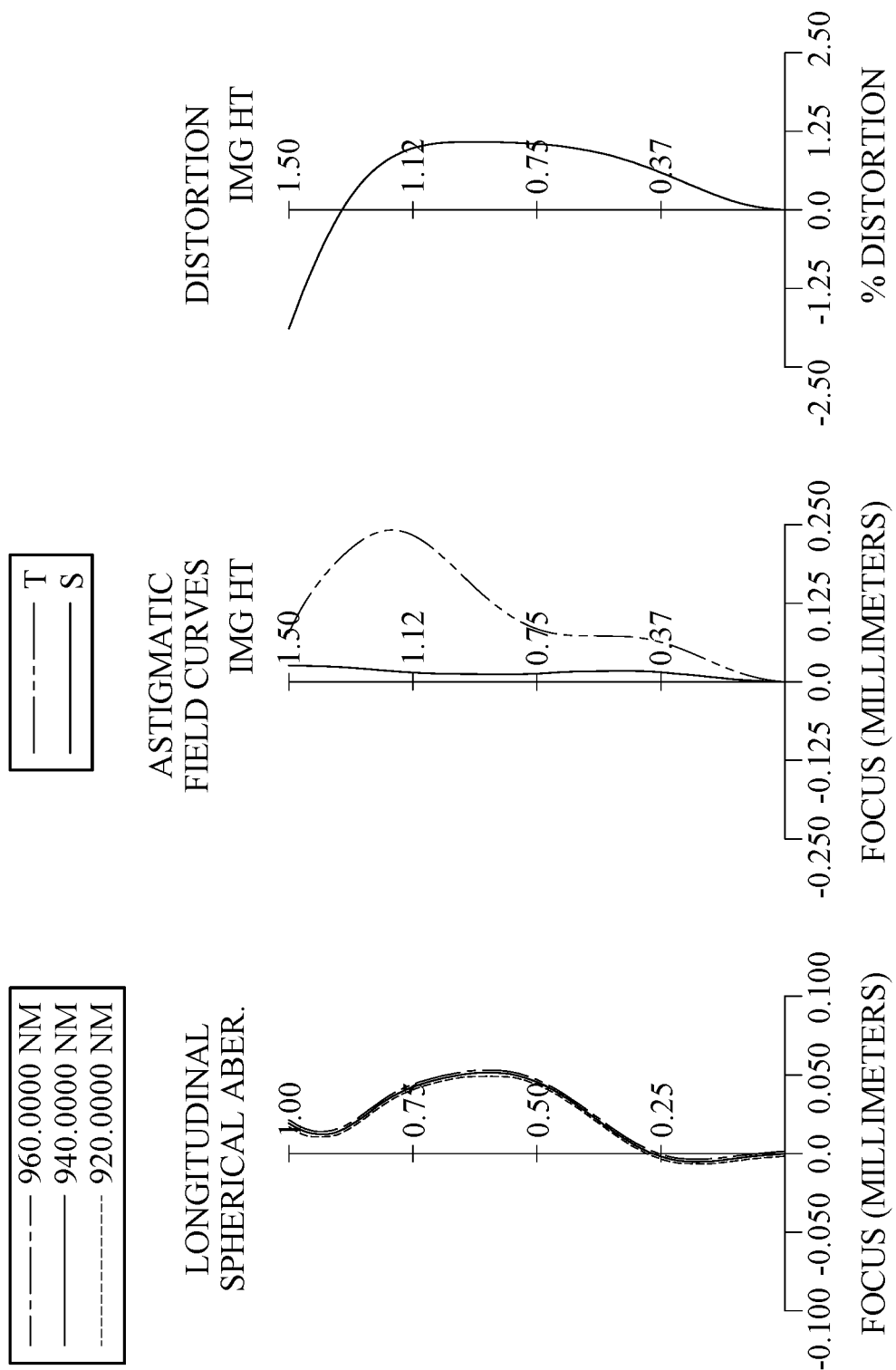
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging optical lens assembly (its reference numeral is omitted) of the present disclosure and an image sensor 170. The imaging optical lens assembly includes, in order from an object side to an image side, an aperture stop 100, a first lens element 110, a second lens element 120, a third lens element 130, a fourth lens element 140, a filter 150 and an image surface 160. The imaging optical lens assembly includes four single and non-cemented lens elements (110, 120, 130 and 140) with no additional lens element disposed between each of the adjacent four lens elements, wherein there is an air gap between every adjacent lens element.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has one inflection point. The image-side surface 112 of the first lens element 110 has one inflection point. The image-side surface 112 of the first lens element 110 has one critical point in an off-axis region thereof.

The second lens element 120 with positive refractive power has an object-side surface 121 being convex in a paraxial region thereof and an image-side surface 122 being convex in a paraxial region thereof. The second lens element 120 is made of plastic material and has the object-side surface 121 and the image-side surface 122 being both aspheric. The object-side surface 121 of the second lens element 120 has one inflection point. The image-side surface 122 of the second lens element 120 has one inflection point. The object-side surface 121 of the second lens element 120 has one critical point in an off-axis region thereof.

The third lens element 130 with positive refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric. The object-side surface 131 of the third lens element 130 has two inflection points. The image-side surface 132 of the third lens element 130 has two inflection points. The object-side surface 131 of the third lens element 130 has one critical point in an off-axis region thereof. The image-side surface 132 of the third lens element 130 has one critical point in an off-axis region thereof.

The fourth lens element 140 with positive refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has one inflection point. The image-side surface 142 of the fourth lens element 140 has one inflection point. The object-side surface 141 of the fourth lens element 140 has one critical point in an off-axis region thereof. The image-side surface 142 of the fourth lens element 140 has one critical point in an off-axis region thereof.

The filter 150 is made of glass material and located between the fourth lens element 140 and the image surface 160, and will not affect the focal length of the imaging optical lens assembly. The image sensor 170 is disposed on or near the image surface 160 of the imaging optical lens assembly.

In this embodiment, each of the first lens element 110, the second lens element 120, the third lens element 130 and the fourth lens element 140 has an Abbe number smaller than 38.0.

The equation of the aspheric surface profiles of the aforementioned lens elements of the 1st embodiment is expressed as follows:

$$X(Y) = (Y^2/R)/(1 + \mathrm{sqrt}(1 - (1+k)\times(Y/R)^2)) + \sum_i (Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the imaging optical lens assembly of the image capturing unit according to the 1st embodiment, when a focal length of the imaging optical lens assembly is f, an f-number of the imaging optical lens assembly is Fno, and half of a maximum field of view of the imaging optical lens assembly is HFOV, these parameters have the following values: f=1.86 millimeters (mm), Fno=1.11, HFOV=38.8 degrees (deg.).

When an Abbe number of the first lens element 110 is V1, the following condition is satisfied: V1=23.5.

When an Abbe number of the second lens element 120 is V2, the following condition is satisfied: V2=23.5.

When an Abbe number of the third lens element 130 is V3, the following condition is satisfied: V3=23.5.

When an Abbe number of the fourth lens element 140 is V4, the following condition is satisfied: V4=23.5.

When a maximum value among all Abbe numbers of the four lens elements of the imaging optical lens assembly is Vmax, the following condition is satisfied: Vmax=23.5.

When the Abbe number of the first lens element 110 is V1, the Abbe number of the second lens element 120 is V2, the Abbe number of the third lens element 130 is V3, and the Abbe number of the fourth lens element 140 is V4, the following condition is satisfied: V1+V2+V3+V4=94.0.

When the Abbe number of the first lens element 110 is V1, the Abbe number of the second lens element 120 is V2, the Abbe number of the third lens element 130 is V3, and the Abbe number of the fourth lens element 140 is V4, the following conditions are satisfied: V1/V2=1.00; V1/V3=1.00; V1/V4=1.00; V2/V1=1.00; V2/V3=1.00; V2/V4=1.00; V3/V1=1.00; V3/V2=1.00; V3/V4=1.00; V4/V1=1.00; V4/V2=1.00; and V4/V3=1.00.

When a central thickness of the second lens element 120 is CT2, and a central thickness of the fourth lens element 140 is CT4, the following condition is satisfied: CT2/CT4=2.11.

When a central thickness of the third lens element 130 is CT3, and the central thickness of the fourth lens element 140 is CT4, the following condition is satisfied: CT4/CT3=0.68.

When an axial distance between the second lens element 120 and the third lens element 130 is T23, and the central thickness of the third lens element 130 is CT3, the following condition is satisfied: T23/CT3=0.59. In this embodiment, an axial distance between two adjacent lens elements is an air gap in a paraxial region between the two adjacent lens elements.

When an axial distance between the object-side surface 111 of the first lens element 110 and the image surface 160 is TL, the following condition is satisfied: TL=3.00 [mm].

When the axial distance between the object-side surface 111 of the first lens element 110 and the image surface 160 is TL, and an entrance pupil diameter of the imaging optical lens assembly is EPD, the following condition is satisfied: TL/EPD=1.78.

When the axial distance between the object-side surface 111 of the first lens element 110 and the image surface 160 is TL, and a maximum image height of the imaging optical lens assembly is ImgH, the following condition is satisfied: TL/ImgH=2.00.

When a curvature radius of the object-side surface 111 of the first lens element 110 is R1, and a curvature radius of the image-side surface 112 of the first lens element 110 is R2, the following condition is satisfied: R2/R1=0.97.

When a curvature radius of the object-side surface 121 of the second lens element 120 is R3, and the focal length of the imaging optical lens assembly is f, the following condition is satisfied: R3/f=0.89.

When the curvature radius of the object-side surface 121 of the second lens element 120 is R3, and a curvature radius of the image-side surface 122 of the second lens element 120 is R4, the following condition is satisfied: R3/R4=−0.10.

When a curvature radius of the image-side surface 132 of the third lens element 130 is R6, and a curvature radius of the object-side surface 141 of the fourth lens element 140 is R7, the following condition is satisfied: R6/R7=−1.42.

When the curvature radius of the object-side surface 141 of the fourth lens element 140 is R7, and a curvature radius of the image-side surface 142 of the fourth lens element 140 is R8, the following condition is satisfied: R7/R8=1.09.

When the focal length of the imaging optical lens assembly is f, and a focal length of the first lens element 110 is f1, the following condition is satisfied: f/f1=0.08.

When the focal length of the imaging optical lens assembly is f, and a focal length of the second lens element 120 is f2, the following condition is satisfied: f/f2=0.75.

When the focal length of the imaging optical lens assembly is f, and a focal length of the third lens element 130 is f3, the following condition is satisfied: f/f3=0.28.

When the focal length of the imaging optical lens assembly is f, and a focal length of the fourth lens element 140 is f4, the following condition is satisfied: f/f4=0.07.

When the focal length of the imaging optical lens assembly is f, the focal length of the first lens element 110 is f1, and the focal length of the second lens element 120 is f2, the following condition is satisfied: f/f1+f/f2=0.84.

When the focal length of the imaging optical lens assembly is f, the focal length of the third lens element 130 is f3, and the focal length of the fourth lens element 140 is f4, the following condition is satisfied: f/f3+f/f4=0.35.

When the focal length of the imaging optical lens assembly is f, and the curvature radius of the image-side surface 132 of the third lens element 130 is R6, the following condition is satisfied: f/R6=−1.68.

When the focal length of the second lens element 120 is f2, and the focal length of the fourth lens element 140 is f4, the following condition is satisfied: f2/f4=0.09.

When the focal length of the imaging optical lens assembly is f, and a composite focal length of the second lens element 120 and the third lens element 130 is f23, the following condition is satisfied: f23/f=1.13.

When a chief ray angle at the maximum image height of the imaging optical lens assembly is CRA, the following condition is satisfied: CRA=32.8 [deg.].

When a maximum effective radius of the object-side surface 111 of the first lens element 110 is Y11, and a maximum effective radius of the image-side surface 142 of the fourth lens element 140 is Y42, the following condition is satisfied: Y42/Y11=1.45.

When a vertical distance between the critical point on the image-side surface 142 of the fourth lens element 140 and the optical axis is Yc42, and the maximum effective radius of the image-side surface 142 of the fourth lens element 140 is Y42, the following condition is satisfied: Yc42/Y42=0.74.

When a maximum value among maximum effective radii of all lens surfaces of the four lens elements of the imaging optical lens assembly is Ymax, and a minimum value among maximum effective radii of all lens surfaces of the four lens elements of the imaging optical lens assembly is Ymin, the following condition is satisfied: Ymax/Ymin=1.45.

The detailed optical data of the 1st embodiment are shown in Table 1 and the aspheric surface data are shown in Table 2 below.

In Table 1, the curvature radius, the thickness and the focal length are shown in millimeters (mm). Surface numbers 0-12 represent the surfaces sequentially arranged from the object side to the image side along the optical axis. In Table 2, k represents the conic coefficient of the equation of the aspheric surface profiles. A4-16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
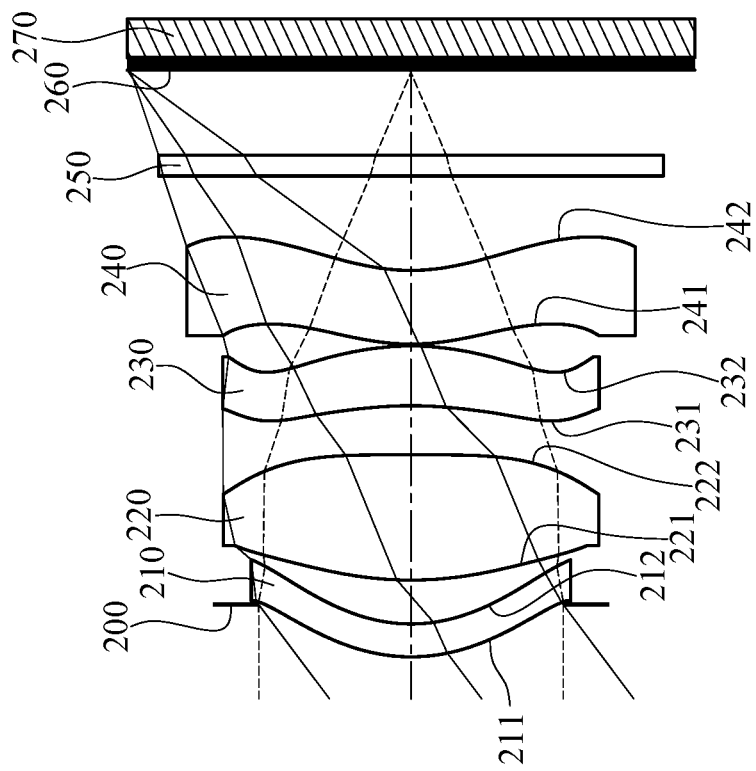
FIG. 3 is a schematic view of an image capturing unit according to the 2nd embodiment of the present disclosure.
Figure 4:
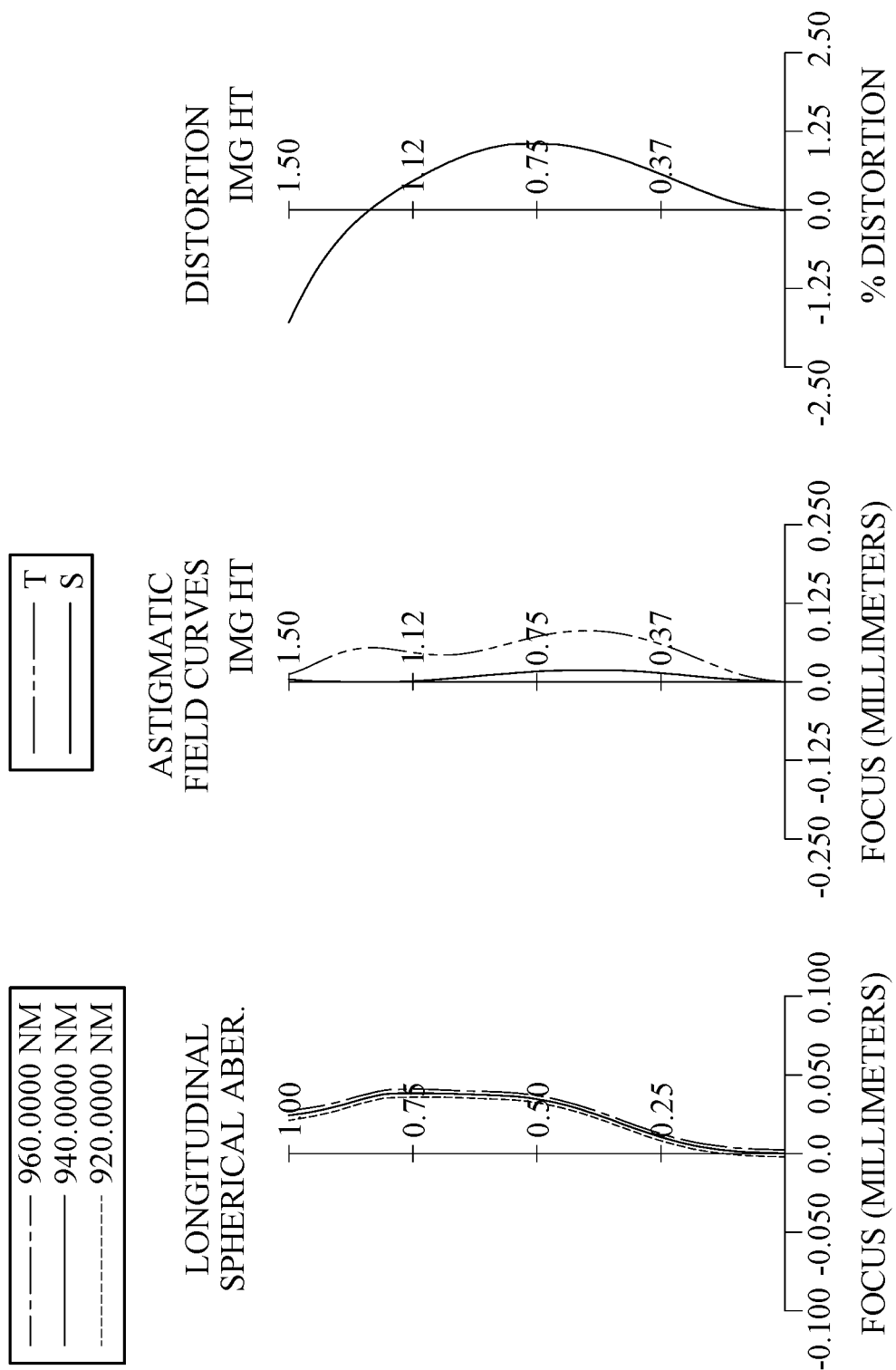
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the

TABLE 1

1st Embodiment
f = 1.86 mm, Fno = 1.11, HFOV = 38.8 deg.

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Ape. Stop | Plano | | −0.270 | | | | |
| 2 | Lens 1 | 1.103 | (ASP) | 0.298 | Plastic | 1.617 | 23.5 | 22.90 |
| 3 | | 1.073 | (ASP) | 0.277 | | | | |
| 4 | Lens 2 | 1.661 | (ASP) | 0.527 | Plastic | 1.617 | 23.5 | 2.47 |
| 5 | | −16.584 | (ASP) | 0.215 | | | | |
| 6 | Lens 3 | −1.331 | (ASP) | 0.365 | Plastic | 1.617 | 23.5 | 6.58 |
| 7 | | −1.107 | (ASP) | 0.030 | | | | |
| 8 | Lens 4 | 0.780 | (ASP) | 0.250 | Plastic | 1.617 | 23.5 | 28.41 |
| 9 | | 0.716 | (ASP) | 0.500 | | | | |
| 10 | Filter | Plano | | 0.210 | Glass | 1.508 | 64.2 | — |
| 11 | | Plano | | 0.327 | | | | |
| 12 | Image | Plano | | — | | | | |

Note:
Reference wavelength is 940.0 nm (infrared light).

TABLE 2

Aspheric Coefficients

| | Surface # | | | |
|---|---|---|---|---|
| | 2 | 3 | 4 | 5 |
| k = | −1.1806E+00 | −1.0654E+01 | 2.5002E−01 | −3.2596E+01 |
| A4 = | 9.7721E−02 | 7.1685E−01 | −2.3706E−01 | 2.1241E−02 |
| A6 = | −9.2995E−01 | −1.8659E+00 | 1.1358E+00 | −7.2013E−02 |
| A8 = | 3.5615E+00 | 3.4119E+00 | −5.2154E+00 | −1.8384E+00 |
| A10 = | −7.5211E+00 | −4.6549E+00 | 1.1905E+01 | 4.7243E+00 |
| A12 = | 7.8463E+00 | 3.4924E+00 | −1.4152E+01 | −4.6829E+00 |
| A14 = | −3.2932E+00 | −1.2380E+00 | 6.1590E+00 | 1.6423E+00 |

| | Surface # | | | |
|---|---|---|---|---|
| | 6 | 7 | 8 | 9 |
| k = | −4.0183E−01 | −4.4095E−01 | −1.0229E+00 | −4.7147E+00 |
| A4 = | 5.3617E−01 | 2.0555E−01 | −9.4572E−01 | 2.3313E−01 |
| A6 = | −1.3148E+00 | −1.2390E+00 | 1.3225E+00 | −1.4145E+00 |
| A8 = | −1.1737E+00 | 4.5784E+00 | −3.1342E+00 | 2.4735E+00 |
| A10 = | 1.0729E+01 | −8.9943E+00 | 5.3894E+00 | −2.4434E+00 |
| A12 = | −1.6648E+01 | 1.1303E+01 | −5.2492E+00 | 1.3956E+00 |
| A14 = | 1.0870E+01 | −7.3983E+00 | 2.5050E+00 | −4.3662E−01 |
| A16 = | −2.6867E+00 | 1.8513E+00 | −4.4784E−01 | 5.8604E−02 | image capturing unit according to the 2nd embodiment. In FIG. 3, the image capturing unit includes the imaging optical lens assembly (its reference numeral is omitted) of the present disclosure and an image sensor 270. The imaging optical lens assembly includes, in order from an object side to an image side, an aperture stop 200, a first lens element 210, a second lens element 220, a third lens element 230, a fourth lens element 240, a filter 250 and an image surface 260. The imaging optical lens assembly includes four single and non-cemented lens elements (210, 220, 230 and 240) with no additional lens element disposed between each of the adjacent four lens elements, wherein there is an air gap between every adjacent lens element.

The first lens element 210 with negative refractive power has an object-side surface 211 being convex in a paraxial region thereof and an image-side surface 212 being concave in a paraxial region thereof. The first lens element 210 is made of glass material and has the object-side surface 211 and the image-side surface 212 being both aspheric. The object-side surface 211 of the first lens element 210 has one inflection point. The image-side surface 212 of the first lens element 210 has one inflection point.

The second lens element 220 with positive refractive power has an object-side surface 221 being convex in a paraxial region thereof and an image-side surface 222 being convex in a paraxial region thereof. The second lens element 220 is made of plastic material and has the object-side surface 221 and the image-side surface 222 being both aspheric. The image-side surface 222 of the second lens element 220 has one inflection point.

The third lens element 230 with positive refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric. The object-side surface 231 of the third lens element 230 has two inflection points. The image-side surface 232 of the third lens element 230 has two inflection points. The object-side surface 231 of the third lens element 230 has one critical point in an off-axis region thereof. The image-side surface 232 of the third lens element 230 has one critical point in an off-axis region thereof.

The fourth lens element 240 with positive refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has one inflection point. The image-side surface 242 of the fourth lens element 240 has one inflection point. The object-side surface 241 of the fourth lens element 240 has one critical point in an off-axis region thereof. The image-side surface 242 of the fourth lens element 240 has one critical point in an off-axis region thereof.

The filter 250 is made of glass material and located between the fourth lens element 240 and the image surface 260, and will not affect the focal length of the imaging optical lens assembly. The image sensor 270 is disposed on or near the image surface 260 of the imaging optical lens assembly.

In this embodiment, each of the first lens element 210, the second lens element 220, the third lens element 230 and the fourth lens element 240 has an Abbe number smaller than 38.0.

The detailed optical data of the 2nd embodiment are shown in Table 3 and the aspheric surface data are shown in Table 4 below.

TABLE 3

2nd Embodiment
f = 2.02 mm, Fno = 1.25, HFOV = 36.6 deg.

| Surface # | | Curvature Radius | | Thickness | Material | Index | Abbe # | Focal Length |
|---|---|---|---|---|---|---|---|---|
| 0 | Object | Plano | | 600.000 | | | | |
| 1 | Ape. Stop | Plano | | −0.277 | | | | |
| 2 | Lens 1 | 0.930 | (ASP) | 0.174 | Glass | 1.961 | 20.7 | −65.70 |
| 3 | | 0.833 | (ASP) | 0.232 | | | | |
| 4 | Lens 2 | 1.841 | (ASP) | 0.664 | Plastic | 1.649 | 18.4 | 2.64 |
| 5 | | −21.146 | (ASP) | 0.259 | | | | |
| 6 | Lens 3 | −1.991 | (ASP) | 0.316 | Plastic | 1.649 | 18.4 | 6.06 |
| 7 | | −1.405 | (ASP) | 0.010 | | | | |
| 8 | Lens 4 | 1.177 | (ASP) | 0.390 | Plastic | 1.649 | 18.4 | 37.44 |
| 9 | | 1.075 | (ASP) | 0.500 | | | | |
| 10 | Filter | Plano | | 0.110 | Glass | 1.508 | 64.2 | — |
| 11 | | Plano | | 0.461 | | | | |
| 12 | Image | Plano | | — | | | | |

Note:
Reference wavelength is 940.0 nm (infrared light).

TABLE 4

Aspheric Coefficients

| Surface # | | | | |
|---|---|---|---|---|
| | 2 | 3 | 4 | 5 |
| k = | −1.3716E+00 | −4.0113E+00 | 1.6536E+00 | 7.1331E+01 |
| A4 = | 5.7168E−02 | 6.0659E−01 | −1.3046E−01 | −1.2019E−01 |
| A6 = | −4.2714E−01 | −1.6125E+00 | 7.0040E−02 | −2.3587E−01 |

TABLE 4-continued

| Aspheric Coefficients | | | |
|---|---|---|---|
| A8 = | 1.2744E+00 | 3.5274E+00 | −6.4117E−01 | −3.5215E−01 |
| A10 = | −2.6259E+00 | −5.8936E+00 | 1.1731E+00 | 1.8430E+00 |
| A12 = | 2.3921E+00 | 5.1020E+00 | −8.2688E−01 | −2.1526E+00 |
| A14 = | −9.4825E−01 | −1.7400E+00 | 1.9932E−01 | 8.2778E−01 |

| Surface # | | | |
|---|---|---|---|
| 6 | 7 | 8 | 9 |
| k = | 1.0634E+00 | −6.0298E−01 | −6.6801E−01 | −8.1940E+00 |
| A4 = | 4.7753E−01 | 3.8914E−01 | −4.8720E−01 | 2.4104E−01 |
| A6 = | −1.0200E+00 | −1.7980E+00 | −2.0756E−01 | −1.1667E+00 |
| A8 = | −7.3678E−01 | 5.8336E+00 | 1.2576E+00 | 2.0742E+00 |
| A10 = | 8.4256E+00 | −1.1188E+01 | −2.3246E+00 | −2.2083E+00 |
| A12 = | −1.4129E+01 | 1.5020E+01 | 2.4389E+00 | 1.4010E+00 |
| A14 = | 9.9320E+00 | −1.1108E+01 | −1.4442E+00 | −4.9069E−01 |
| A16 = | −2.6671E+00 | 3.1898E+00 | 3.5353E−01 | 7.2583E−02 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.02 | T23/CT3 | 0.82 |
| Fno | 1.25 | TL [mm] | 3.12 |
| HFOV [deg.] | 36.6 | TL/EPD | 1.92 |
| V1 | 20.7 | TL/ImgH | 2.08 |
| V2 | 18.4 | R2/R1 | 0.90 |
| V3 | 18.4 | R3/f | 0.91 |
| V4 | 18.4 | R3/R4 | −0.09 |
| Vmax | 20.7 | R6/R7 | −1.19 |
| V1 + V2 + V3 + V4 | 75.9 | R7/R8 | 1.09 |
| V1/V2 | 1.12 | f/f1 | −0.03 |
| V1/V3 | 1.12 | f/f2 | 0.77 |
| V1/V4 | 1.12 | f/f3 | 0.33 |
| V2/V1 | 0.89 | f/f4 | 0.05 |
| V2/V3 | 1.00 | f/f1 + f/f2 | 0.73 |
| V2/V4 | 1.00 | f/f3 + f/f4 | 0.39 |
| V3/V1 | 0.89 | f/R6 | −1.44 |
| V3/V2 | 1.00 | f2/f4 | 0.07 |
| V3/V4 | 1.00 | f23/f | 1.05 |
| V4/V1 | 0.89 | CRA [deg.] | 34.4 |
| V4/V2 | 1.00 | Y42/Y11 | 1.43 |
| V4/V3 | 1.00 | Yc42/Y42 | 0.80 |
| CT2/CT4 | 1.70 | Ymax/Ymin | 1.43 |
| CT4/CT3 | 1.23 | — | — |

3rd Embodiment

Figure 5:
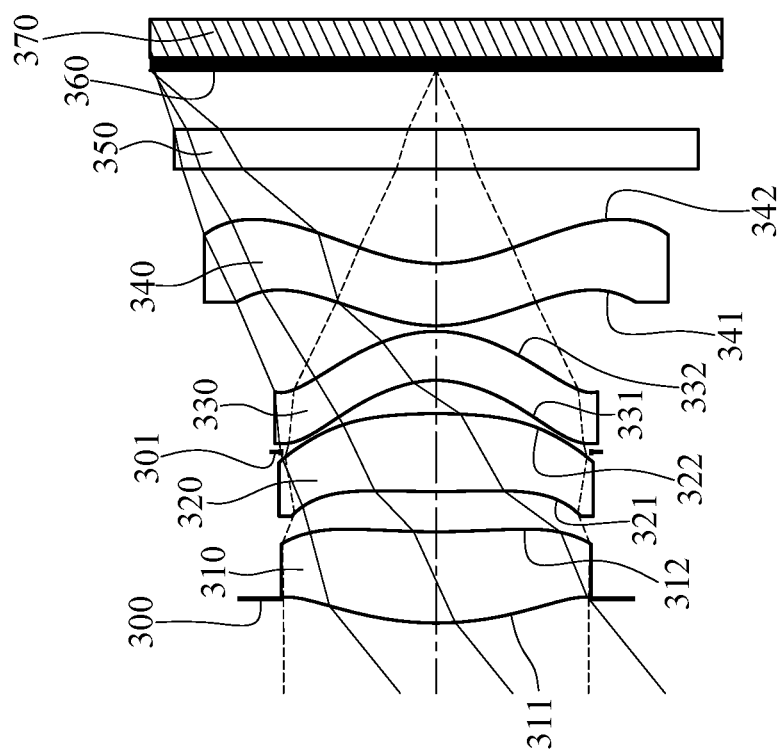
FIG. 5 is a schematic view of an image capturing unit according to the 3rd embodiment of the present disclosure.
Figure 6:
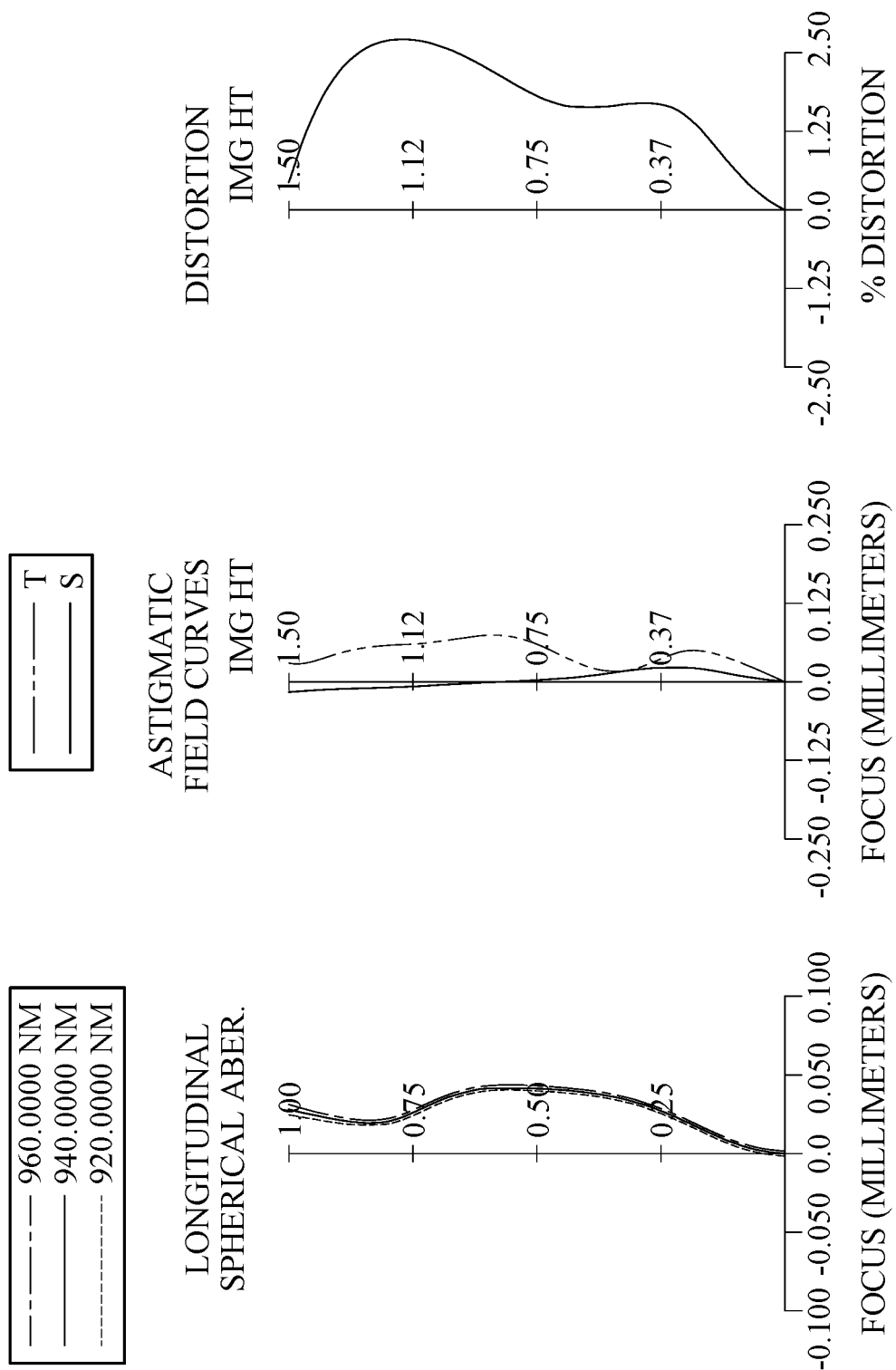
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging optical lens assembly (its reference numeral is omitted) of the present disclosure and an image sensor 370. The imaging optical lens assembly includes, in order from an object side to an image side, an aperture stop 300, a first lens element 310, a second lens element 320, a stop 301, a third lens element 330, a fourth lens element 340, a filter 350 and an image surface 360. The imaging optical lens assembly includes four single and non-cemented lens elements (310, 320, 330 and 340) with no additional lens element disposed between each of the adjacent four lens elements, wherein there is an air gap between every adjacent lens element.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. The object-side surface 311 of the first lens element 310 has one inflection point. The image-side surface 312 of the first lens element 310 has one inflection point. The object-side surface 311 of the first lens element 310 has one critical point in an off-axis region thereof. The image-side surface 312 of the first lens element 310 has one critical point in an off-axis region thereof.

The second lens element 320 with positive refractive power has an object-side surface 321 being convex in a paraxial region thereof and an image-side surface 322 being convex in a paraxial region thereof. The second lens element 320 is made of plastic material and has the object-side surface 321 and the image-side surface 322 being both aspheric. The object-side surface 321 of the second lens element 320 has one inflection point. The object-side surface 321 of the second lens element 320 has one critical point in an off-axis region thereof.

The third lens element 330 with negative refractive power has an object-side surface 331 being concave in a paraxial region thereof and an image-side surface 332 being convex in a paraxial region thereof. The third lens element 330 is made of plastic material and has the object-side surface 331 and the image-side surface 332 being both aspheric. The object-side surface 331 of the third lens element 330 has one inflection point. The image-side surface 332 of the third lens element 330 has one inflection point. The object-side surface 331 of the third lens element 330 has one critical point in an off-axis region thereof. The image-side surface 332 of the third lens element 330 has one critical point in an off-axis region thereof.

The fourth lens element 340 with positive refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has one inflection point. The image-side surface 342 of the fourth lens element 340 has one inflection point. The object-side surface 341 of the fourth lens element 340 has one critical point in an off-axis region thereof. The image-side surface 342 of the fourth lens element 340 has one critical point in an off-axis region thereof.

The filter 350 is made of glass material and located between the fourth lens element 340 and the image surface 360, and will not affect the focal length of the imaging optical lens assembly. The image sensor 370 is disposed on or near the image surface 360 of the imaging optical lens assembly.

In this embodiment, each of the first lens element 310, the second lens element 320, the third lens element 330 and the fourth lens element 340 has an Abbe number smaller than 38.0.

The detailed optical data of the 3rd embodiment are shown in Table 5 and the aspheric surface data are shown in Table 6 below.

TABLE 5

3rd Embodiment
f = 1.82 mm, Fno = 1.13, HFOV = 39.0 deg.

| Surface # | | Curvature Radius | | Thickness | Material | Index | Abbe # | Focal Length |
|---|---|---|---|---|---|---|---|---|
| 0 | Object | Plano | | 800.000 | | | | |
| 1 | Ape. Stop | Plano | | −0.128 | | | | |
| 2 | Lens 1 | 1.616 | (ASP) | 0.483 | Plastic | 1.617 | 23.5 | 3.93 |
| 3 | | 4.279 | (ASP) | 0.213 | | | | |
| 4 | Lens 2 | 6.859 | (ASP) | 0.412 | Plastic | 1.617 | 23.5 | 3.42 |
| 5 | | −2.981 | (ASP) | −0.203 | | | | |
| 6 | Stop | Plano | | 0.379 | | | | |
| 7 | Lens 3 | −0.549 | (ASP) | 0.259 | Plastic | 1.617 | 23.5 | −12.64 |
| 8 | | −0.697 | (ASP) | 0.030 | | | | |
| 9 | Lens 4 | 0.755 | (ASP) | 0.329 | Plastic | 1.617 | 23.5 | 5.36 |
| 10 | | 0.816 | (ASP) | 0.500 | | | | |
| 11 | Filter | Plano | | 0.210 | Glass | 1.508 | 64.2 | — |
| 12 | | Plano | | 0.313 | | | | |
| 13 | Image | Plano | | — | | | | |

Note:
Reference wavelength is 940.0 nm (infrared light).
An effective radius of the stop 301 (Surface 6) is 0.820 mm.

TABLE 6

Aspheric Coefficients

| | Surface # | | | |
|---|---|---|---|---|
| | 2 | 3 | 4 | 5 |
| k = | −3.5380E+00 | −3.2727E−01 | 5.2683E+00 | −2.3254E+00 |
| A4 = | 3.4465E−02 | −1.9986E−01 | −3.5267E−01 | −1.7158E−01 |
| A6 = | −1.0327E−01 | −1.2856E−01 | 7.1607E−02 | −8.8779E−01 |
| A8 = | −2.3089E−01 | −6.9671E−01 | −2.1467E+00 | 5.1286E−01 |
| A10 = | 5.1190E−01 | 1.8689E+00 | 6.3377E+00 | 3.4558E+00 |
| A12 = | −6.3797E−01 | −1.7639E+00 | −8.4270E+00 | −5.5776E+00 |
| A14 = | 9.6238E−02 | 5.2487E−01 | 3.6892E+00 | 2.3144E+00 |

| | Surface # | | | |
|---|---|---|---|---|
| | 7 | 8 | 9 | 10 |
| k = | −1.1743E+00 | −5.9418E−01 | −7.3567E+00 | −1.0000E+00 |
| A4 = | 1.8183E+00 | 5.2592E−01 | 3.9642E−01 | −7.5371E−01 |
| A6 = | −1.1593E+01 | −1.1826E+00 | −2.2432E+00 | 1.0268E+00 |
| A8 = | 4.4010E+01 | 2.4903E+00 | 5.5166E+00 | −1.3955E+00 |
| A10 = | −9.7015E+01 | 5.0417E+00 | −8.6605E+00 | 1.2296E+00 |
| A12 = | 1.2881E+02 | −2.2058E+01 | 8.0194E+00 | −6.4955E−01 |
| A14 = | −9.3644E+01 | 2.6602E+01 | −4.0114E+00 | 1.8367E−01 |
| A16 = | 2.8316E+01 | −1.0507E+01 | 8.4088E−01 | −2.1355E−02 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.82 | T23/CT3 | 0.68 |
| Fno | 1.13 | TL [mm] | 2.92 |
| HFOV [deg.] | 39.0 | TL/EPD | 1.81 |
| V1 | 23.5 | TL/ImgH | 1.95 |
| V2 | 23.5 | R2/R1 | 2.65 |
| V3 | 23.5 | R3/f | 3.76 |
| V4 | 23.5 | R3/R4 | −2.30 |
| Vmax | 23.5 | R6/R7 | −0.92 |
| V1 + V2 + V3 + V4 | 94.0 | R7/R8 | 0.93 |
| V1/V2 | 1.00 | f/f1 | 0.46 |
| V1/V3 | 1.00 | f/f2 | 0.53 |
| V1/V4 | 1.00 | f/f3 | −0.14 |
| V2/V1 | 1.00 | f/f4 | 0.34 |
| V2/V3 | 1.00 | f/f1 + f/f2 | 1.00 |
| V2/V4 | 1.00 | f/f3 + f/f4 | 0.20 |
| V3/V1 | 1.00 | f/R6 | −2.62 |
| V3/V2 | 1.00 | f2/f4 | 0.64 |
| V3/V4 | 1.00 | f23/f | 3.09 |
| V4/V1 | 1.00 | CRA [deg.] | 30.2 |
| V4/V2 | 1.00 | Y42/Y11 | 1.52 |
| V4/V3 | 1.00 | Yc42/Y42 | 0.79 |
| CT2/CT4 | 1.25 | Ymax/Ymin | 1.60 |
| CT4/CT3 | 1.27 | — | — |

4th Embodiment

Figure 7:
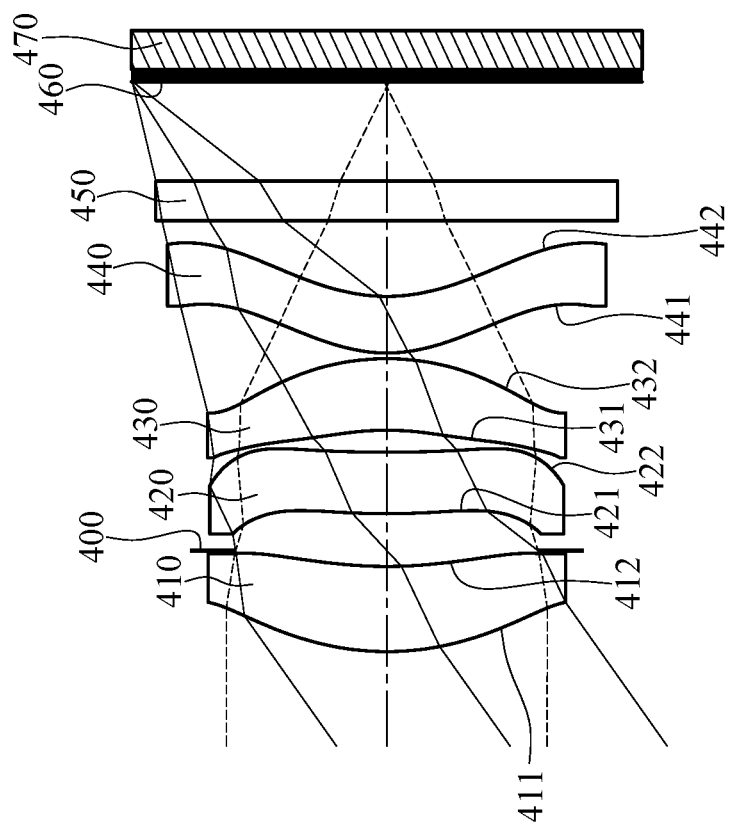
FIG. 7 is a schematic view of an image capturing unit according to the 4th embodiment of the present disclosure.
Figure 8:
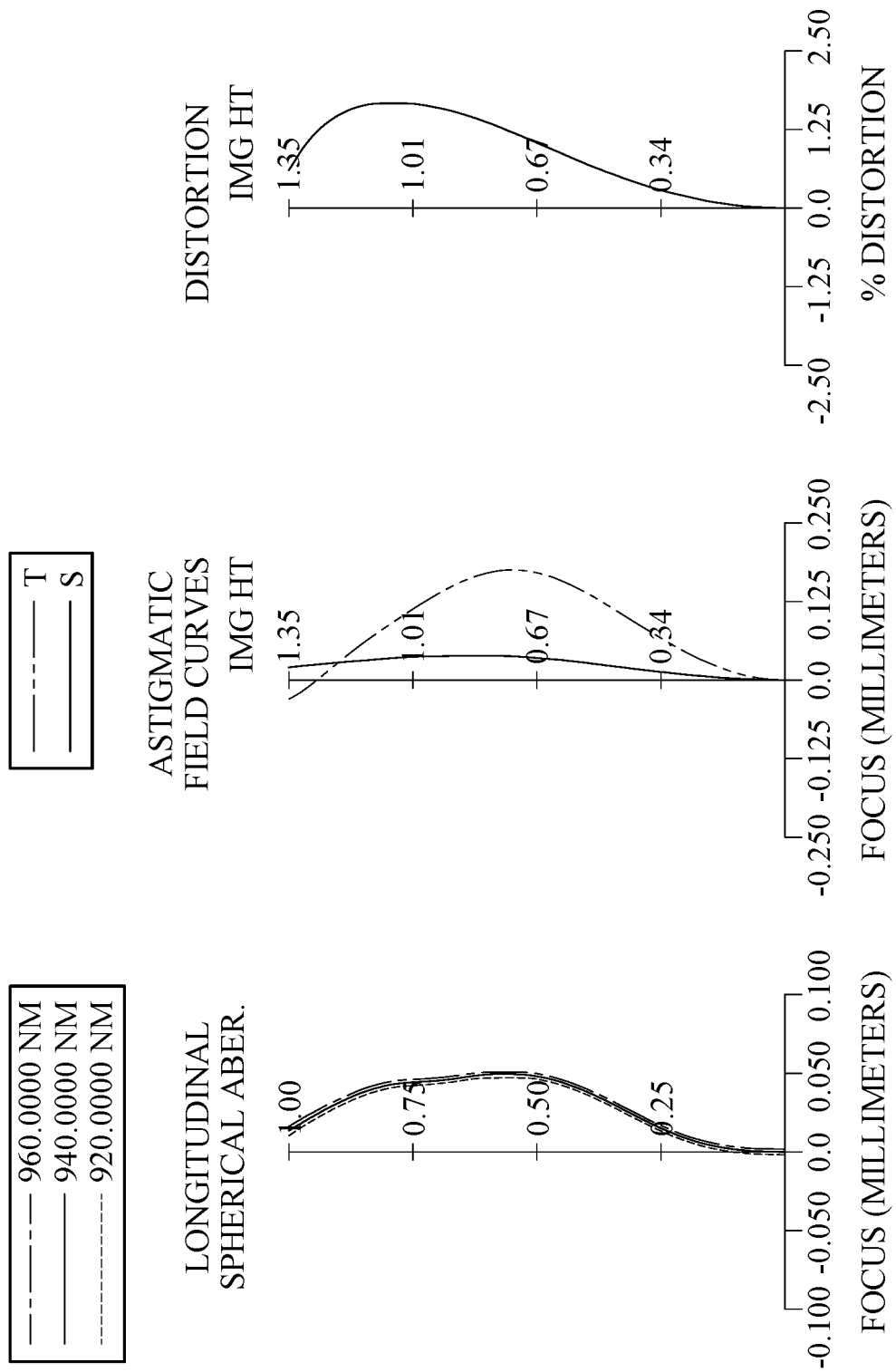
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging optical lens assembly (its reference numeral is omitted) of the present disclosure and an image sensor 470. The imaging optical lens assembly includes, in order from an object side to an image side, a first lens element 410, an aperture stop 400, a second lens element 420, a third lens element 430, a fourth lens element 440, a filter 450 and an image surface 460. The imaging optical lens assembly includes four single and non-cemented lens elements (410, 420, 430 and 440) with no additional lens element disposed between each of the adjacent four lens elements, wherein there is an air gap between every adjacent lens element.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has one inflection point. The image-side surface 412 of the first lens element 410 has one inflection point. The image-side surface 412 of the first lens element 410 has one critical point in an off-axis region thereof.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric. The object-side surface 421 of the second lens element 420 has one inflection point. The image-side surface 422 of the second lens element 420 has one inflection point. The object-side surface 421 of the second lens element 420 has one critical point in an off-axis region thereof. The image-side surface 422 of the second lens element 420 has one critical point in an off-axis region thereof.

The third lens element 430 with positive refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric. The object-side surface 431 of the third lens element 430 has two inflection points. The image-side surface 432 of the third lens element 430 has one inflection point. The image-side surface 432 of the third lens element 430 has one critical point in an off-axis region thereof.

The fourth lens element 440 with positive refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has one inflection point. The image-side surface 442 of the fourth lens element 440 has one inflection point. The object-side surface 441 of the fourth lens element 440 has one critical point in an off-axis region thereof. The image-side surface 442 of the fourth lens element 440 has one critical point in an off-axis region thereof.

The filter 450 is made of glass material and located between the fourth lens element 440 and the image surface 460, and will not affect the focal length of the imaging optical lens assembly. The image sensor 470 is disposed on or near the image surface 460 of the imaging optical lens assembly.

In this embodiment, each of the first lens element 410, the second lens element 420, the third lens element 430 and the fourth lens element 440 has an Abbe number smaller than 38.0.

The detailed optical data of the 4th embodiment are shown in Table 7 and the aspheric surface data are shown in Table 8 below.

TABLE 7

4th Embodiment
f = 1.86 mm, Fno = 1.10, HFOV = 35.2 deg.

| Surface # | | Curvature Radius | Thickness | Material | Index | Abbe # | Focal Length |
|---|---|---|---|---|---|---|---|
| 0 | Object | Plano | 1500.000 | | | | |
| 1 | Lens 1 | 1.444 (ASP) | 0.451 | Plastic | 1.634 | 20.4 | 4.88 |

TABLE 7-continued

4th Embodiment
f = 1.86 mm, Fno = 1.10, HFOV = 35.2 deg.

| Surface # | | Curvature Radius | | Thickness | Material | Index | Abbe # | Focal Length |
|---|---|---|---|---|---|---|---|---|
| 2 | | 2.379 | (ASP) | 0.084 | | | | |
| 3 | Ape. Stop | Plano | | 0.195 | | | | |
| 4 | Lens 2 | 3.890 | (ASP) | 0.326 | Plastic | 1.634 | 20.4 | 7.84 |
| 5 | | 17.292 | (ASP) | 0.116 | | | | |
| 6 | Lens 3 | −1.359 | (ASP) | 0.378 | Plastic | 1.634 | 20.4 | 14.64 |
| 7 | | −1.313 | (ASP) | 0.030 | | | | |
| 8 | Lens 4 | 0.786 | (ASP) | 0.300 | Plastic | 1.634 | 20.4 | 4.17 |
| 9 | | 0.953 | (ASP) | 0.400 | | | | |
| 10 | Filter | Plano | | 0.210 | Glass | 1.508 | 64.2 | — |
| 11 | | Plano | | 0.525 | | | | |
| 12 | Image | Plano | | — | | | | |

Note:
Reference wavelength is 940.0 nm (infrared light).

TABLE 8

Aspheric Coefficients

| | | Surface # | | |
|---|---|---|---|---|
| | 1 | 2 | 4 | 5 |
| k = | −3.8859E+00 | −7.0268E+01 | −9.0000E+01 | −3.9905E+01 |
| A4 = | 1.1768E−01 | 4.4340E−01 | 1.5882E−01 | 4.8132E−01 |
| A6 = | −8.9389E−02 | −2.1537E+00 | −2.1426E+00 | −2.5816E+00 |
| A8 = | −4.1193E−02 | 6.8168E+00 | 5.8394E+00 | 9.3343E+00 |
| A10 = | 2.7333E−01 | −1.5680E+01 | −1.2924E+01 | −2.5239E+01 |
| A12 = | −4.6891E−01 | 2.2157E+01 | 1.6768E+01 | 3.6967E+01 |
| A14 = | 2.0392E−01 | −1.7350E+01 | −8.9129E+00 | −2.6966E+01 |
| A16 = | — | 5.8048E+00 | — | 7.6569E+00 |

| | | Surface # | | |
|---|---|---|---|---|
| | 6 | 7 | 8 | 9 |
| k = | −3.7327E+00 | −1.3304E+00 | −3.3716E+00 | −8.3187E−01 |
| A4 = | 7.9994E−01 | −8.2366E−02 | −8.4555E−02 | −2.3062E−01 |
| A6 = | −2.1649E+00 | −2.9667E−01 | 6.5606E−02 | −1.1724E−01 |
| A8 = | 7.2683E+00 | 1.9775E+00 | −3.4129E−01 | 1.2476E−01 |
| A10 = | −2.1187E+01 | −5.4500E+00 | 3.0220E−01 | −7.2333E−02 |
| A12 = | 3.3236E+01 | 7.9841E+00 | −8.8282E−02 | 3.2734E−02 |
| A14 = | −2.4896E+01 | −5.3322E+00 | 6.1185E−03 | −9.3903E−03 |
| A16 = | 6.9872E+00 | 1.2826E+00 | — | 1.1264E−03 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.86 | T23/CT3 | 0.31 |
| Fno | 1.10 | TL [mm] | 3.02 |
| HFOV [deg.] | 35.2 | TL/EPD | 1.78 |
| V1 | 20.4 | TL/ImgH | 2.23 |
| V2 | 20.4 | R2/R1 | 1.65 |
| V3 | 20.4 | R3/f | 2.09 |
| V4 | 20.4 | R3/R4 | 0.22 |
| Vmax | 20.4 | R6/R7 | −1.67 |

-continued

| 4th Embodiment | | | |
|---|---|---|---|
| V1 + V2 + V3 + V4 | 81.6 | R7/R8 | 0.82 |
| V1/V2 | 1.00 | f/f1 | 0.38 |
| V1/V3 | 1.00 | f/f2 | 0.24 |
| V1/V4 | 1.00 | f/f3 | 0.13 |
| V2/V1 | 1.00 | f/f4 | 0.45 |
| V2/V3 | 1.00 | f/f1 + f/f2 | 0.62 |
| V2/V4 | 1.00 | f/f3 + f/f4 | 0.57 |
| V3/V1 | 1.00 | f/R6 | −1.42 |
| V3/V2 | 1.00 | f2/f4 | 1.88 |
| V3/V4 | 1.00 | f23/f | 3.01 |
| V4/V1 | 1.00 | CRA [deg.] | 32.2 |
| V4/V2 | 1.00 | Y42/Y11 | 1.23 |
| V4/V3 | 1.00 | Yc42/Y42 | 0.91 |
| CT2/CT4 | 1.09 | Ymax/Ymin | 1.42 |
| CT4/CT3 | 0.79 | — | — |

5th Embodiment

Figure 9:
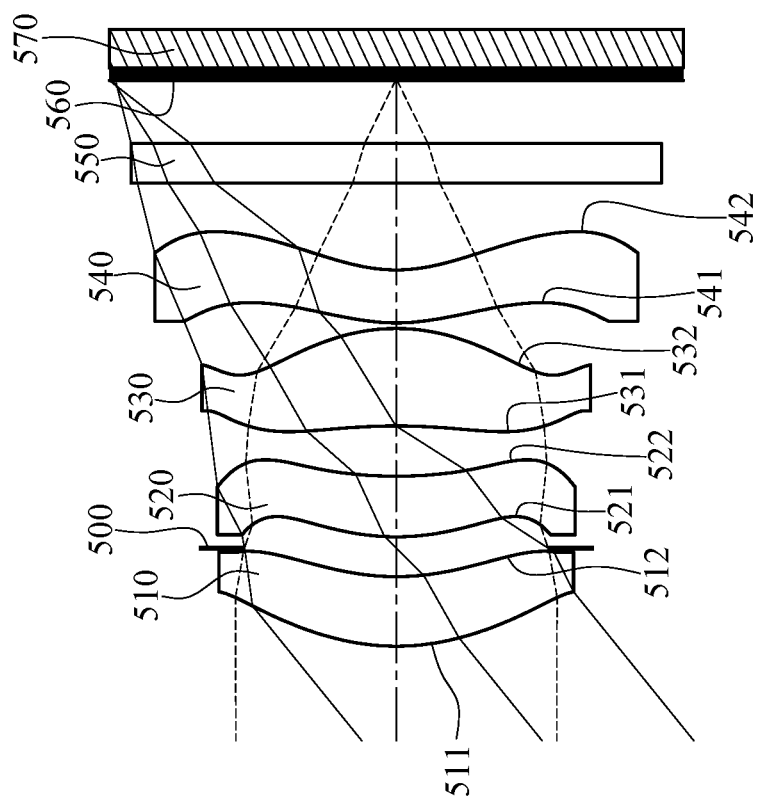
FIG. 9 is a schematic view of an image capturing unit according to the 5th embodiment of the present disclosure.
Figure 10:
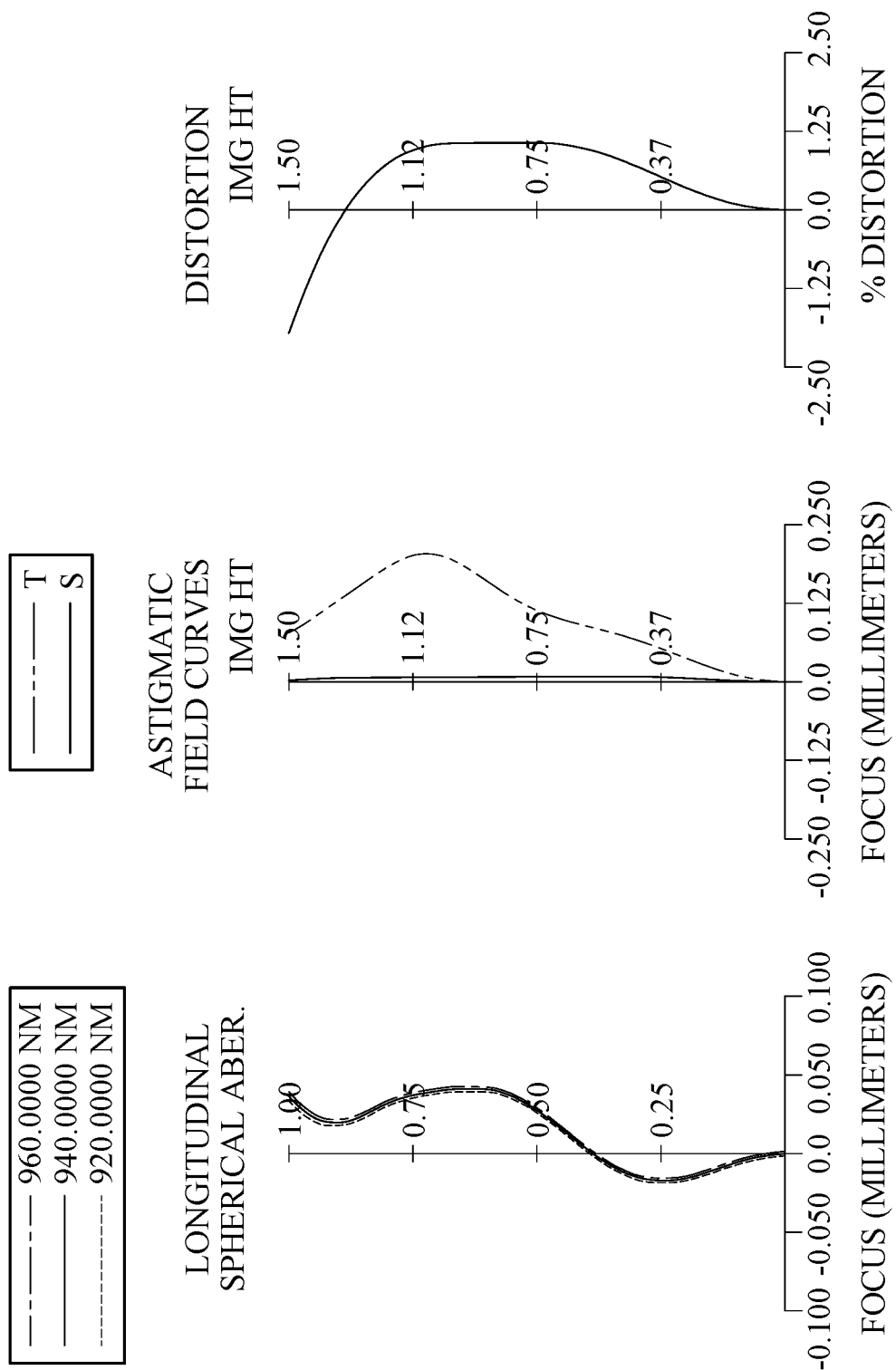
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging optical lens assembly (its reference numeral is omitted) of the present disclosure and an image sensor 570. The imaging optical lens assembly includes, in order from an object side to an image side, a first lens element 510, an aperture stop 500, a second lens element 520, a third lens element 530, a fourth lens element 540, a filter 550 and an image surface 560. The imaging optical lens assembly includes four single and non-cemented lens elements (510, 520, 530 and 540) with no additional lens element disposed between each of the adjacent four lens elements, wherein there is an air gap between every adjacent lens element.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has one inflection point. The image-side surface 512 of the first lens element 510 has one inflection point. The image-side surface 512 of the first lens element 510 has one critical point in an off-axis region thereof.

The second lens element 520 with positive refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric. The object-side surface 521 of the second lens element 520 has one inflection point. The image-side surface 522 of the second lens element 520 has one inflection point. The object-side surface 521 of the second lens element 520 has one critical point in an off-axis region thereof. The image-side surface 522 of the second lens element 520 has one critical point in an off-axis region thereof.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric. The object-side surface 531 of the third lens element 530 has two inflection points. The image-side surface 532 of the third lens element 530 has three inflection points. The object-side surface 531 of the third lens element 530 has two critical points in an off-axis region thereof. The image-side surface 532 of the third lens element 530 has one critical point in an off-axis region thereof.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has two inflection points. The image-side surface 542 of the fourth lens element 540 has one inflection point. The object-side surface 541 of the fourth lens element 540 has one critical point in an off-axis region thereof. The image-side surface 542 of the fourth lens element 540 has one critical point in an off-axis region thereof.

The filter 550 is made of glass material and located between the fourth lens element 540 and the image surface 560, and will not affect the focal length of the imaging optical lens assembly. The image sensor 570 is disposed on or near the image surface 560 of the imaging optical lens assembly.

In this embodiment, each of the first lens element 510, the second lens element 520, the third lens element 530 and the fourth lens element 540 has an Abbe number smaller than 38.0.

The detailed optical data of the 5th embodiment are shown in Table 9 and the aspheric surface data are shown in Table 10 below.

TABLE 9

5th Embodiment
f = 1.86 mm, Fno = 1.10, HFOV = 39.0 deg.

| Surface # |  | Curvature Radius |  | Thickness | Material | Index | Abbe # | Focal Length |
|---|---|---|---|---|---|---|---|---|
| 0 | Object | Plano |  | 400.000 |  |  |  |  |
| 1 | Lens 1 | 1.227 | (ASP) | 0.368 | Plastic | 1.617 | 23.5 | 14.64 |
| 2 |  | 1.258 | (ASP) | 0.151 |  |  |  |  |
| 3 | Ape. Stop | Plano |  | 0.060 |  |  |  |  |
| 4 | Lens 2 | 1.298 | (ASP) | 0.321 | Plastic | 1.617 | 23.5 | 3.90 |
| 5 |  | 2.550 | (ASP) | 0.266 |  |  |  |  |
| 6 | Lens 3 | −2.831 | (ASP) | 0.515 | Plastic | 1.617 | 23.5 | 2.43 |
| 7 |  | −1.049 | (ASP) | 0.030 |  |  |  |  |
| 8 | Lens 4 | 1.071 | (ASP) | 0.280 | Plastic | 1.617 | 23.5 | −11.13 |
| 9 |  | 0.834 | (ASP) | 0.460 |  |  |  |  |
| 10 | Filter | Plano |  | 0.210 | Glass | 1.508 | 64.2 | — |
| 11 |  | Plano |  | 0.333 |  |  |  |  |
| 12 | Image | Plano |  | — |  |  |  |  |

Note:
Reference wavelength is 940.0 nm (infrared light).

TABLE 10

Aspheric Coefficients

| Surface # | 1 | 2 | 4 | 5 |
|---|---|---|---|---|
| k = | −2.0403E+00 | 3.7440E−01 | 2.9706E−01 | −2.5993E+01 |
| A4 = | −3.6649E−03 | −3.9389E−01 | 2.9577E−02 | 4.1315E−01 |
| A6 = | −1.5499E−01 | 4.6841E−01 | −2.0744E+00 | −3.8351E−01 |
| A8 = | 9.0091E−01 | −2.1150E+00 | 7.7134E+00 | −1.1675E+00 |
| A10 = | −2.0181E+00 | 4.1062E+00 | −2.0828E+01 | 1.0605E+00 |
| A12 = | 2.0893E+00 | −4.3635E+00 | 2.4197E+01 | 1.2092E−02 |
| A14 = | −8.9426E−01 | 1.8396E+00 | −1.0191E+01 | −2.0403E−01 |

| Surface # | 6 | 7 | 8 | 9 |
|---|---|---|---|---|
| k = | −1.3044E+01 | −1.6184E+00 | −1.0104E+00 | −2.0528E+00 |
| A4 = | 2.6756E−01 | −2.7542E−01 | −9.9288E−01 | −6.2203E−01 |
| A6 = | −1.0456E+00 | 1.2985E+00 | 2.3112E+00 | 9.4791E−01 |
| A8 = | 4.2181E+00 | −2.1939E+00 | −5.1970E+00 | −1.2633E+00 |
| A10 = | −6.1258E+00 | −3.8297E−01 | 7.5791E+00 | 1.1692E+00 |
| A12 = | 2.6884E+00 | 7.6113E+00 | −6.5088E+00 | −6.7958E−01 |
| A14 = | 1.4510E+00 | −8.8737E+00 | 2.9422E+00 | 2.1136E−01 |
| A16 = | −1.2383E+00 | 3.0415E+00 | −5.3280E−01 | −2.6031E−02 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.86 | T23/CT3 | 0.52 |
| Fno | 1.10 | TL [mm] | 2.99 |
| HFOV [deg.] | 39.0 | TL/EPD | 1.76 |
| V1 | 23.5 | TL/ImgH | 2.00 |
| V2 | 23.5 | R2/R1 | 1.02 |
| V3 | 23.5 | R3/f | 0.70 |
| V4 | 23.5 | R3/R4 | 0.51 |
| Vmax | 23.5 | R6/R7 | −0.98 |
| V1 + V2 + V3 + V4 | 94.0 | R7/R8 | 1.28 |
| V1/V2 | 1.00 | f/f1 | 0.13 |
| V1/V3 | 1.00 | f/f2 | 0.48 |
| V1/V4 | 1.00 | f/f3 | 0.77 |
| V2/V1 | 1.00 | f/f4 | −0.17 |
| V2/V3 | 1.00 | f/f1 + f/f2 | 0.61 |
| V2/V4 | 1.00 | f/f3 + f/f4 | 0.60 |
| V3/V1 | 1.00 | f/R6 | −1.78 |
| V3/V2 | 1.00 | f2/f4 | −0.35 |
| V3/V4 | 1.00 | f23/f | 0.97 |
| V4/V1 | 1.00 | CRA [deg.] | 32.7 |
| V4/V2 | 1.00 | Y42/Y11 | 1.36 |
| V4/V3 | 1.00 | Yc42/Y42 | 0.75 |
| CT2/CT4 | 1.15 | Ymax/Ymin | 1.56 |
| CT4/CT3 | 0.54 | — | — |

6th Embodiment

Figure 11:
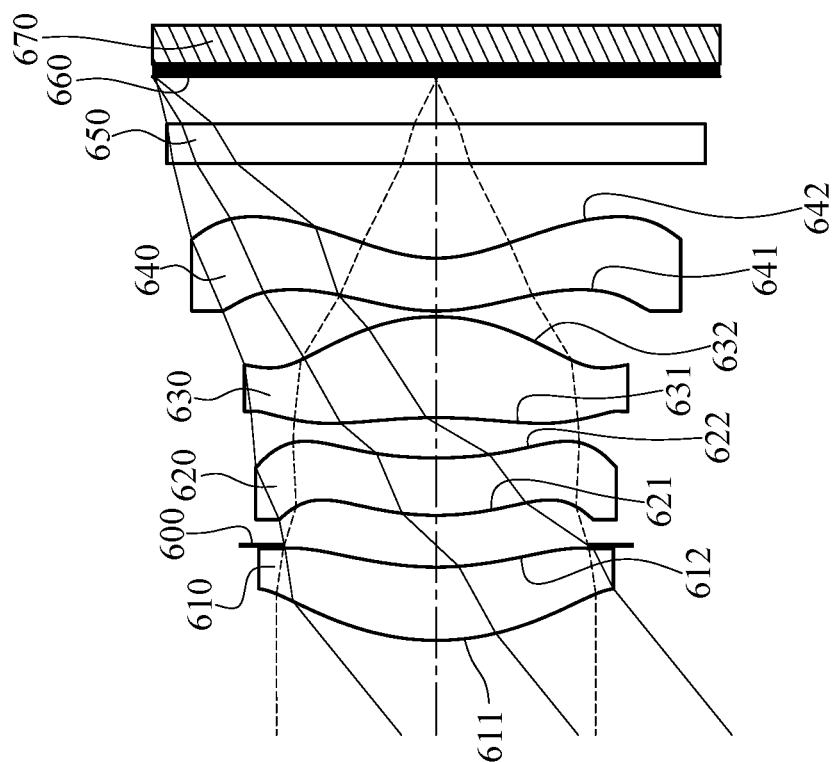
FIG. 11 is a schematic view of an image capturing unit according to the 6th embodiment of the present disclosure.
Figure 12:
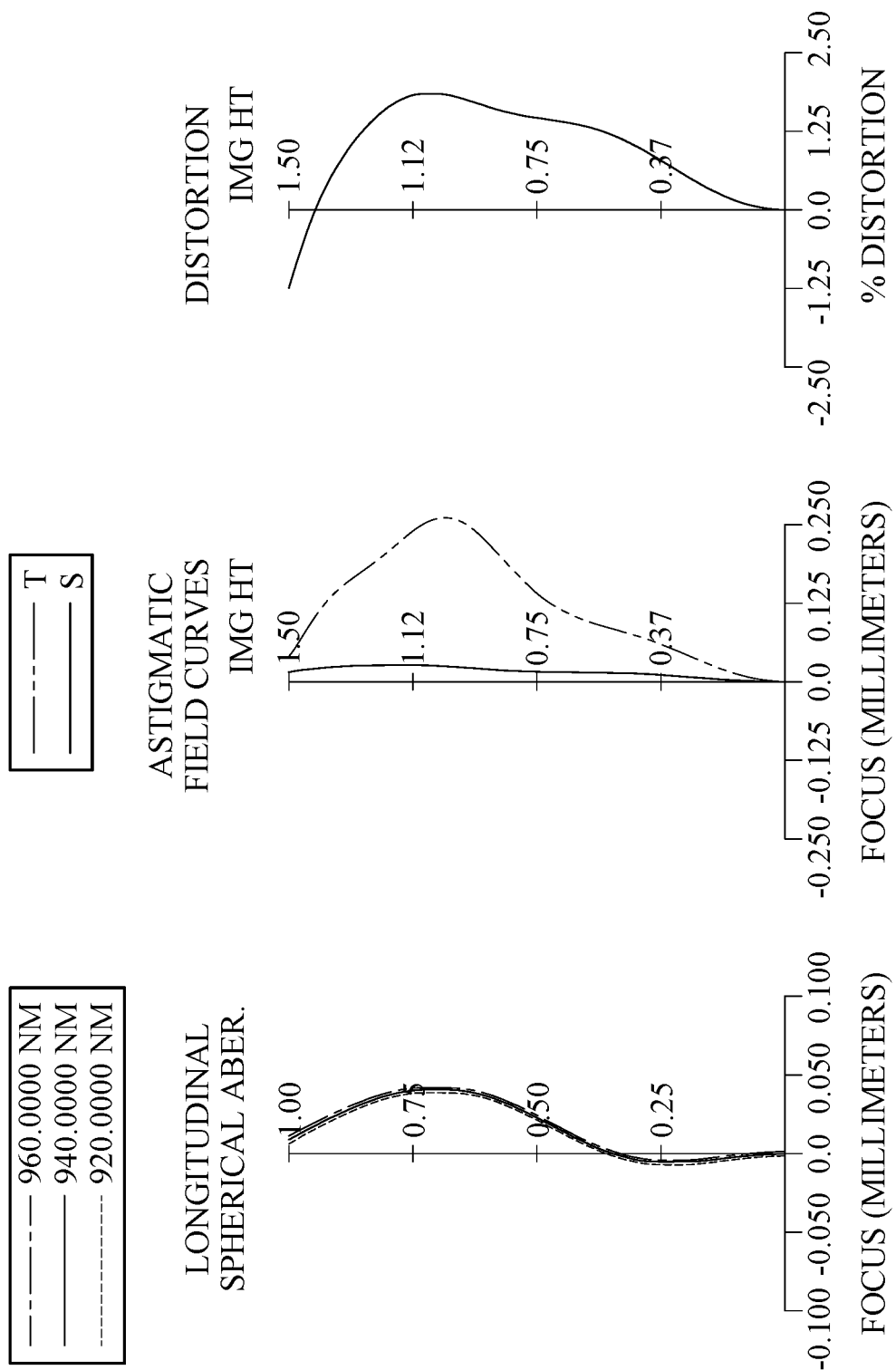
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging optical lens assembly (its reference numeral is omitted) of the present disclosure and an image sensor 670. The imaging optical lens assembly includes, in order from an object side to an image side, a first lens element 610, an aperture stop 600, a second lens element 620, a third lens element 630, a fourth lens element 640, a filter 650 and an image surface 660. The imaging optical lens assembly includes four single and non-cemented lens elements (610, 620, 630 and 640) with no additional lens element disposed between each of the adjacent four lens elements, wherein there is an air gap between every adjacent lens element.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The object-side surface 611 of the first lens element 610 has one inflection point. The image-side surface 612 of the first lens element 610 has one inflection point. The image-side surface 612 of the first lens element 610 has one critical point in an off-axis region thereof.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has one inflection point. The image-side surface 622 of the second lens element 620 has one inflection point. The object-side surface 621 of the second lens element 620 has one critical point in an off-axis region thereof. The image-side surface 622 of the second lens element 620 has one critical point in an off-axis region thereof.

The third lens element 630 with positive refractive power has an object-side surface 631 being concave in a paraxial region thereof and an image-side surface 632 being convex in a paraxial region thereof. The third lens element 630 is made of plastic material and has the object-side surface 631 and the image-side surface 632 being both aspheric. The object-side surface 631 of the third lens element 630 has two inflection points. The image-side surface 632 of the third lens element 630 has one inflection point. The object-side surface 631 of the third lens element 630 has two critical points in an off-axis region thereof. The image-side surface 632 of the third lens element 630 has one critical point in an off-axis region thereof.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. The object-side surface 641 of the fourth lens element 640 has two inflection points. The image-side surface 642 of the fourth lens element 640 has one inflection point. The object-side surface 641 of the fourth lens element 640 has one critical point in an off-axis region thereof. The image-side surface 642 of the fourth lens element 640 has one critical point in an off-axis region thereof.

The filter 650 is made of glass material and located between the fourth lens element 640 and the image surface 660, and will not affect the focal length of the imaging optical lens assembly. The image sensor 670 is disposed on or near the image surface 660 of the imaging optical lens assembly.

In this embodiment, each of the first lens element 610, the second lens element 620, the third lens element 630 and the fourth lens element 640 has an Abbe number smaller than 38.0.

The detailed optical data of the 6th embodiment are shown in Table 11 and the aspheric surface data are shown in Table 12 below.

TABLE 11

6th Embodiment
f = 1.85 mm, Fno = 1.10, HFOV = 39.0 deg.

| Surface # | | Curvature Radius | | Thickness | Material | Index | Abbe # | Focal Length |
|---|---|---|---|---|---|---|---|---|
| 0 | Object | Plano | | 1000.000 | | | | |
| 1 | Lens 1 | 1.283 | (ASP) | 0.388 | Plastic | 1.617 | 23.5 | 6.97 |
| 2 | | 1.617 | (ASP) | 0.116 | | | | |
| 3 | Ape. Stop | Plano | | 0.158 | | | | |
| 4 | Lens 2 | 1.482 | (ASP) | 0.304 | Plastic | 1.617 | 23.5 | 5.19 |
| 5 | | 2.542 | (ASP) | 0.213 | | | | |
| 6 | Lens 3 | −2.428 | (ASP) | 0.534 | Plastic | 1.617 | 23.5 | 2.49 |
| 7 | | −1.020 | (ASP) | 0.030 | | | | |
| 8 | Lens 4 | 0.974 | (ASP) | 0.280 | Plastic | 1.617 | 23.5 | −10.46 |
| 9 | | 0.753 | (ASP) | 0.500 | | | | |
| 10 | Filter | Plano | | 0.210 | Glass | 1.508 | 64.2 | — |
| 11 | | Plano | | 0.251 | | | | |
| 12 | Image | Plano | | — | | | | |

Note:
Reference wavelength is 940.0 nm (infrared light).

TABLE 12

Aspheric Coefficients

| Surface # | | | | |
|---|---|---|---|---|
| | 1 | 2 | 4 | 5 |
| k = | −2.1584E+00 | 1.2453E−01 | 1.4778E+00 | −1.4548E+01 |
| A4 = | −2.4317E−02 | −3.5094E−01 | −5.8204E−02 | 5.5701E−01 |
| A6 = | 3.7690E−01 | 1.0381E+00 | −1.6718E+00 | −1.8841E+00 |
| A8 = | −1.3749E+00 | −4.1289E+00 | 5.1637E+00 | 3.8611E+00 |
| A10 = | 2.5124E+00 | 8.1186E+00 | −1.5266E+01 | −7.2325E+00 |
| A12 = | −2.3788E+00 | −8.4296E+00 | 1.9490E+01 | 6.7692E+00 |
| A14 = | 8.2474E−01 | 3.5727E+00 | −8.7210E+00 | −2.3319E+00 |

| Surface # | | | | |
|---|---|---|---|---|
| | 6 | 7 | 8 | 9 |
| k = | −8.4543E+01 | −1.4861E+00 | −2.1798E+00 | −2.8600E+00 |
| A4 = | −1.3733E−02 | −2.6832E−01 | −1.0464E+00 | −5.2267E−01 |
| A6 = | −2.5444E−02 | 1.6194E+00 | 3.1031E+00 | 9.3634E−01 |
| A8 = | 2.1020E+00 | −4.2740E+00 | −7.6438E+00 | −1.4893E+00 |
| A10 = | −3.5387E+00 | 5.3461E+00 | 1.1599E+01 | 1.5479E+00 |
| A12 = | 7.6920E−02 | −6.7378E−01 | −1.0114E+01 | −9.5306E−01 |
| A14 = | 3.4222E+00 | −3.0872E+00 | 4.5939E+00 | 3.0494E−01 |
| A16 = | −1.9158E+00 | 1.5248E+00 | −8.3426E−01 | −3.8410E−02 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.85 | T23/CT3 | 0.40 |
| Fno | 1.10 | TL [mm] | 2.98 |
| HFOV [deg.] | 39.0 | TL/EPD | 1.77 |
| V1 | 23.5 | TL/ImgH | 1.99 |
| V2 | 23.5 | R2/R1 | 1.26 |
| V3 | 23.5 | R3/f | 0.80 |
| V4 | 23.5 | R3/R4 | 0.58 |
| Vmax | 23.5 | R6/R7 | −1.05 |
| V1 + V2 + V3 + V4 | 94.0 | R7/R8 | 1.29 |
| V1/V2 | 1.00 | f/f1 | 0.27 |
| V1/V3 | 1.00 | f/f2 | 0.36 |
| V1/V4 | 1.00 | f/f3 | 0.74 |
| V2/V1 | 1.00 | f/f4 | −0.18 |
| V2/V3 | 1.00 | f/f1 + f/f2 | 0.62 |
| V2/V4 | 1.00 | f/f3 + f/f4 | 0.57 |
| V3/V1 | 1.00 | f/R6 | −1.81 |
| V3/V2 | 1.00 | f2/f4 | −0.50 |
| V3/V4 | 1.00 | f23/f | 1.06 |
| V4/V1 | 1.00 | CRA [deg.] | 31.7 |
| V4/V2 | 1.00 | Y42/Y11 | 1.38 |
| V4/V3 | 1.00 | Yc42/Y42 | 0.75 |
| CT2/CT4 | 1.09 | Ymax/Ymin | 1.56 |
| CT4/CT3 | 0.52 | — | — |

7th Embodiment

Figure 13:
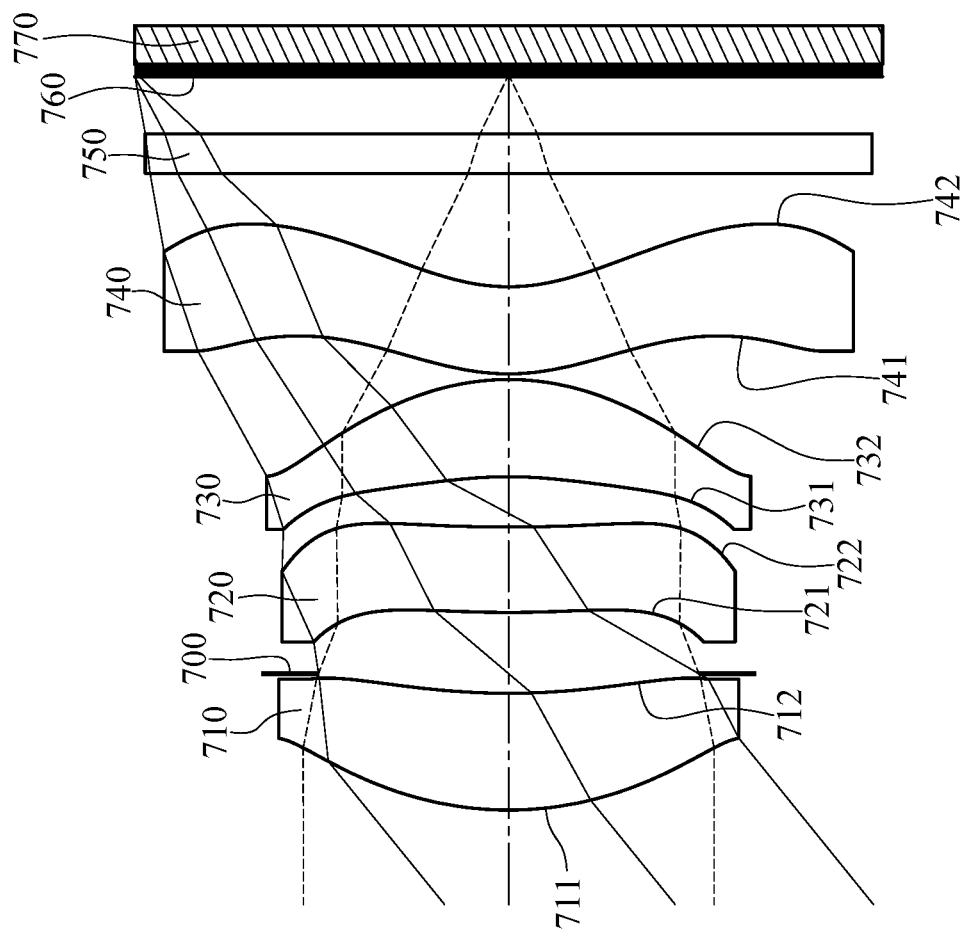
FIG. 13 is a schematic view of an image capturing unit according to the 7th embodiment of the present disclosure.
Figure 14:
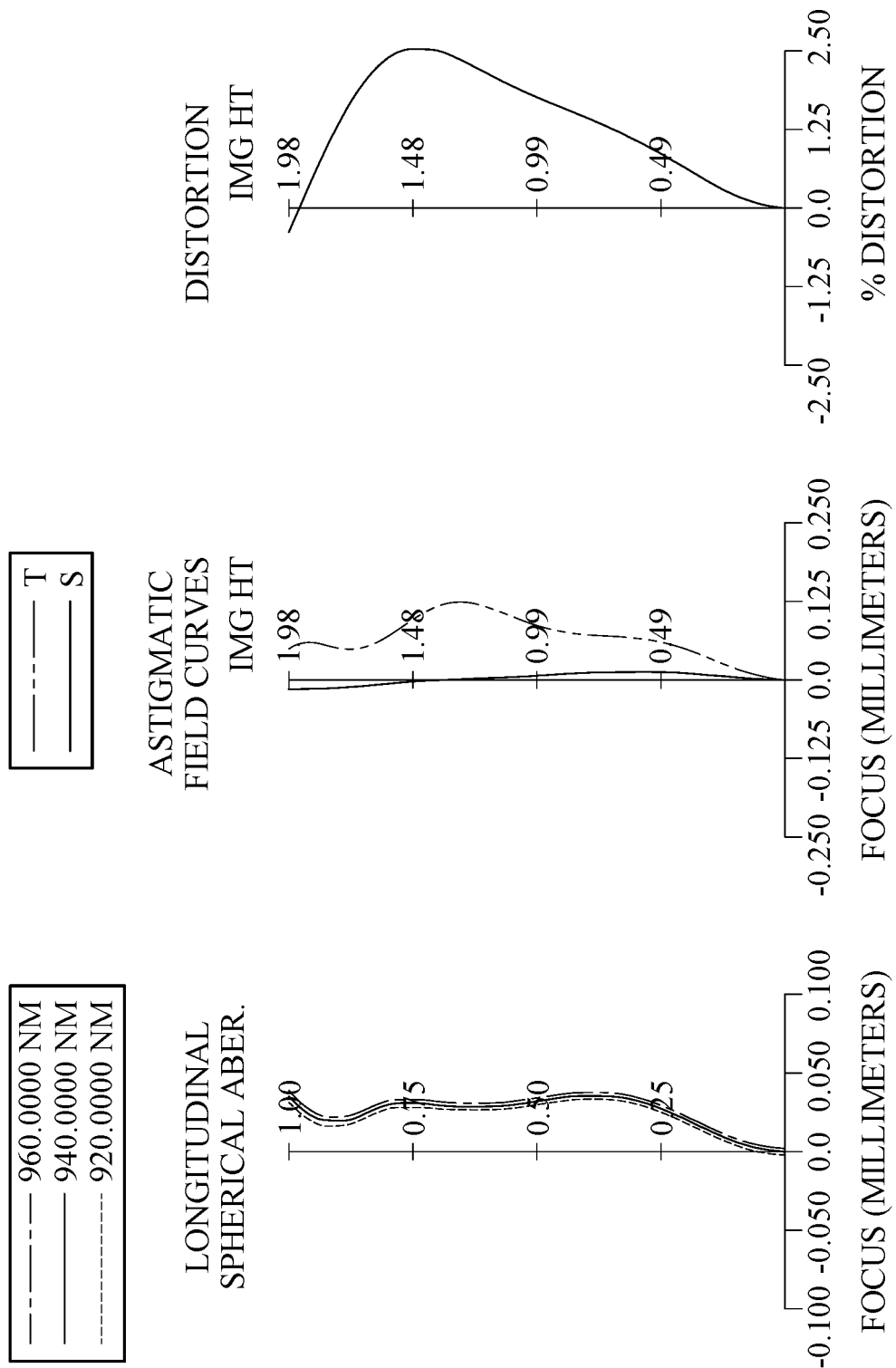
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging optical lens assembly (its reference numeral is omitted) of the present disclosure and an image sensor 770. The imaging optical lens assembly includes, in order from an object side to an image side, a first lens element 710, an aperture stop 700, a second lens element 720, a third lens element 730, a fourth lens element 740, a filter 750 and an image surface 760. The imaging optical lens assembly includes four single and non-cemented lens elements (710, 720, 730 and 740) with no additional lens element disposed between each of the adjacent four lens elements, wherein there is an air gap between every adjacent lens element.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has one inflection point. The image-side surface 712 of the first lens element 710 has one inflection point. The image-side surface 712 of the first lens element 710 has one critical point in an off-axis region thereof.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has one inflection point. The image-side surface 722 of the second lens element 720 has one inflection point. The object-side surface 721 of the second lens element 720 has one critical point in an off-axis region thereof. The image-side surface 722 of the second lens element 720 has one critical point in an off-axis region thereof.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric. The image-side surface 732 of the third lens element 730 has one inflection point.

The fourth lens element 740 with positive refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The object-side surface 741 of the fourth lens element 740 has two inflection points. The image-side surface 742 of the fourth lens element 740 has two inflection points. The object-side surface 741 of the fourth lens element 740 has one critical point in an off-axis region thereof. The image-side surface 742 of the fourth lens element 740 has one critical point in an off-axis region thereof.

The filter 750 is made of glass material and located between the fourth lens element 740 and the image surface 760, and will not affect the focal length of the imaging optical lens assembly. The image sensor 770 is disposed on or near the image surface 760 of the imaging optical lens assembly.

In this embodiment, each of the first lens element 710, the second lens element 720, the third lens element 730 and the fourth lens element 740 has an Abbe number smaller than 38.0.

The detailed optical data of the 7th embodiment are shown in Table 13 and the aspheric surface data are shown in Table 14 below.

TABLE 13

7th Embodiment
f = 2.43 mm, Fno = 1.12, HFOV = 39.0 deg.

| Surface # | | Curvature Radius | | Thickness | Material | Index | Abbe # | Focal Length |
|---|---|---|---|---|---|---|---|---|
| 0 | Object | Plano | | 800.000 | | | | |
| 1 | Lens 1 | 1.782 | (ASP) | 0.618 | Plastic | 1.634 | 20.4 | 4.80 |
| 2 | | 3.724 | (ASP) | 0.104 | | | | |

TABLE 13-continued

7th Embodiment
f = 2.43 mm, Fno = 1.12, HFOV = 39.0 deg.

| Surface # | | Curvature Radius | | Thickness | Material | Index | Abbe # | Focal Length |
|---|---|---|---|---|---|---|---|---|
| 3 | Ape. Stop | Plano | | 0.324 | | | | |
| 4 | Lens 2 | 6.269 | (ASP) | 0.452 | Plastic | 1.634 | 20.4 | 27.20 |
| 5 | | 9.571 | (ASP) | 0.266 | | | | |
| 6 | Lens 3 | −2.146 | (ASP) | 0.514 | Plastic | 1.634 | 20.4 | 4.55 |
| 7 | | −1.345 | (ASP) | 0.030 | | | | |
| 8 | Lens 4 | 1.164 | (ASP) | 0.461 | Plastic | 1.634 | 20.4 | 92.65 |
| 9 | | 1.005 | (ASP) | 0.600 | | | | |
| 10 | Filter | Plano | | 0.210 | Glass | 1.508 | 64.2 | — |
| 11 | | Plano | | 0.301 | | | | |
| 12 | Image | Plano | | — | | | | |

Note:
Reference wavelength is 940.0 nm (infrared light).

TABLE 14

Aspheric Coefficients

| Surface # | 1 | 2 | 4 | 5 |
|---|---|---|---|---|
| k = | −1.2893E+01 | −9.0000E+01 | −2.2139E+01 | 3.3826E+00 |
| A4 = | 2.2871E−01 | 1.6683E−01 | −7.3375E−02 | 5.4816E−02 |
| A6 = | −2.4028E−01 | −4.0477E−01 | −1.5177E−01 | −2.2642E−01 |
| A8 = | 2.1108E−01 | 5.9157E−01 | 9.2074E−02 | 2.1095E−01 |
| A10 = | −1.3519E−01 | −5.7646E−01 | −1.5585E−01 | −2.5098E−01 |
| A12 = | 5.5456E−02 | 2.8573E−01 | 1.3923E−01 | 1.4176E−01 |
| A14 = | −1.3529E−02 | −5.5730E−02 | −4.7814E−02 | −2.8793E−02 |

| Surface # | 6 | 7 | 8 | 9 |
|---|---|---|---|---|
| k = | −4.4915E−01 | −7.7853E+00 | −1.0411E+00 | −1.0137E+00 |
| A4 = | 4.0922E−01 | −3.3273E−01 | −3.8417E−01 | −3.4100E−01 |
| A6 = | −8.3288E−01 | 4.6037E−01 | 3.0207E−01 | 1.8811E−01 |
| A8 = | 1.2783E+00 | −4.5714E−01 | −2.6437E−01 | −8.7294E−02 |
| A10 = | −1.2795E+00 | 2.8179E−01 | 1.6999E−01 | 2.7090E−02 |
| A12 = | 6.4285E−01 | −9.7385E−02 | −6.6814E−02 | −4.9494E−03 |
| A14 = | −1.2488E−01 | 1.7012E−02 | 1.4253E−02 | 3.6576E−04 |
| A16 = | — | — | −1.2491E−03 | 7.2374E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.43 | T23/CT3 | 0.52 |
| Fno | 1.12 | TL [mm] | 3.88 |
| HFOV [deg.] | 39.0 | TL/EPD | 1.79 |
| V1 | 20.4 | TL/ImgH | 1.96 |
| V2 | 20.4 | R2/R1 | 2.09 |
| V3 | 20.4 | R3/f | 2.58 |
| V4 | 20.4 | R3/R4 | 0.65 |
| Vmax | 20.4 | R6/R7 | −1.16 |
| V1 + V2 + V3 + V4 | 81.6 | R7/R8 | 1.16 |
| V1/V2 | 1.00 | f/f1 | 0.51 |
| V1/V3 | 1.00 | f/f2 | 0.09 |
| V1/V4 | 1.00 | f/f3 | 0.53 |
| V2/V1 | 1.00 | f/f4 | 0.03 |
| V2/V3 | 1.00 | f/f1 + f/f2 | 0.60 |
| V2/V4 | 1.00 | f/f3 + f/f4 | 0.56 |
| V3/V1 | 1.00 | f/R6 | −1.80 |
| V3/V2 | 1.00 | f2/f4 | 0.29 |
| V3/V4 | 1.00 | f23/f | 1.70 |
| V4/V1 | 1.00 | CRA [deg.] | 27.8 |
| V4/V2 | 1.00 | Y42/Y11 | 1.50 |
| V4/V3 | 1.00 | Yc42/Y42 | 0.75 |
| CT2/CT4 | 0.98 | Ymax/Ymin | 1.77 |
| CT4/CT3 | 0.90 | — | — |

8th Embodiment

Figure 15:
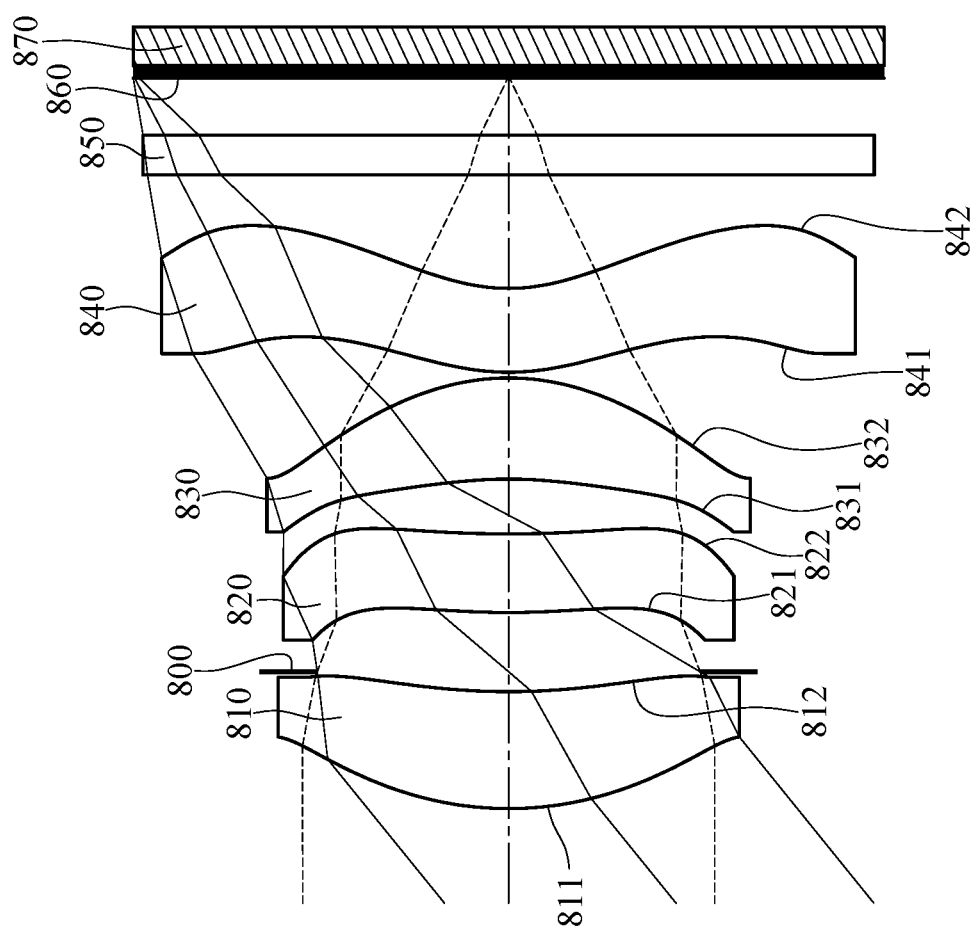
FIG. 15 is a schematic view of an image capturing unit according to the 8th embodiment of the present disclosure.
Figure 16:
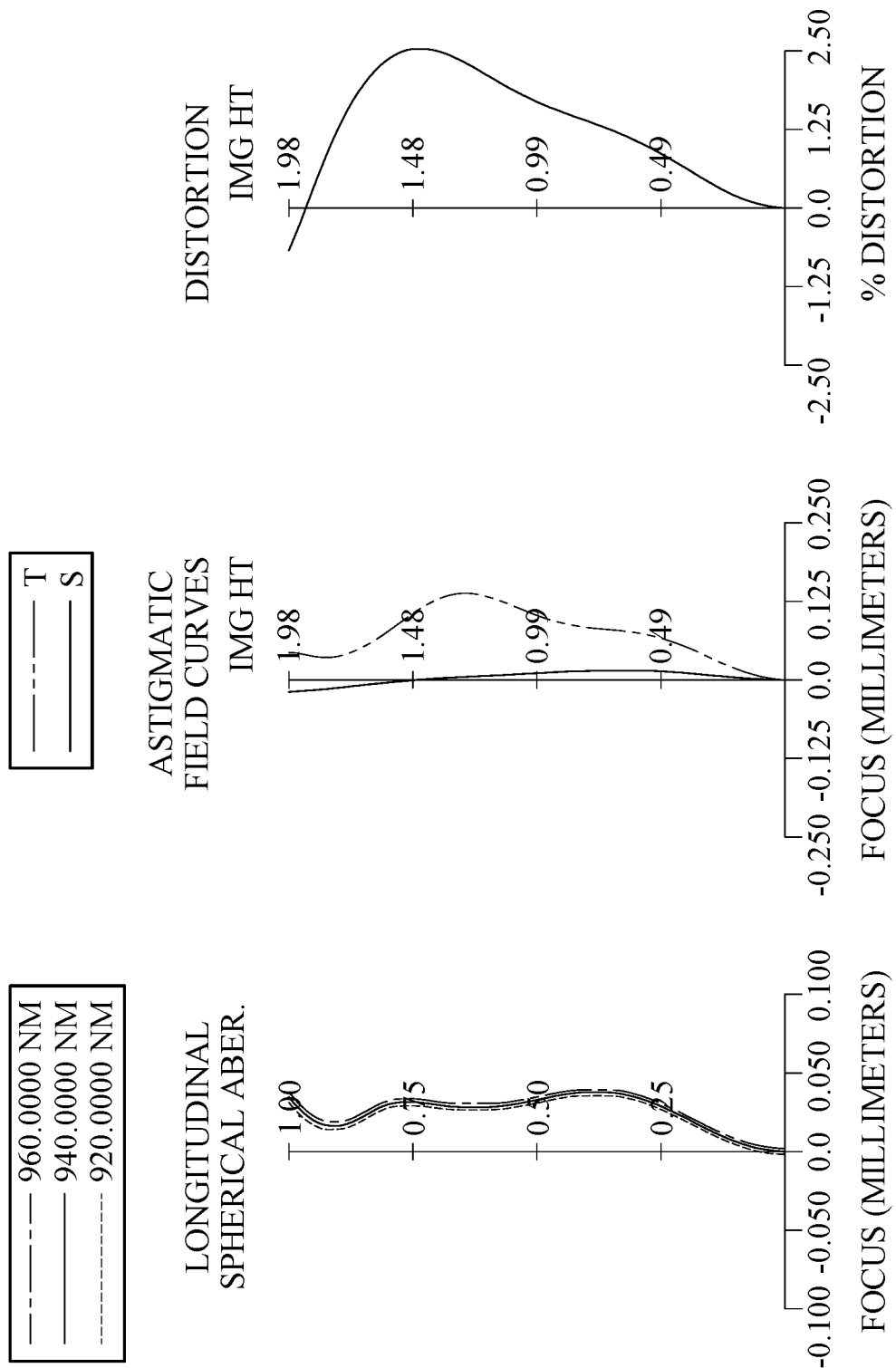
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging optical lens assembly (its reference numeral is omitted) of the present disclosure and an image sensor 870. The imaging optical lens assembly includes, in order from an object side to an image side, a first lens element 810, an aperture stop 800, a second lens element 820, a third lens element 830, a fourth lens element 840, a filter 850 and an image surface 860. The imaging optical lens assembly includes four single and non-cemented lens elements (810, 820, 830 and 840) with no additional lens element disposed between each of the adjacent four lens elements, wherein there is an air gap between every adjacent lens element.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric. The object-side surface 811 of the first lens element 810 has one inflection point. The image-side surface 812 of the first lens element 810 has one inflection point. The image-side surface 812 of the first lens element 810 has one critical point in an off-axis region thereof.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has one inflection point. The image-side surface 822 of the second lens element 820 has one inflection point. The object-side surface 821 of the second lens element 820 has one critical point in an off-axis region thereof. The image-side surface 822 of the second lens element 820 has one critical point in an off-axis region thereof.

The third lens element 830 with positive refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric. The image-side surface 832 of the third lens element 830 has one inflection point. The image-side surface 832 of the third lens element 830 has one critical point in an off-axis region thereof.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. The object-side surface 841 of the fourth lens element 840 has two inflection points. The image-side surface 842 of the fourth lens element 840 has two inflection points. The object-side surface 841 of the fourth lens element 840 has two critical points in an off-axis region thereof. The image-side surface 842 of the fourth lens element 840 has one critical point in an off-axis region thereof.

The filter 850 is made of glass material and located between the fourth lens element 840 and the image surface 860, and will not affect the focal length of the imaging optical lens assembly. The image sensor 870 is disposed on or near the image surface 860 of the imaging optical lens assembly.

In this embodiment, each of the first lens element 810, the second lens element 820, the third lens element 830 and the fourth lens element 840 has an Abbe number smaller than 38.0.

The detailed optical data of the 8th embodiment are shown in Table 15 and the aspheric surface data are shown in Table 16 below.

TABLE 15

8th Embodiment
f = 2.44 mm, Fno = 1.12, HFOV = 39.0 deg.

| Surface # | | Curvature Radius | | Thickness | Material | Index | Abbe # | Focal Length |
|---|---|---|---|---|---|---|---|---|
| 0 | Object | Plano | | 800.000 | | | | |
| 1 | Lens 1 | 1.759 | (ASP) | 0.619 | Plastic | 1.617 | 23.5 | 5.04 |
| 2 | | 3.510 | (ASP) | 0.105 | | | | |
| 3 | Ape. Stop | Plano | | 0.314 | | | | |
| 4 | Lens 2 | 4.494 | (ASP) | 0.416 | Plastic | 1.617 | 23.5 | 18.92 |
| 5 | | 7.046 | (ASP) | 0.290 | | | | |
| 6 | Lens 3 | −2.227 | (ASP) | 0.535 | Plastic | 1.617 | 23.5 | 3.69 |
| 7 | | −1.229 | (ASP) | 0.030 | | | | |
| 8 | Lens 4 | 1.245 | (ASP) | 0.444 | Plastic | 1.617 | 23.5 | −20.11 |
| 9 | | 0.978 | (ASP) | 0.600 | | | | |
| 10 | Filter | Plano | | 0.210 | Glass | 1.508 | 64.2 | — |
| 11 | | Plano | | 0.302 | | | | |
| 12 | Image | Plano | | — | | | | |

Note:
Reference wavelength is 940.0 nm (infrared light).

TABLE 16

Aspheric Coefficients

| Surface # | 1 | 2 | 4 | 5 |
|---|---|---|---|---|
| k = | −1.2881E+01 | −9.0000E+01 | −4.8823E+00 | −8.1405E+00 |
| A4 = | 2.3348E−01 | 1.9203E−01 | −7.1810E−02 | 7.6502E−02 |
| A6 = | −2.4480E−01 | −4.9061E−01 | −1.4607E−01 | −3.1576E−01 |
| A8 = | 2.0380E−01 | 7.5071E−01 | 2.6852E−02 | 4.2808E−01 |
| A10 = | −1.1895E−01 | −7.5333E−01 | −6.3763E−02 | −5.5621E−01 |
| A12 = | 4.3501E−02 | 3.8843E−01 | 4.7698E−02 | 3.3548E−01 |
| A14 = | −1.0500E−02 | −7.9403E−02 | −7.7635E−03 | −7.3061E−02 |

| Surface # | 6 | 7 | 8 | 9 |
|---|---|---|---|---|
| k = | −1.7544E−02 | −2.6419E+00 | −8.8281E−01 | −1.0665E+00 |
| A4 = | 3.2432E−01 | −5.5264E−02 | −3.4017E−01 | −3.8304E−01 |
| A6 = | −4.6913E−01 | −4.2963E−02 | 1.8661E−01 | 2.6189E−01 |
| A8 = | 2.2019E−01 | 1.0586E−01 | −1.1299E−01 | −1.4928E−01 |
| A10 = | 6.4603E−01 | −3.6683E−02 | 6.0287E−02 | 5.8434E−02 |
| A12 = | −1.3503E+00 | −7.4580E−02 | −2.4110E−02 | −1.4461E−02 |
| A14 = | 9.2906E−01 | 7.1589E−02 | 5.8607E−03 | 1.9232E−03 |
| A16 = | −2.1884E−01 | −1.6360E−02 | −5.9363E−04 | −9.6221E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.44 | T23/CT3 | 0.54 |
| Fno | 1.12 | TL [mm] | 3.87 |
| HFOV [deg.] | 39.0 | TL/EPD | 1.77 |
| V1 | 23.5 | TL/ImgH | 1.96 |
| V2 | 23.5 | R2/R1 | 2.00 |
| V3 | 23.5 | R3/f | 1.85 |
| V4 | 23.5 | R3/R4 | 0.64 |

-continued

| 8th Embodiment | | | |
|---|---|---|---|
| Vmax | 23.5 | R6/R7 | −0.99 |
| V1 + V2 + V3 + V4 | 94.0 | R7/R8 | 1.27 |
| V1/V2 | 1.00 | f/f1 | 0.48 |
| V1/V3 | 1.00 | f/f2 | 0.13 |
| V1/V4 | 1.00 | f/f3 | 0.66 |
| V2/V1 | 1.00 | f/f4 | −0.12 |
| V2/V3 | 1.00 | f/f1 + f/f2 | 0.61 |
| V2/V4 | 1.00 | f/f3 + f/f4 | 0.54 |
| V3/V1 | 1.00 | f/R6 | −1.98 |
| V3/V2 | 1.00 | f2/f4 | −0.94 |
| V3/V4 | 1.00 | f23/f | 1.36 |
| V4/V1 | 1.00 | CRA [deg.] | 27.6 |
| V4/V2 | 1.00 | Y42/Y11 | 1.50 |
| V4/V3 | 1.00 | Yc42/Y42 | 0.74 |
| CT2/CT4 | 0.94 | Ymax/Ymin | 1.77 |
| CT4/CT3 | 0.83 | — | — |

9th Embodiment

Figure 17:
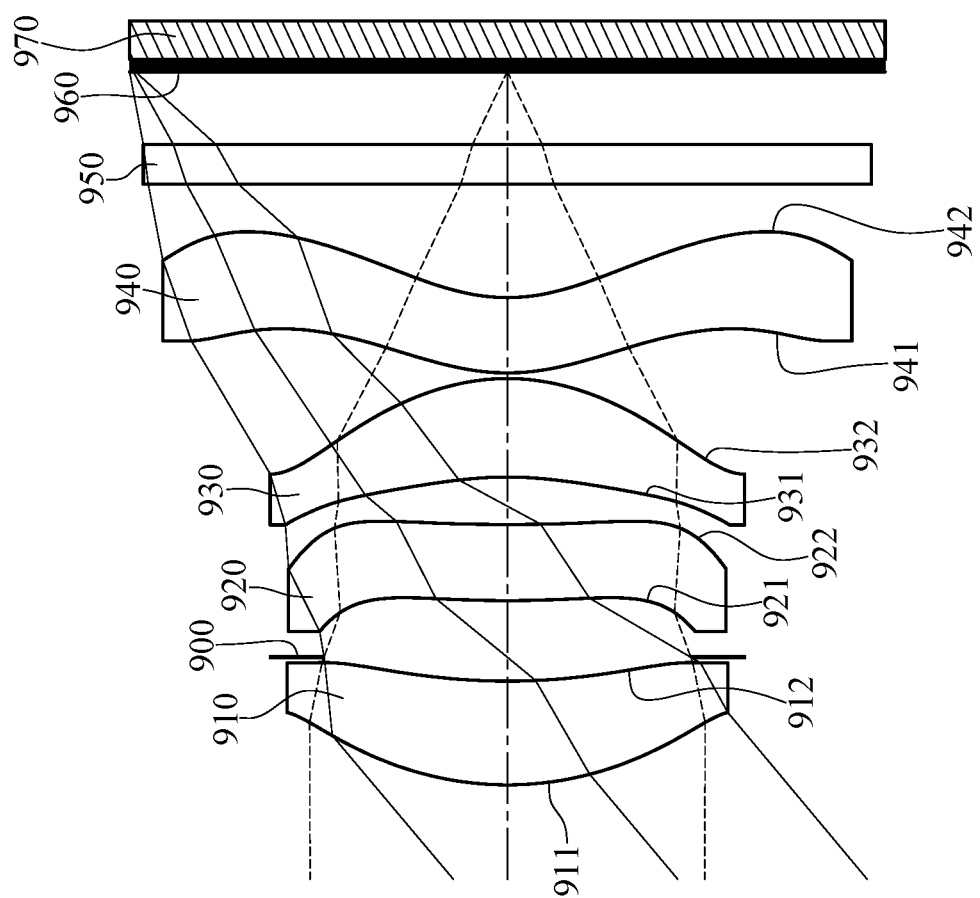
FIG. 17 is a schematic view of an image capturing unit according to the 9th embodiment of the present disclosure.
Figure 18:
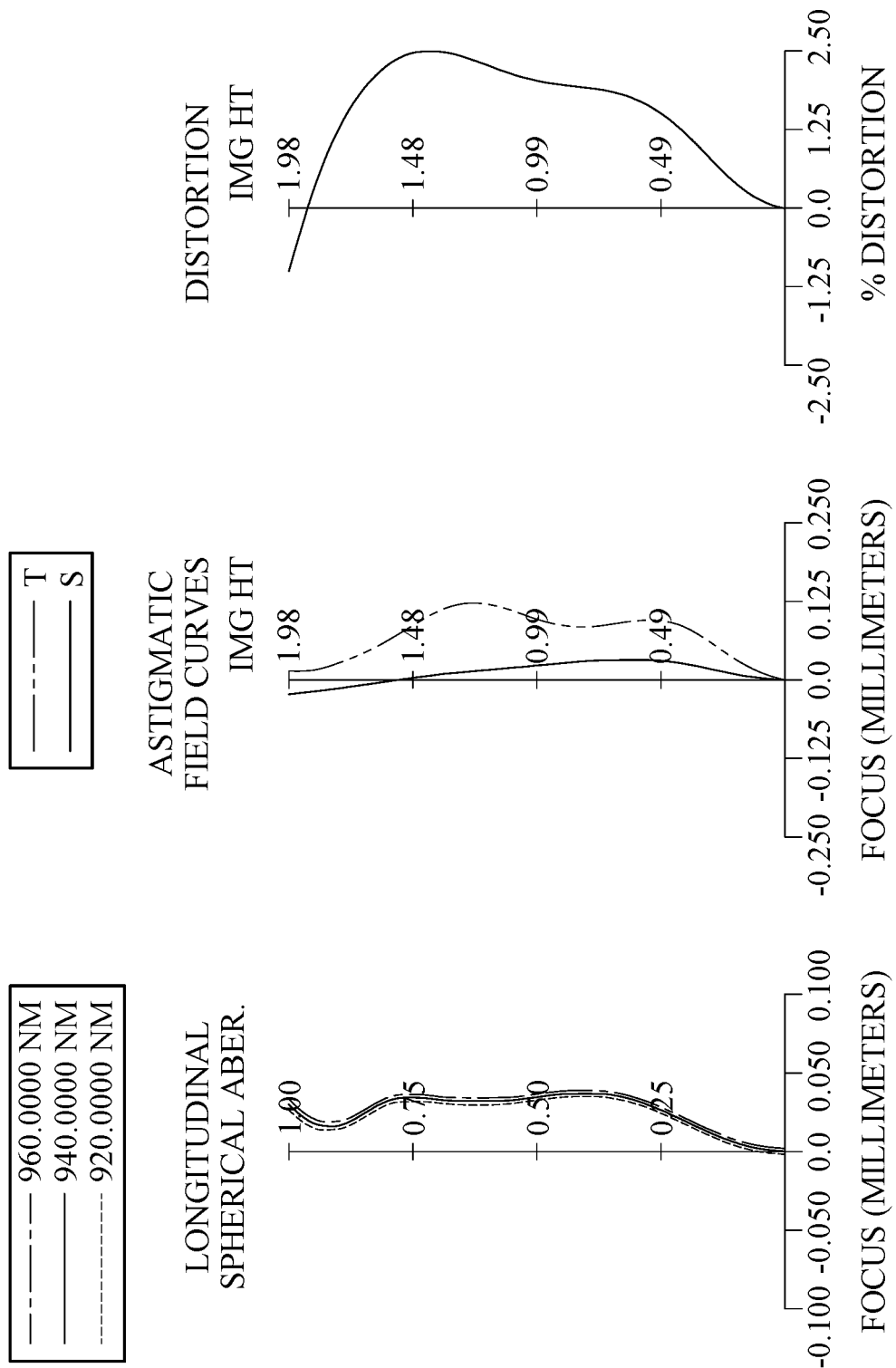
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging optical lens assembly (its reference numeral is omitted) of the present disclosure and an image sensor 970. The imaging optical lens assembly includes, in order from an object side to an image side, a first lens element 910, an aperture stop 900, a second lens element 920, a third lens element 930, a fourth lens element 940, a filter 950 and an image surface 960. The imaging optical lens assembly includes four single and non-cemented lens elements (910, 920, 930 and 940) with no additional lens element disposed between each of the adjacent four lens elements, wherein there is an air gap between every adjacent lens element.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric. The object-side surface 911 of the first lens element 910 has one inflection point. The image-side surface 912 of the first lens element 910 has one inflection point. The image-side surface 912 of the first lens element 910 has one critical point in an off-axis region thereof.

The second lens element 920 with positive refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric. The object-side surface 921 of the second lens element 920 has one inflection point. The image-side surface 922 of the second lens element 920 has one inflection point. The object-side surface 921 of the second lens element 920 has one critical point in an off-axis region thereof. The image-side surface 922 of the second lens element 920 has one critical point in an off-axis region thereof.

The third lens element 930 with positive refractive power has an object-side surface 931 being concave in a paraxial region thereof and an image-side surface 932 being convex in a paraxial region thereof. The third lens element 930 is made of plastic material and has the object-side surface 931 and the image-side surface 932 being both aspheric. The image-side surface 932 of the third lens element 930 has one inflection point. The image-side surface 932 of the third lens element 930 has one critical point in an off-axis region thereof.

The fourth lens element 940 with negative refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric. The object-side surface 941 of the fourth lens element 940 has two inflection points. The image-side surface 942 of the fourth lens element 940 has two inflection points. The object-side surface 941 of the fourth lens element 940 has one critical point in an off-axis region thereof. The image-side surface 942 of the fourth lens element 940 has one critical point in an off-axis region thereof.

The filter 950 is made of glass material and located between the fourth lens element 940 and the image surface 960, and will not affect the focal length of the imaging optical lens assembly. The image sensor 970 is disposed on or near the image surface 960 of the imaging optical lens assembly.

In this embodiment, each of the first lens element 910, the second lens element 920, the third lens element 930 and the fourth lens element 940 has an Abbe number smaller than 38.0.

The detailed optical data of the 9th embodiment are shown in Table 17 and the aspheric surface data are shown in Table 18 below.

TABLE 17

9th Embodiment
f = 2.35 mm, Fno = 1.13, HFOV = 40.0 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Lens 1 | 1.688 | (ASP) | 0.549 | Plastic | 1.617 | 23.5 | 5.02 |
| 2 | | 3.244 | (ASP) | 0.126 | | | | |
| 3 | Ape. Stop | Plano | | 0.300 | | | | |
| 4 | Lens 2 | 5.657 | (ASP) | 0.403 | Plastic | 1.617 | 23.5 | 18.26 |
| 5 | | 11.049 | (ASP) | 0.251 | | | | |
| 6 | Lens 3 | −1.861 | (ASP) | 0.521 | Plastic | 1.617 | 23.5 | 3.67 |
| 7 | | −1.130 | (ASP) | 0.030 | | | | |
| 8 | Lens 4 | 1.152 | (ASP) | 0.398 | Plastic | 1.634 | 20.4 | −35.02 |
| 9 | | 0.948 | (ASP) | 0.600 | | | | |

TABLE 17-continued

9th Embodiment
f = 2.35 mm, Fno = 1.13, HFOV = 40.0 deg.

| Surface # | | Curvature Radius | Thickness | Material | Index | Abbe # | Focal Length |
|---|---|---|---|---|---|---|---|
| 10 | Filter | Plano | 0.210 | Glass | 1.508 | 64.2 | — |
| 11 | | Plano | 0.384 | | | | |
| 12 | Image | Plano | — | | | | |

Note:
Reference wavelength is 940.0 nm (infrared light).

TABLE 18

Aspheric Coefficients

| Surface # | 1 | 2 | 4 | 5 |
|---|---|---|---|---|
| k = | −1.3734E+01 | −8.9657E+01 | 8.3485E+00 | 7.5718E+01 |
| A4 = | 2.9002E−01 | 2.4773E−01 | −8.3998E−02 | 7.1788E−02 |
| A6 = | −3.6358E−01 | −6.2436E−01 | −1.2310E−01 | −2.9357E−01 |
| A8 = | 3.9483E−01 | 1.0104E+00 | −2.4484E−01 | 2.6791E−01 |
| A10 = | −3.0580E−01 | −1.0381E+00 | 5.7322E−01 | −1.2575E−01 |
| A12 = | 1.4923E−01 | 5.3402E−01 | −6.6121E−01 | −2.5169E−01 |
| A14 = | −3.8456E−02 | −1.0790E−01 | 2.7122E−01 | 2.8788E−01 |
| A16 = | — | — | — | −8.1170E−02 |

| Surface # | 6 | 7 | 8 | 9 |
|---|---|---|---|---|
| k = | −1.5061E+00 | −2.2318E+00 | −8.7602E−01 | −1.1328E+00 |
| A4 = | 3.9047E−01 | 7.1618E−02 | −3.1363E−01 | −3.7316E−01 |
| A6 = | −7.5768E−01 | −5.5409E−01 | 1.0677E−01 | 2.5056E−01 |
| A8 = | 8.4409E−01 | 1.2616E+00 | −1.6117E−02 | −1.4060E−01 |
| A10 = | −1.4242E−01 | −1.6599E+00 | −3.5388E−03 | 5.6171E−02 |
| A12 = | −7.6366E−01 | 1.2907E+00 | 9.7430E−05 | −1.4672E−02 |
| A14 = | 7.1453E−01 | −5.2636E−01 | 8.0087E−04 | 2.1287E−03 |
| A16 = | −1.9294E−01 | 8.7082E−02 | −1.4584E−04 | −1.2382E−04 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

9th Embodiment

| f [mm] | 2.35 | T23/CT3 | 0.48 |
|---|---|---|---|
| Fno | 1.13 | TL [mm] | 3.77 |
| HFOV [deg.] | 40.0 | TL/EPD | 1.80 |
| V1 | 23.5 | TL/ImgH | 1.91 |
| V2 | 23.5 | R2/R1 | 1.92 |
| V3 | 23.5 | R3/f | 2.41 |
| V4 | 20.4 | R3/R4 | 0.51 |
| Vmax | 23.5 | R6/R7 | −0.98 |
| V1 + V2 + V3 + V4 | 90.9 | R7/R8 | 1.21 |
| V1/V2 | 1.00 | f/f1 | 0.47 |
| V1/V3 | 1.00 | f/f2 | 0.13 |
| V1/V4 | 1.15 | f/f3 | 0.64 |
| V2/V1 | 1.00 | f/f4 | −0.07 |
| V2/V3 | 1.00 | f/f1 + f/f2 | 0.60 |
| V2/V4 | 1.15 | f/f3 + f/f4 | 0.57 |
| V3/V1 | 1.00 | f/R6 | −2.08 |
| V3/V2 | 1.00 | f2/f4 | −0.52 |
| V3/V4 | 1.15 | f23/f | 1.39 |
| V4/V1 | 0.87 | CRA [deg.] | 28.7 |
| V4/V2 | 0.87 | Y42/Y11 | 1.56 |
| V4/V3 | 0.87 | Yc42/Y42 | 0.75 |
| CT2/CT4 | 1.01 | Ymax/Ymin | 1.84 |
| CT4/CT3 | 0.76 | — | — |

10th Embodiment

Figure 19:
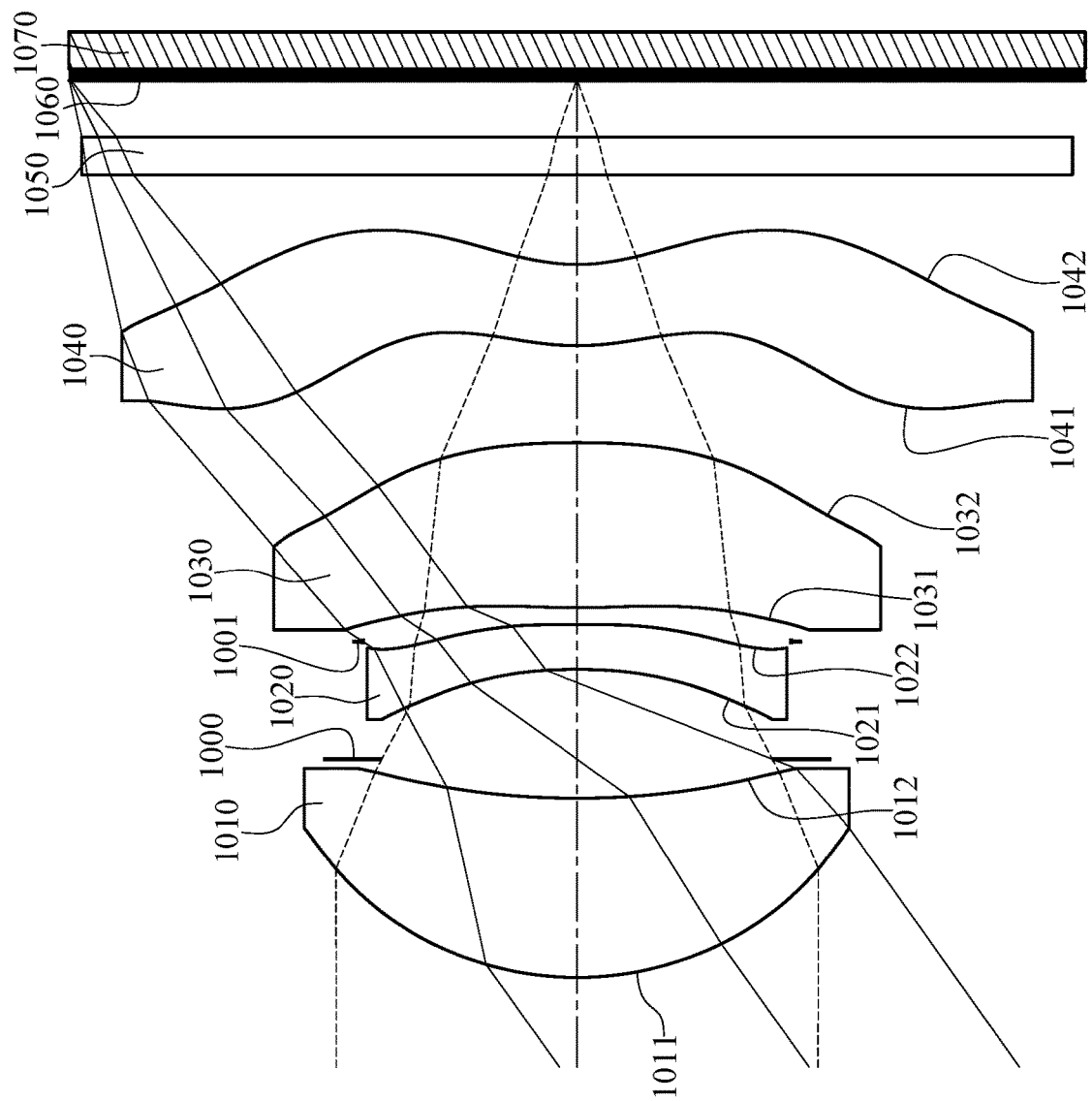
FIG. 19 is a schematic view of an image capturing unit according to the 10th embodiment of the present disclosure.
Figure 20:
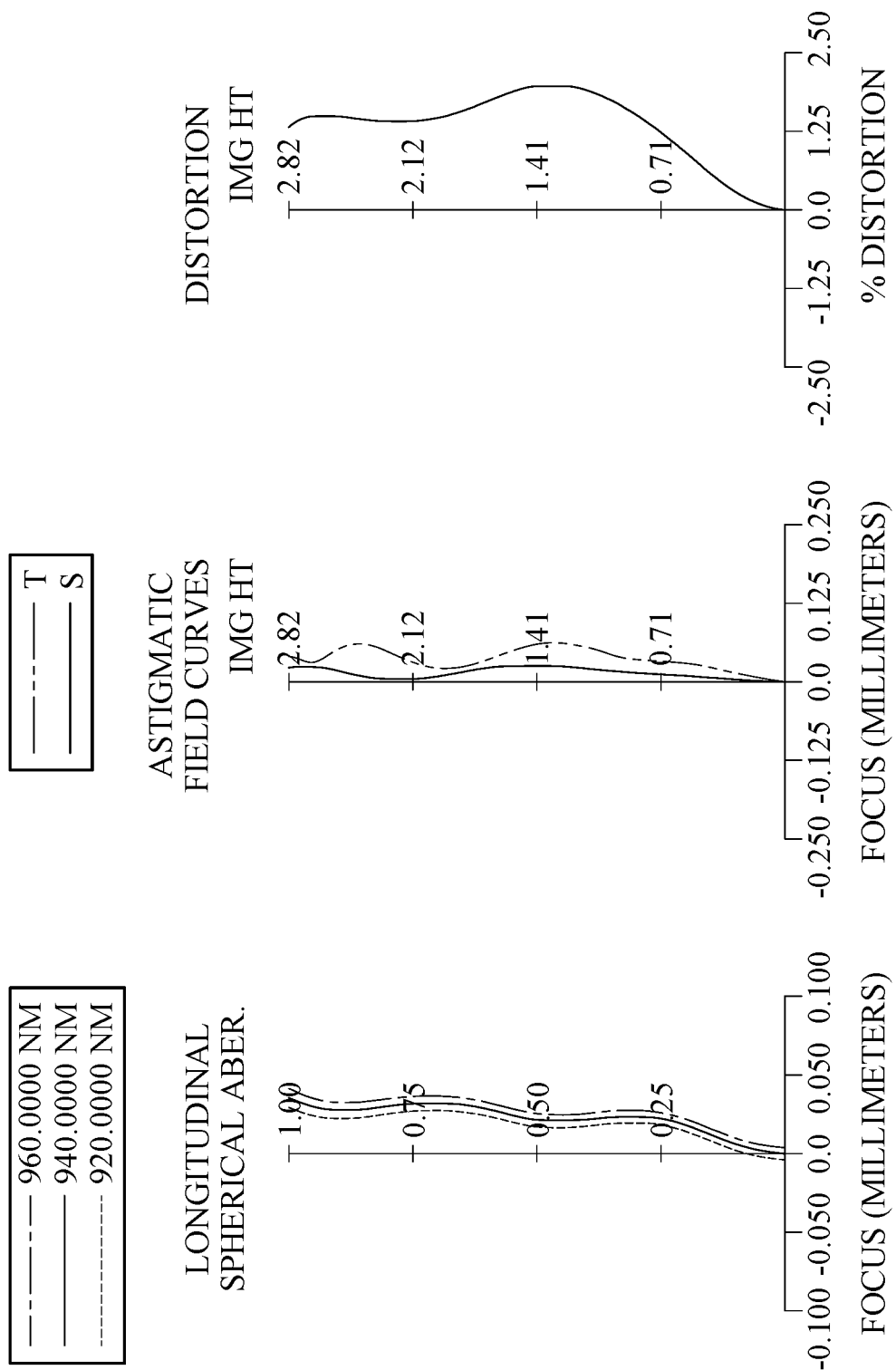
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the imaging optical lens assembly (its reference numeral is omitted) of the present disclosure and an image sensor 1070. The imaging optical lens assembly includes, in order from an object side to an image side, a first lens element 1010, an aperture stop 1000, a second lens element 1020, a stop 1001, a third lens element 1030, a fourth lens element 1040, a filter 1050 and an image surface 1060. The imaging optical lens assembly includes four single and non-cemented lens elements (1010, 1020, 1030 and 1040) with no additional lens element disposed between each of the adjacent four lens elements, wherein there is an air gap between every adjacent lens element.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric. The object-side surface 1011 of the first lens element 1010 has one inflection point. The image-side surface 1012 of the first lens element 1010 has one inflection point.

The second lens element 1020 with negative refractive power has an object-side surface 1021 being concave in a paraxial region thereof and an image-side surface 1022 being convex in a paraxial region thereof. The second lens element 1020 is made of plastic material and has the object-side surface 1021 and the image-side surface 1022 being both aspheric. The image-side surface 1022 of the second lens element 1020 has one inflection point. The image-side surface 1022 of the second lens element 1020 has one critical point in an off-axis region thereof.

The third lens element 1030 with positive refractive power has an object-side surface 1031 being convex in a paraxial region thereof and an image-side surface 1032 being convex in a paraxial region thereof. The third lens element 1030 is made of plastic material and has the object-side surface 1031 and the image-side surface 1032 being both aspheric. The object-side surface 1031 of the third lens element 1030 has one inflection point. The image-side surface 1032 of the third lens element 1030 has two inflection points. The object-side surface 1031 of the third lens element 1030 has one critical point in an off-axis region thereof.

The fourth lens element 1040 with negative refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric. The object-side surface 1041 of the fourth lens element 1040 has three inflection points. The image-side surface 1042 of the fourth lens element 1040 has three inflection points. The object-side surface 1041 of the fourth lens element 1040 has two critical points in an off-axis region thereof. The image-side surface 1042 of the fourth lens element 1040 has one critical point in an off-axis region thereof.

The filter 1050 is made of glass material and located between the fourth lens element 1040 and the image surface 1060, and will not affect the focal length of the imaging optical lens assembly. The image sensor 1070 is disposed on or near the image surface 1060 of the imaging optical lens assembly.

In this embodiment, each of the first lens element 1010, the second lens element 1020, the third lens element 1030 and the fourth lens element 1040 has an Abbe number smaller than 38.0.

The detailed optical data of the 10th embodiment are shown in Table 19 and the aspheric surface data are shown in Table 20 below.

TABLE 19

| 10th Embodiment<br>f = 3.86 mm, Fno = 1.45, HFOV = 35.4 deg. | | | | | | | |
|---|---|---|---|---|---|---|---|
| Surface # | | Curvature Radius | Thickness | Material | Index | Abbe # | Focal Length |
| 0 | Object | Plano | 700.000 | | | | |
| 1 | Lens 1 | 1.821 (ASP) | 0.999 | Plastic | 1.641 | 19.4 | 4.13 |
| 2 | | 4.577 (ASP) | 0.217 | | | | |
| 3 | Ape. Stop | Plano | 0.500 | | | | |
| 4 | Lens 2 | −2.683 (ASP) | 0.249 | Plastic | 1.641 | 19.4 | −5.07 |
| 5 | | −15.870 (ASP) | −0.096 | | | | |
| 6 | Stop | Plano | 0.189 | | | | |
| 7 | Lens 3 | 5.060 (ASP) | 0.920 | Plastic | 1.641 | 19.4 | 4.31 |
| 8 | | −5.648 (ASP) | 0.539 | | | | |
| 9 | Lens 4 | 1.496 (ASP) | 0.454 | Plastic | 1.594 | 26.0 | −12.60 |
| 10 | | 1.106 (ASP) | 0.500 | | | | |
| 11 | Filter | Plano | 0.210 | Glass | 1.508 | 64.2 | — |
| 12 | | Plano | 0.312 | | | | |
| 13 | Image | Plano | — | | | | |

Note:
Reference wavelength is 940.0 nm (infrared light).
An effective radius of the stop 1001 (Surface 6) is 1.190 mm.

TABLE 20

| Aspheric Coefficients | | | | |
|---|---|---|---|---|
| Surface # | 1 | 2 | 4 | 5 |
| k = | −2.3356E+00 | −9.7723E+01 | 3.2723E+00 | 8.8509E+01 |
| A4 = | 3.5002E−02 | 1.1847E−01 | −1.9435E−01 | −4.9820E−01 |
| A6 = | 5.5809E−02 | −1.7396E−01 | 6.7665E−01 | 1.1210E+00 |
| A8 = | −1.1341E−01 | 2.4796E−01 | −1.5539E+00 | −1.7258E+00 |
| A10 = | 1.3085E−01 | −2.6801E−01 | 2.2895E+00 | 1.7470E+00 |
| A12 = | −8.2989E−02 | 1.9223E−01 | −1.9304E+00 | −9.9322E−01 |
| A14 = | 2.7706E−02 | −8.0202E−02 | 8.6694E−01 | 2.7836E−01 |
| A16 = | −3.7744E−03 | 1.4114E−02 | −1.6308E−01 | −2.6841E−02 |
| Surface # | 7 | 8 | 9 | 10 |
| k = | −4.2452E+00 | −2.0578E+01 | −6.3350E+00 | −2.2912E+00 |
| A4 = | −3.5407E−01 | −2.0389E−01 | −2.7830E−01 | −3.1310E−01 |
| A6 = | 3.4634E−01 | 2.4154E−01 | 6.1580E−02 | 2.0928E−01 |
| A8 = | 3.2188E−01 | −3.4543E−01 | 4.8413E−03 | −1.1135E−01 |
| A10 = | −1.9704E+00 | 3.9536E−01 | 4.0584E−03 | 4.2130E−02 |
| A12 = | 3.4515E+00 | −3.1475E−01 | −4.8187E−03 | −1.0555E−02 |
| A14 = | −3.2514E+00 | 1.6370E−01 | 1.5407E−03 | 1.6821E−03 |

TABLE 20-continued

| Aspheric Coefficients | | | | |
|---|---|---|---|---|
| A16 = | 1.7699E+00 | −5.1464E−02 | −2.3829E−04 | −1.6069E−04 |
| A18 = | −5.2621E−01 | 8.7471E−03 | 1.8532E−05 | 8.1627E−06 |
| A20 = | 6.6283E−02 | −6.1424E−04 | −5.8257E−07 | −1.6210E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 3.86 | T23/CT3 | 0.10 |
| Fno | 1.45 | TL [mm] | 4.99 |

-continued

| 10th Embodiment | | | |
|---|---|---|---|
| HFOV [deg.] | 35.4 | TL/EPD | 1.86 |
| V1 | 19.4 | TL/ImgH | 1.77 |
| V2 | 19.4 | R2/R1 | 2.51 |
| V3 | 19.4 | R3/f | −0.70 |
| V4 | 26.0 | R3/R4 | 0.17 |
| Vmax | 26.0 | R6/R7 | −3.77 |
| V1 + V2 + V3 + V4 | 84.3 | R7/R8 | 1.35 |
| V1/V2 | 1.00 | f/f1 | 0.93 |
| V1/V3 | 1.00 | f/f2 | −0.76 |
| V1/V4 | 0.75 | f/f3 | 0.90 |
| V2/V1 | 1.00 | f/f4 | −0.31 |
| V2/V3 | 1.00 | f/f1 + f/f2 | 0.17 |
| V2/V4 | 0.75 | f/f3 + f/f4 | 0.59 |
| V3/V1 | 1.00 | f/R6 | −0.68 |
| V3/V2 | 1.00 | f2/f4 | 0.40 |
| V3/V4 | 0.75 | f23/f | 4.30 |
| V4/V1 | 1.34 | CRA [deg.] | 26.6 |
| V4/V2 | 1.34 | Y42/Y11 | 1.67 |
| V4/V3 | 1.34 | Yc42/Y42 | 0.43 |

-continued

| 10th Embodiment | | | |
|---|---|---|---|
| CT2/CT4 | 0.55 | Ymax/Ymin | 2.34 |
| CT4/CT3 | 0.49 | — | — |

11th Embodiment

Figure 21:
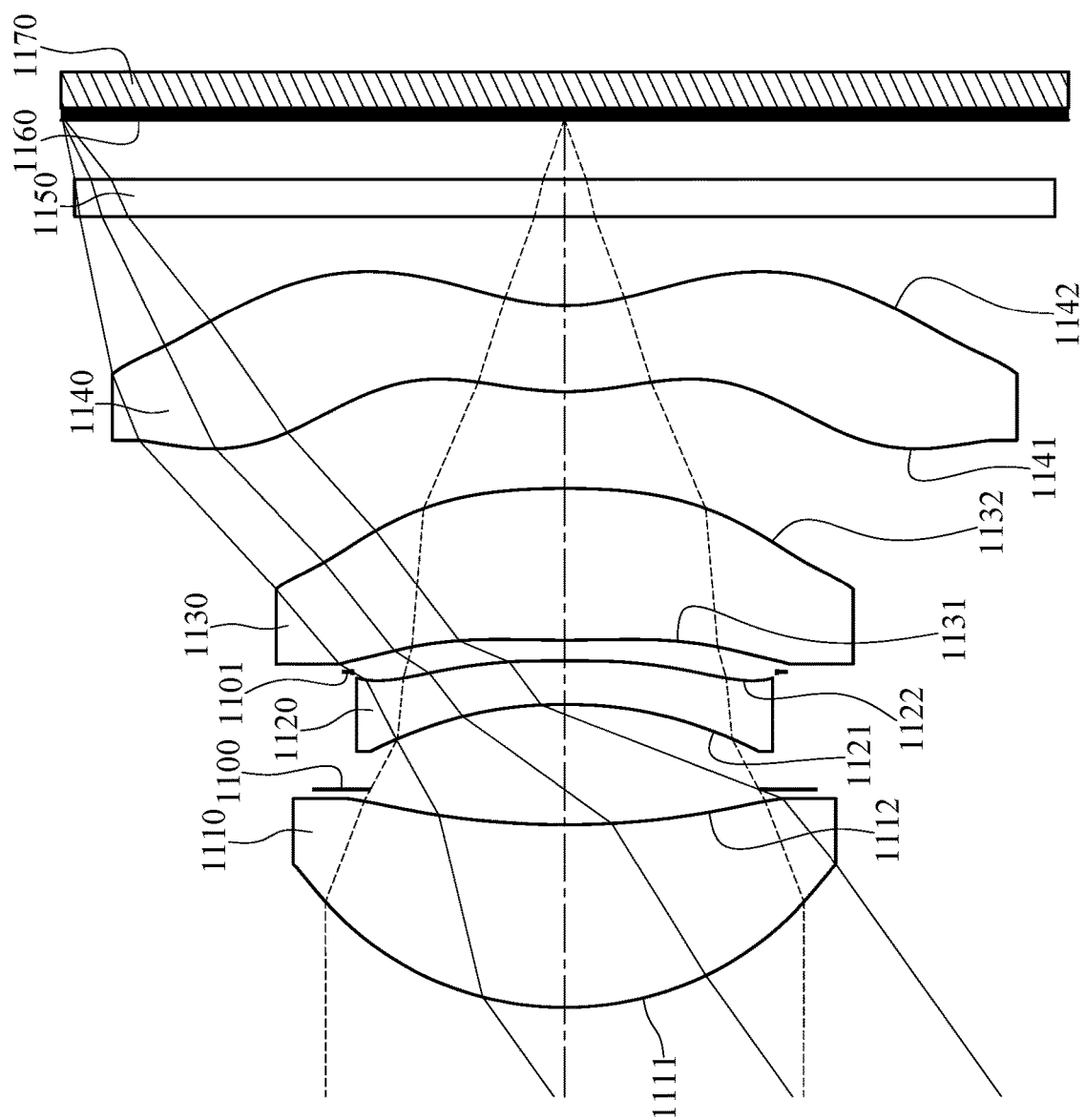
FIG. 21 is a schematic view of an image capturing unit according to the 11th embodiment of the present disclosure.
Figure 22:
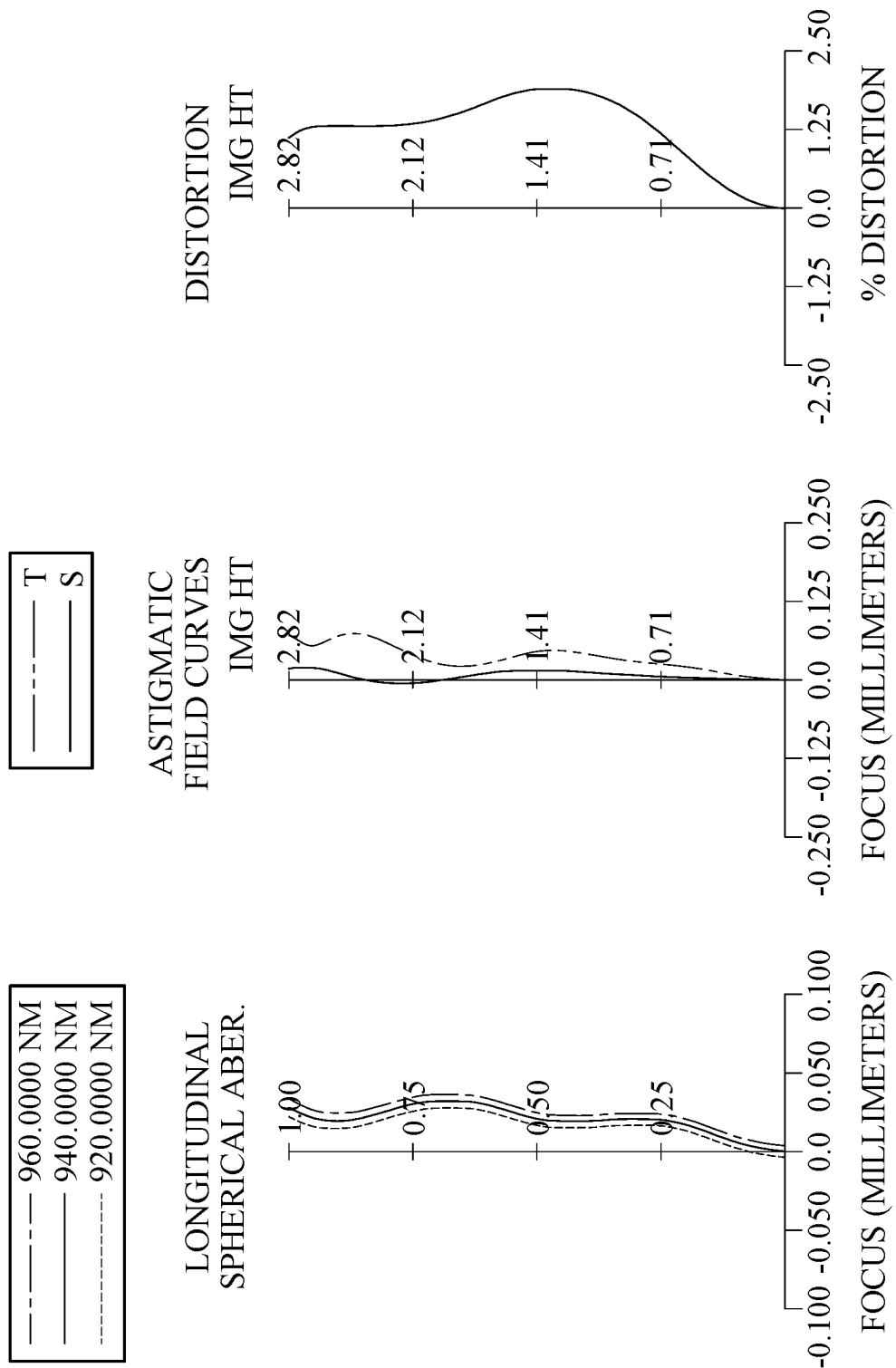
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the imaging optical lens assembly (its reference numeral is omitted) of the present disclosure and an image sensor 1170. The imaging optical lens assembly includes, in order from an object side to an image side, a first lens element 1110, an aperture stop 1100, a second lens element 1120, a stop 1101, a third lens element 1130, a fourth lens element 1140, a filter 1150 and an image surface 1160. The imaging optical lens assembly includes four single and non-cemented lens elements (1110, 1120, 1130 and 1140) with no additional lens element disposed between each of the adjacent four lens elements, wherein there is an air gap between every adjacent lens element.

The first lens element 1110 with positive refractive power has an object-side surface 1111 being convex in a paraxial region thereof and an image-side surface 1112 being concave in a paraxial region thereof. The first lens element 1110 is made of plastic material and has the object-side surface 1111 and the image-side surface 1112 being both aspheric. The object-side surface 1111 of the first lens element 1110 has one inflection point. The image-side surface 1112 of the first lens element 1110 has one inflection point.

The second lens element 1120 with negative refractive power has an object-side surface 1121 being concave in a paraxial region thereof and an image-side surface 1122 being convex in a paraxial region thereof. The second lens element 1120 is made of plastic material and has the object-side surface 1121 and the image-side surface 1122 being both aspheric. The image-side surface 1122 of the second lens element 1120 has one inflection point. The image-side surface 1122 of the second lens element 1120 has one critical point in an off-axis region thereof.

The third lens element 1130 with positive refractive power has an object-side surface 1131 being convex in a paraxial region thereof and an image-side surface 1132 being convex in a paraxial region thereof. The third lens element 1130 is made of plastic material and has the object-side surface 1131 and the image-side surface 1132 being both aspheric. The object-side surface 1131 of the third lens element 1130 has four inflection points. The image-side surface 1132 of the third lens element 1130 has two inflection points. The object-side surface 1131 of the third lens element 1130 has one critical point in an off-axis region thereof.

The fourth lens element 1140 with negative refractive power has an object-side surface 1141 being convex in a paraxial region thereof and an image-side surface 1142 being concave in a paraxial region thereof. The fourth lens element 1140 is made of plastic material and has the object-side surface 1141 and the image-side surface 1142 being both aspheric. The object-side surface 1141 of the fourth lens element 1140 has three inflection points. The image-side surface 1142 of the fourth lens element 1140 has three inflection points. The object-side surface 1141 of the fourth lens element 1140 has two critical points in an off-axis region thereof. The image-side surface 1142 of the fourth lens element 1140 has one critical point in an off-axis region thereof.

The filter 1150 is made of glass material and located between the fourth lens element 1140 and the image surface 1160, and will not affect the focal length of the imaging optical lens assembly. The image sensor 1170 is disposed on or near the image surface 1160 of the imaging optical lens assembly.

In this embodiment, each of the first lens element 1110, the second lens element 1120, the third lens element 1130 and the fourth lens element 1140 has an Abbe number smaller than 38.0.

The detailed optical data of the 11th embodiment are shown in Table 21 and the aspheric surface data are shown in Table 22 below.

TABLE 21

11th Embodiment
f = 3.86 mm, Fno = 1.45, HFOV = 35.5 deg.

| Surface # | | Curvature Radius | | Thickness | Material | Index | Abbe # | Focal Length |
|---|---|---|---|---|---|---|---|---|
| 0 | Object | Plano | | 700.000 | | | | |
| 1 | Lens 1 | 1.832 | (ASP) | 1.030 | Plastic | 1.634 | 20.4 | 4.10 |
| 2 | | 4.848 | (ASP) | 0.196 | | | | |
| 3 | Ape. Stop | Plano | | 0.478 | | | | |
| 4 | Lens 2 | −2.916 | (ASP) | 0.246 | Plastic | 1.634 | 20.4 | −5.79 |
| 5 | | −14.597 | (ASP) | −0.064 | | | | |
| 6 | Stop | Plano | | 0.178 | | | | |
| 7 | Lens 3 | 7.805 | (ASP) | 0.855 | Plastic | 1.634 | 20.4 | 4.87 |
| 8 | | −4.898 | (ASP) | 0.543 | | | | |
| 9 | Lens 4 | 1.558 | (ASP) | 0.485 | Plastic | 1.594 | 26.0 | −13.53 |
| 10 | | 1.154 | (ASP) | 0.500 | | | | |
| 11 | Filter | Plano | | 0.210 | Glass | 1.508 | 64.2 | — |
| 12 | | Plano | | 0.331 | | | | |
| 13 | Image | Plano | | — | | | | |

Note:
Reference wavelength is 940.0 nm (infrared light).
An effective radius of the stop 1101 (Surface 6) is 1.190 mm.

TABLE 22

Aspheric Coefficients

| Surface # | 1 | 2 | 4 | 5 |
|---|---|---|---|---|
| k = | −2.7074E+00 | −9.7097E+01 | 5.0637E+00 | −9.0000E+01 |
| A4 = | 3.9754E−02 | 1.0371E−01 | −1.9049E−01 | −4.4647E−01 |
| A6 = | 5.7041E−02 | −1.4969E−01 | 6.4918E−01 | 1.0772E+00 |
| A8 = | −1.1943E−01 | 2.0262E−01 | −1.3257E+00 | −1.7280E+00 |
| A10 = | 1.3516E−01 | −2.0963E−01 | 1.7213E+00 | 1.7654E+00 |
| A12 = | −8.4216E−02 | 1.4380E−01 | −1.2469E+00 | −9.9936E−01 |
| A14 = | 2.7724E−02 | −5.8533E−02 | 4.5739E−01 | 2.7837E−01 |
| A16 = | −3.7578E−03 | 1.0174E−02 | −6.1970E−02 | −2.6994E−02 |

| Surface # | 7 | 8 | 9 | 10 |
|---|---|---|---|---|
| k = | 1.5477E+00 | −1.4853E+00 | −4.8741E+00 | −1.6510E+00 |
| A4 = | −2.8317E−01 | −2.1393E−01 | −3.2453E−01 | −3.4447E−01 |
| A6 = | 8.5391E−02 | 3.1069E−01 | 1.3588E−01 | 2.1804E−01 |
| A8 = | 1.1385E+00 | −5.3029E−01 | −4.6932E−02 | −1.0547E−01 |
| A10 = | −3.7764E+00 | 6.8891E−01 | 2.3882E−02 | 3.5712E−02 |
| A12 = | 6.0160E+00 | −5.9634E−01 | −9.3968E−03 | −7.9151E−03 |
| A14 = | −5.5581E+00 | 3.2639E−01 | 2.1914E−03 | 1.0792E−03 |
| A16 = | 3.0487E+00 | −1.0614E−01 | −2.9322E−04 | −8.0470E−05 |
| A18 = | −9.2466E−01 | 1.8515E−02 | 2.0990E−05 | 2.3464E−06 |
| A20 = | 1.1953E−01 | −1.3281E−03 | −6.2488E−07 | 1.5400E−08 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 3.86 | T23/CT3 | 0.13 |
| Fno | 1.45 | TL [mm] | 4.99 |
| HFOV [deg.] | 35.5 | TL/EPD | 1.86 |
| V1 | 20.4 | TL/ImgH | 1.77 |
| V2 | 20.4 | R2/R1 | 2.65 |
| V3 | 20.4 | R3/f | −0.75 |
| V4 | 26.0 | R3/R4 | 0.20 |
| Vmax | 26.0 | R6/R7 | −3.14 |
| V1 + V2 + V3 + V4 | 87.2 | R7/R8 | 1.35 |
| V1/V2 | 1.00 | f/f1 | 0.94 |
| V1/V3 | 1.00 | f/f2 | −0.67 |
| V1/V4 | 0.79 | f/f3 | 0.79 |
| V2/V1 | 1.00 | f/f4 | −0.29 |
| V2/V3 | 1.00 | f/f1 + f/f2 | 0.27 |
| V2/V4 | 0.79 | f/f3 + f/f4 | 0.51 |
| V3/V1 | 1.00 | f/R6 | −0.79 |
| V3/V2 | 1.00 | f2/f4 | 0.43 |
| V3/V4 | 0.79 | f23/f | 4.70 |
| V4/V1 | 1.27 | CRA [deg.] | 25.8 |
| V4/V2 | 1.27 | Y42/Y11 | 1.67 |
| V4/V3 | 1.27 | Yc42/Y42 | 0.43 |
| CT2/CT4 | 0.51 | Ymax/Ymin | 2.34 |
| CT4/CT3 | 0.57 | — | — |

12th Embodiment

Figure 23:
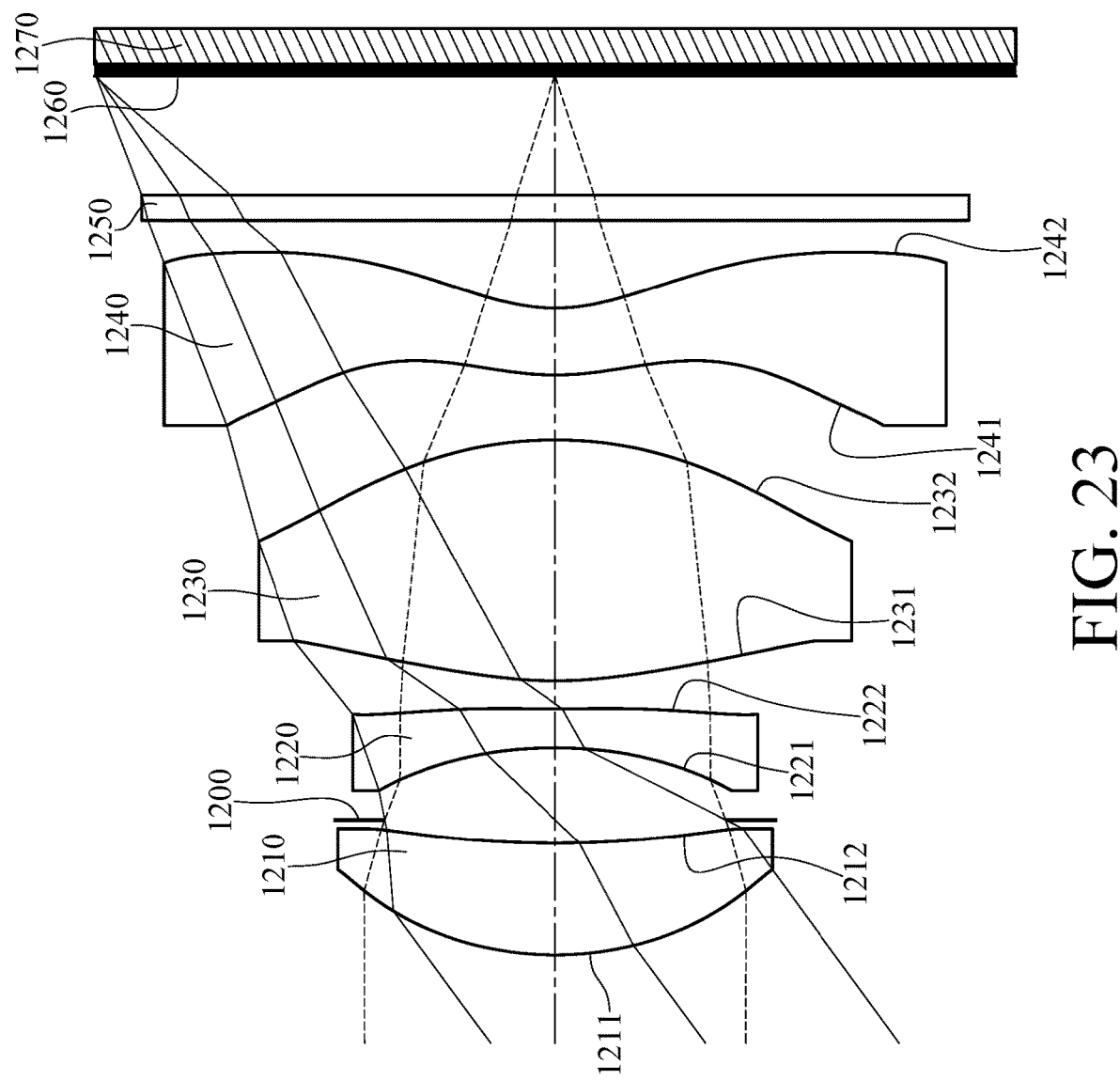
FIG. 23 is a schematic view of an image capturing unit according to the 12th embodiment of the present disclosure.
Figure 24:
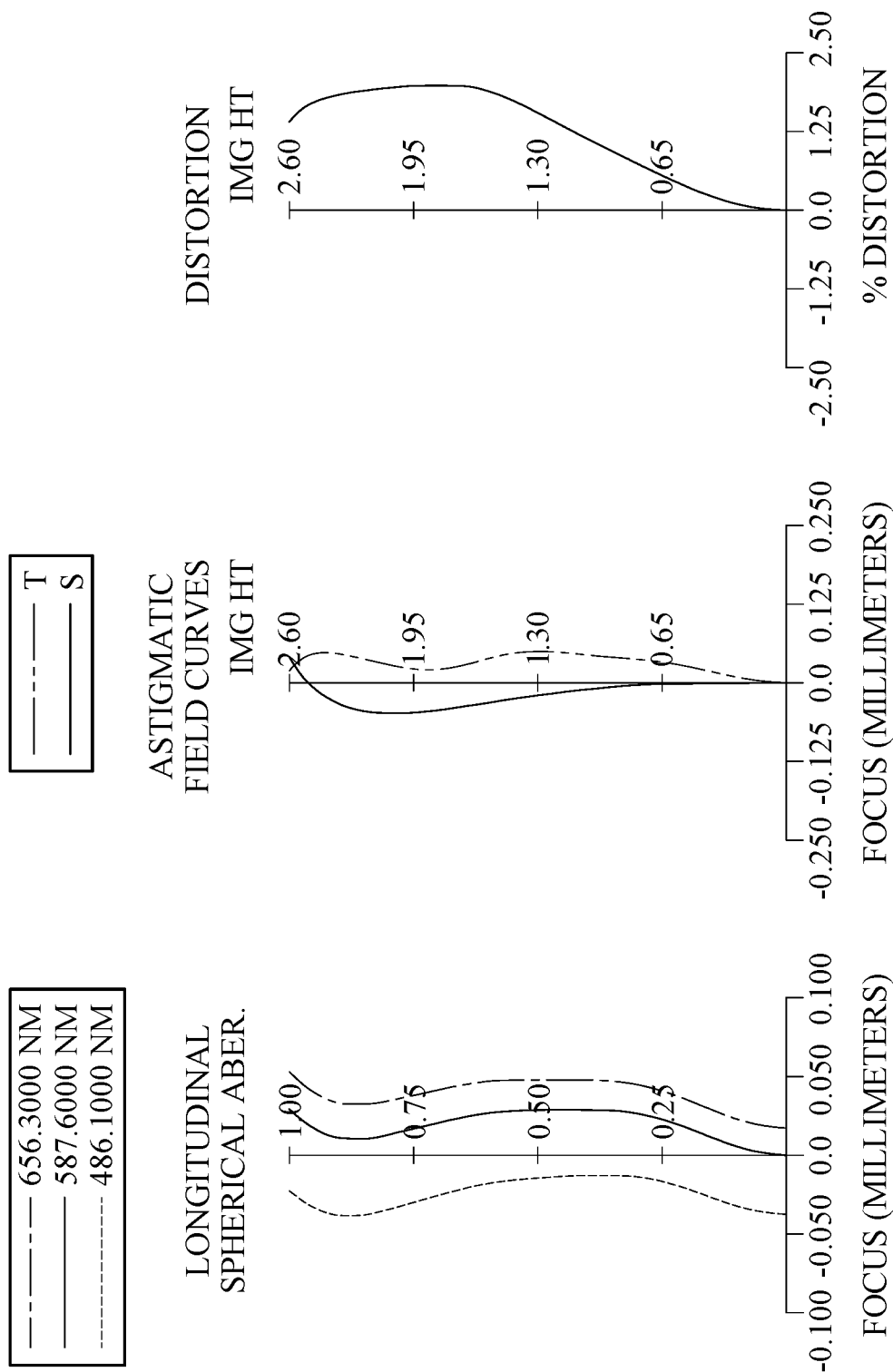
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the imaging optical lens assembly (its reference numeral is omitted) of the present disclosure and an image sensor 1270. The imaging optical lens assembly includes, in order from an object side to an image side, a first lens element 1210, an aperture stop 1200, a second lens element 1220, a third lens element 1230, a fourth lens element 1240, a filter 1250 and an image surface 1260. The imaging optical lens assembly includes four single and non-cemented lens elements (1210, 1220, 1230 and 1240) with no additional lens element disposed between each of the adjacent four lens elements, wherein there is an air gap between every adjacent lens element.

The first lens element 1210 with positive refractive power has an object-side surface 1211 being convex in a paraxial region thereof and an image-side surface 1212 being concave in a paraxial region thereof. The first lens element 1210 is made of plastic material and has the object-side surface 1211 and the image-side surface 1212 being both aspheric. The object-side surface 1211 of the first lens element 1210 has one inflection point. The image-side surface 1212 of the first lens element 1210 has one inflection point.

The second lens element 1220 with negative refractive power has an object-side surface 1221 being concave in a paraxial region thereof and an image-side surface 1222 being concave in a paraxial region thereof. The second lens element 1220 is made of plastic material and has the object-side surface 1221 and the image-side surface 1222 being both aspheric. The image-side surface 1222 of the second lens element 1220 has two inflection points. The image-side surface 1222 of the second lens element 1220 has two critical points in an off-axis region thereof.

The third lens element 1230 with positive refractive power has an object-side surface 1231 being convex in a paraxial region thereof and an image-side surface 1232 being convex in a paraxial region thereof. The third lens element 1230 is made of plastic material and has the object-side surface 1231 and the image-side surface 1232 being both aspheric. The object-side surface 1231 of the third lens element 1230 has one inflection point. The image-side surface 1232 of the third lens element 1230 has two inflection points.

The fourth lens element 1240 with negative refractive power has an object-side surface 1241 being convex in a paraxial region thereof and an image-side surface 1242 being concave in a paraxial region thereof. The fourth lens element 1240 is made of plastic material and has the object-side surface 1241 and the image-side surface 1242 being both aspheric. The object-side surface 1241 of the fourth lens element 1240 has three inflection points. The image-side surface 1242 of the fourth lens element 1240 has one inflection point. The object-side surface 1241 of the fourth lens element 1240 has one critical point in an off-axis region thereof. The image-side surface 1242 of the fourth lens element 1240 has one critical point in an off-axis region thereof.

The filter 1250 is made of glass material and located between the fourth lens element 1240 and the image surface 1260, and will not affect the focal length of the imaging optical lens assembly. The image sensor 1270 is disposed on or near the image surface 1260 of the imaging optical lens assembly.

In this embodiment, each of the first lens element 1210, the second lens element 1220, the third lens element 1230 and the fourth lens element 1240 has an Abbe number smaller than 38.0.

The detailed optical data of the 12th embodiment are shown in Table 23 and the aspheric surface data are shown in Table 24 below.

TABLE 23

12th Embodiment
f = 3.44 mm, Fno = 1.60, HFOV = 36.3 deg.

| Surface # | | Curvature Radius | | Thickness | Material | Index | Abbe # | Focal Length |
|---|---|---|---|---|---|---|---|---|
| 0 | Object | Plano | | 500.000 | | | | |
| 1 | Lens 1 | 1.861 | (ASP) | 0.637 | Plastic | 1.582 | 30.2 | 4.35 |
| 2 | | 6.148 | (ASP) | 0.132 | | | | |
| 3 | Ape. Stop | Plano | | 0.409 | | | | |
| 4 | Lens 2 | -2.662 | (ASP) | 0.220 | Plastic | 1.688 | 18.7 | -3.14 |
| 5 | | 11.785 | (ASP) | 0.159 | | | | |
| 6 | Lens 3 | 2.337 | (ASP) | 1.368 | Plastic | 1.582 | 30.2 | 2.28 |
| 7 | | -2.418 | (ASP) | 0.369 | | | | |
| 8 | Lens 4 | 1.613 | (ASP) | 0.379 | Plastic | 1.582 | 30.2 | -6.38 |
| 9 | | 1.027 | (ASP) | 0.500 | | | | |
| 10 | Filter | Plano | | 0.145 | Glass | 1.517 | 64.2 | — |
| 11 | | Plano | | 0.672 | | | | |
| 12 | Image | Plano | | — | | | | |

Note:
Reference wavelength (d-line) is 587.6 nm (visible light).

TABLE 24

Aspheric Coefficients

| Surface # | 1 | 2 | 4 | 5 |
|---|---|---|---|---|
| k = | -2.4424E+00 | -9.9000E+01 | 3.5947E+00 | 8.8509E+01 |
| A4 = | 3.5250E-02 | 4.4761E-02 | -1.5635E-01 | -3.2664E-01 |
| A6 = | 1.0200E-01 | 5.8877E-03 | 4.8240E-01 | 7.2727E-01 |
| A8 = | -2.9611E-01 | -1.5033E-01 | -8.6658E-01 | -1.2039E+00 |
| A10 = | 5.0577E-01 | 3.4791E-01 | 1.0493E+00 | 1.3955E+00 |
| A12 = | -4.8300E-01 | -4.0052E-01 | -7.5096E-01 | -1.0194E+00 |
| A14 = | 2.4389E-01 | 2.2720E-01 | 2.5525E-01 | 4.1211E-01 |
| A16 = | -5.0957E-02 | -5.3373E-02 | -2.0817E-02 | -6.9201E-02 |

| Surface # | 6 | 7 | 8 | 9 |
|---|---|---|---|---|
| k = | -1.3120E+00 | -5.2982E+00 | -3.5065E+00 | -1.6390E+00 |
| A4 = | -1.9778E-01 | -1.0527E-01 | -3.2055E-01 | -3.5520E-01 |
| A6 = | 3.3780E-01 | 1.0885E-01 | 1.7087E-01 | 2.9134E-01 |
| A8 = | -5.3007E-01 | -8.6975E-02 | -3.0914E-02 | -1.7581E-01 |
| A10 = | 6.2889E-01 | 4.8347E-02 | -4.1469E-02 | 7.5773E-02 |
| A12 = | -5.2125E-01 | -1.9922E-02 | 4.2346E-02 | -2.2570E-02 |
| A14 = | 2.8927E-01 | 7.1061E-03 | -1.8807E-02 | 4.5066E-03 |
| A16 = | -1.0186E-01 | -1.9330E-03 | 4.6184E-03 | -5.7235E-04 |
| A18 = | 2.0471E-02 | 3.0095E-04 | -6.1348E-04 | 4.1474E-05 |
| A20 = | -1.7823E-03 | -1.8792E-05 | 3.4578E-05 | -1.2966E-06 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

12th Embodiment

| | | | |
|---|---|---|---|
| f [mm] | 3.44 | T23/CT3 | 0.12 |
| Fno | 1.60 | TL [mm] | 4.99 |
| HFOV [deg.] | 36.3 | TL/EPD | 2.30 |
| V1 | 30.2 | TL/ImgH | 1.92 |
| V2 | 18.7 | R2/R1 | 3.30 |
| V3 | 30.2 | R3/f | -0.77 |
| V4 | 30.2 | R3/R4 | -0.23 |

-continued

12th Embodiment

| | | | |
|---|---|---|---|
| Vmax | 30.2 | R6/R7 | -1.50 |
| V1 + V2 + V3 + V4 | 109.4 | R7/R8 | 1.57 |
| V1/V2 | 1.62 | f/f1 | 0.79 |
| V1/V3 | 1.00 | f/f2 | -1.10 |
| V1/V4 | 1.00 | f/f3 | 1.51 |
| V2/V1 | 0.62 | f/f4 | -0.54 |
| V2/V3 | 0.62 | f/f1 + f/f2 | -0.31 |
| V2/V4 | 0.62 | f/f3 + f/f4 | 0.97 |
| V3/V1 | 1.00 | f/R6 | -1.42 |
| V3/V2 | 1.62 | f2/f4 | 0.49 |
| V3/V4 | 1.00 | f23/f | 1.31 |
| V4/V1 | 1.00 | CRA [deg.] | 34.8 |
| V4/V2 | 1.62 | Y42/Y11 | 1.80 |
| V4/V3 | 1.00 | Yc42/Y42 | 0.75 |
| CT2/CT4 | 0.58 | Ymax/Ymin | 2.22 |
| CT4/CT3 | 0.28 | — | — |

13th Embodiment

Figure 25:
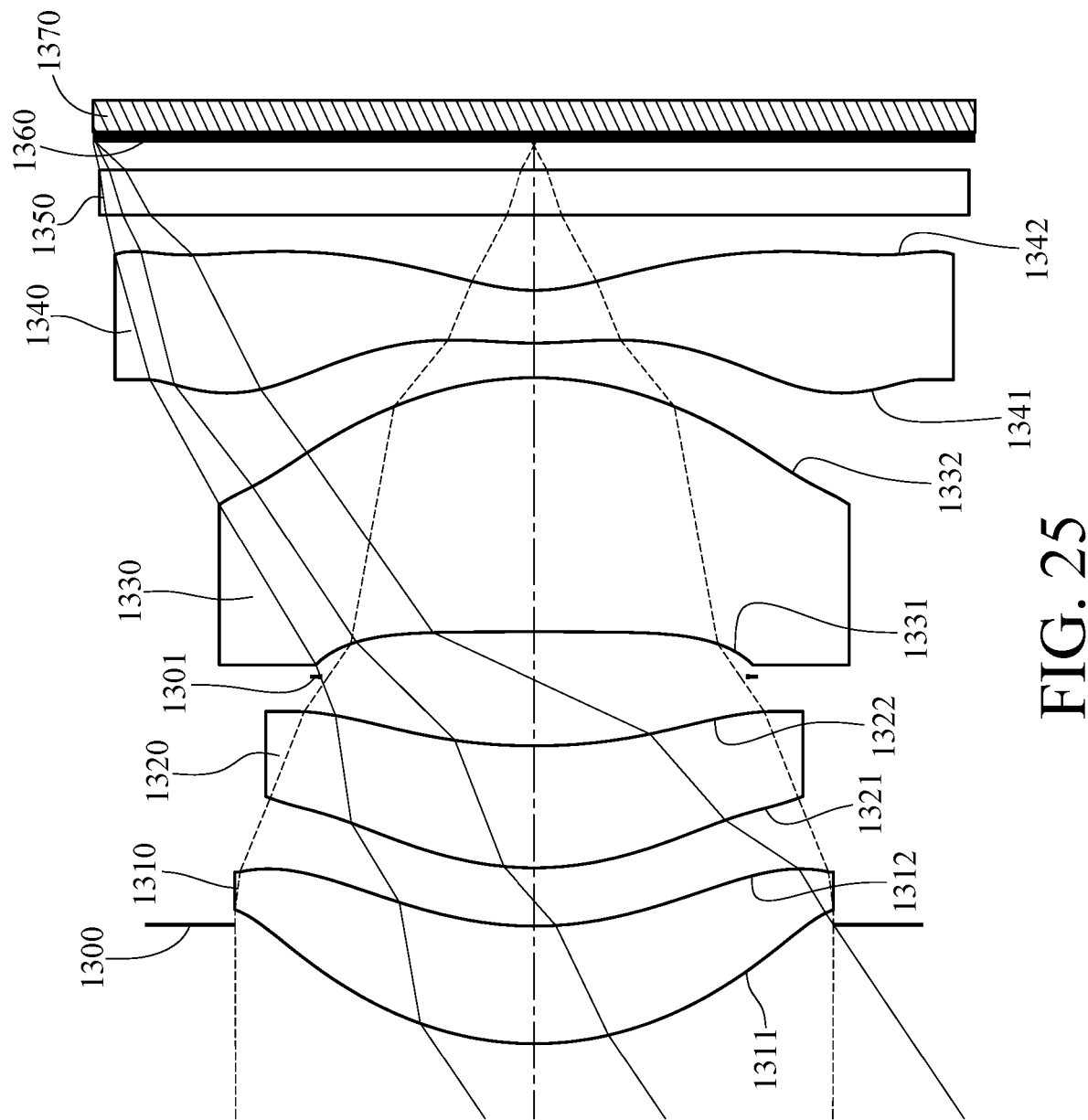
FIG. 25 is a schematic view of an image capturing unit according to the 13th embodiment of the present disclosure.
Figure 26:
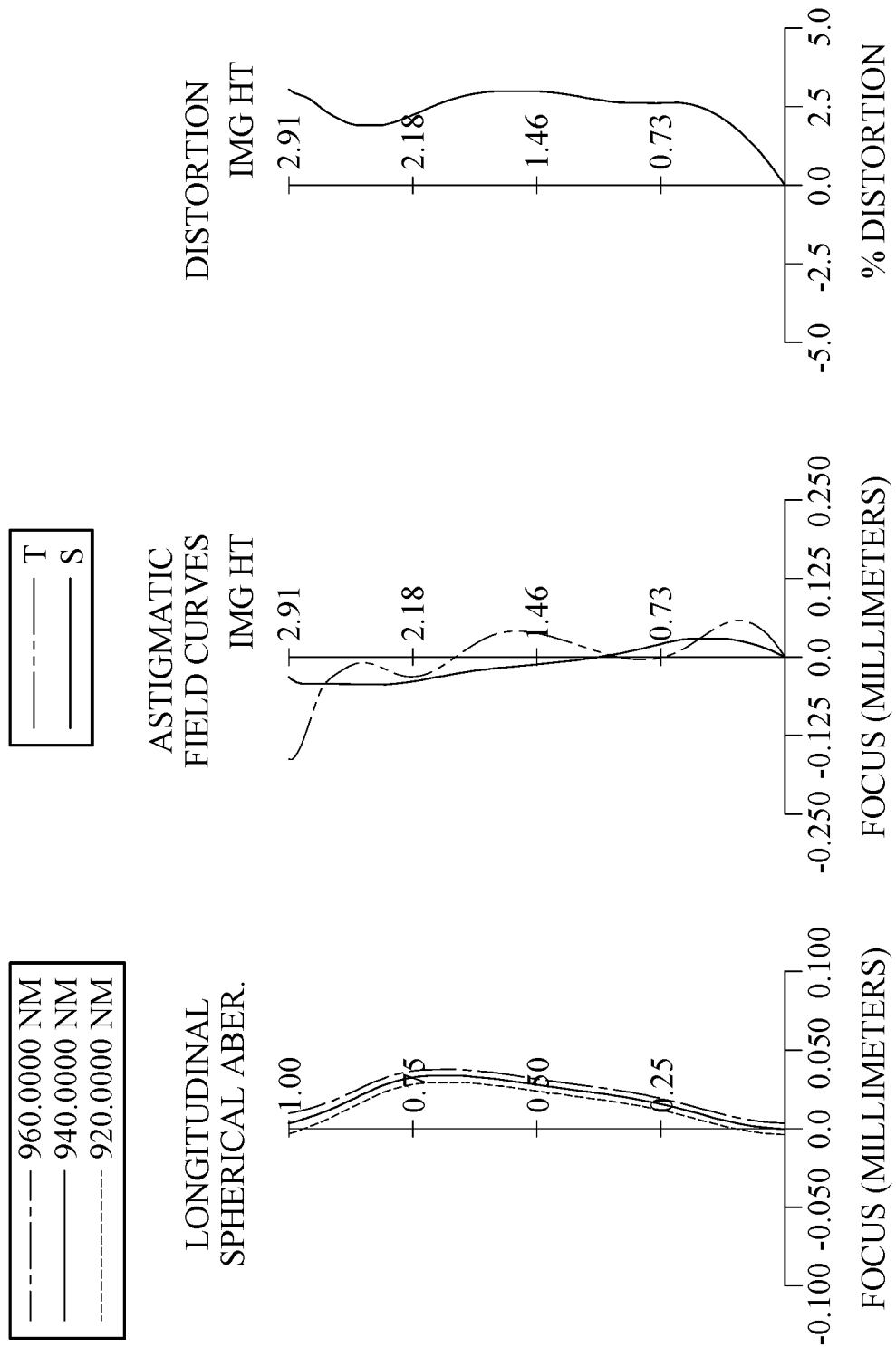
FIG. 26 shows spherical aberration curves, astigmatic field curves and a distortion curve of the image capturing unit according to the 13th embodiment.

FIG. 25 is a schematic view of an image capturing unit according to the 13th embodiment of the present disclosure. FIG. 26 shows, in order from left to right, spherical aberration curves, astigmatic field curves and a distortion curve of the image capturing unit according to the 13th embodiment. In FIG. 25, the image capturing unit includes the imaging optical lens assembly (its reference numeral is omitted) of the present disclosure and an image sensor 1370. The imaging optical lens assembly includes, in order from an object side to an image side, an aperture stop 1300, a first lens element 1310, a second lens element 1320, a stop 1301, a third lens element 1330, a fourth lens element 1340, a filter 1350 and an image surface 1360. The imaging optical lens assembly includes four single and non-cemented lens elements (1310, 1320, 1330 and 1340) with no additional lens element disposed between each of the adjacent four lens elements, wherein there is an air gap between every adjacent lens element.

The first lens element 1310 with positive refractive power has an object-side surface 1311 being convex in a paraxial region thereof and an image-side surface 1312 being concave in a paraxial region thereof. The first lens element 1310 is made of plastic material and has the object-side surface 1311 and the image-side surface 1312 being both aspheric. The object-side surface 1311 of the first lens element 1310 has one inflection point. The image-side surface 1312 of the first lens element 1310 has one inflection point. The image-side surface 1312 of the first lens element 1310 has one critical point in an off-axis region thereof.

The second lens element 1320 with positive refractive power has an object-side surface 1321 being convex in a paraxial region thereof and an image-side surface 1322 being concave in a paraxial region thereof. The second lens element 1320 is made of plastic material and has the object-side surface 1321 and the image-side surface 1322 being both aspheric. The object-side surface 1321 of the second lens element 1320 has two inflection points. The image-side surface 1322 of the second lens element 1320 has one inflection point. The image-side surface 1322 of the second lens element 1320 has one critical point in an off-axis region thereof.

The third lens element 1330 with positive refractive power has an object-side surface 1331 being concave in a paraxial region thereof and an image-side surface 1332 being convex in a paraxial region thereof. The third lens element 1330 is made of plastic material and has the object-side surface 1331 and the image-side surface 1332 being both aspheric. The image-side surface 1332 of the third lens element 1330 has two inflection points.

The fourth lens element 1340 with negative refractive power has an object-side surface 1341 being convex in a paraxial region thereof and an image-side surface 1342 being concave in a paraxial region thereof. The fourth lens element 1340 is made of plastic material and has the object-side surface 1341 and the image-side surface 1342 being both aspheric. The object-side surface 1341 of the fourth lens element 1340 has three inflection points. The image-side surface 1342 of the fourth lens element 1340 has three inflection points. The object-side surface 1341 of the fourth lens element 1340 has two critical points in an off-axis region thereof. The image-side surface 1342 of the fourth lens element 1340 has three critical points in an off-axis region thereof.

The filter 1350 is made of glass material and located between the fourth lens element 1340 and the image surface 1360, and will not affect the focal length of the imaging optical lens assembly. The image sensor 1370 is disposed on or near the image surface 1360 of the imaging optical lens assembly.

In this embodiment, each of the first lens element 1310, the second lens element 1320, the third lens element 1330 and the fourth lens element 1340 has an Abbe number smaller than 38.0.

The detailed optical data of the 13th embodiment are shown in Table 25 and the aspheric surface data are shown in Table 26 below.

TABLE 25

13th Embodiment
f = 4.14 mm, Fno = 1.05, HFOV = 34.0 deg.

| Surface # | | Curvature Radius | | Thickness | Material | Index | Abbe # | Focal Length |
|---|---|---|---|---|---|---|---|---|
| 0 | Object | Plano | | 750.000 | | | | |
| 1 | Ape. Stop | Plano | | −0.791 | | | | |
| 2 | Lens 1 | 2.168 | (ASP) | 0.781 | Plastic | 1.634 | 20.4 | 16.62 |
| 3 | | 2.347 | (ASP) | 0.387 | | | | |
| 4 | Lens 2 | 2.155 | (ASP) | 0.810 | Plastic | 1.634 | 20.4 | 6.46 |
| 5 | | 3.882 | (ASP) | 0.460 | | | | |
| 6 | Stop | Plano | | 0.298 | | | | |
| 7 | Lens 3 | −67.820 | (ASP) | 1.691 | Plastic | 1.634 | 20.4 | 3.70 |
| 8 | | −2.288 | (ASP) | 0.230 | | | | |
| 9 | Lens 4 | 2.664 | (ASP) | 0.350 | Plastic | 1.634 | 20.4 | −3.66 |
| 10 | | 1.177 | (ASP) | 0.500 | | | | |
| 11 | Filter | Plano | | 0.300 | Glass | 1.508 | 64.2 | — |
| 12 | | Plano | | 0.182 | | | | |
| 13 | Image | Plano | | — | | | | |

Note:
Reference wavelength is 940.0 nm (infrared light).
An effective radius of the stop 1301 (Surface 6) is 1.420 mm.

TABLE 26

Aspheric Coefficients

| Surface # | 2 | 3 | 4 | 5 |
|---|---|---|---|---|
| k = | −2.0678E+00 | 1.7248E−01 | −1.0306E+00 | 3.9837E+00 |
| A4 = | 2.4928E−02 | −2.4803E−02 | −1.1067E−02 | 2.0241E−02 |
| A6 = | −1.6031E−02 | −1.8308E−02 | 2.6788E−03 | −8.6503E−02 |
| A8 = | 1.4716E−02 | 1.4597E−02 | −1.8912E−02 | 1.6320E−01 |
| A10 = | −7.8243E−03 | −7.6551E−03 | 1.9385E−02 | −2.2068E−01 |
| A12 = | 2.3922E−03 | 1.9311E−03 | −1.0742E−02 | 1.8733E−01 |
| A14 = | −4.0055E−04 | −2.1676E−04 | 2.1430E−03 | −1.0321E−01 |
| A16 = | 2.6791E−05 | 6.5543E−06 | 4.5882E−04 | 3.6042E−02 |
| A18 = | — | — | −2.4502E−04 | −7.2010E−03 |
| A20 = | — | — | 2.6549E−05 | 6.1973E−04 |

| Surface # | 7 | 8 | 9 | 10 |
|---|---|---|---|---|
| k = | 9.0000E+01 | −4.5309E+00 | −9.0000E+01 | −7.1022E+00 |
| A4 = | 2.5384E−03 | −7.0045E−02 | −1.9761E−01 | −1.0960E−01 |
| A6 = | 2.2073E−03 | 1.0524E−01 | 1.2838E−01 | 7.7182E−02 |
| A8 = | −1.9652E−01 | −1.2408E−01 | −5.7447E−02 | −3.8617E−02 |
| A10 = | 4.7202E−01 | 9.1524E−02 | 1.7102E−02 | 1.3131E−02 |
| A12 = | −5.6926E−01 | −4.2972E−02 | −2.8142E−03 | −2.9872E−03 |
| A14 = | 3.9408E−01 | 1.2709E−02 | 1.6845E−04 | 4.4323E−04 |
| A16 = | −1.5959E−01 | −2.2530E−03 | 1.5357E−05 | −4.0513E−05 |
| A18 = | 3.5378E−02 | 2.1615E−04 | −2.8157E−06 | 2.0419E−06 |
| A20 = | −3.3464E−03 | −8.5654E−06 | 1.1714E−07 | −4.3019E−08 |

In the 13th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 13th embodiment, so an explanation in this regard will not be provided again.

Moreover, these parameters can be calculated from Table 25 and Table 26 as the following values and satisfy the following conditions:

| 13th Embodiment | | | |
|---|---|---|---|
| f [mm] | 4.14 | T23/CT3 | 0.45 |
| Fno | 1.05 | TL [mm] | 5.99 |
| HFOV [deg.] | 34.0 | TL/EPD | 1.51 |
| V1 | 20.4 | TL/ImgH | 2.06 |
| V2 | 20.4 | R2/R1 | 1.08 |
| V3 | 20.4 | R3/f | 0.52 |
| V4 | 20.4 | R3/R4 | 0.56 |
| Vmax | 20.4 | R6/R7 | −0.86 |
| V1 + V2 + V3 + V4 | 81.6 | R7/R8 | 2.26 |
| V1/V2 | 1.00 | f/f1 | 0.25 |
| V1/V3 | 1.00 | f/f2 | 0.64 |
| V1/V4 | 1.00 | f/f3 | 1.12 |
| V2/V1 | 1.00 | f/f4 | −1.13 |
| V2/V3 | 1.00 | f/f1 + f/f2 | 0.89 |
| V2/V4 | 1.00 | f/f3 + f/f4 | −0.01 |
| V3/V1 | 1.00 | f/R6 | −1.81 |
| V3/V2 | 1.00 | f2/f4 | −1.77 |
| V3/V4 | 1.00 | f23/f | 0.78 |
| V4/V1 | 1.00 | CRA [deg.] | 26.1 |
| V4/V2 | 1.00 | Y42/Y11 | 1.40 |
| V4/V3 | 1.00 | Yc42/Y42 | 0.60, 0.82, 0.95 |
| CT2/CT4 | 2.31 | | |
| CT4/CT3 | 0.21 | Ymax/Ymin | 1.92 |

14th Embodiment

Figure 27:
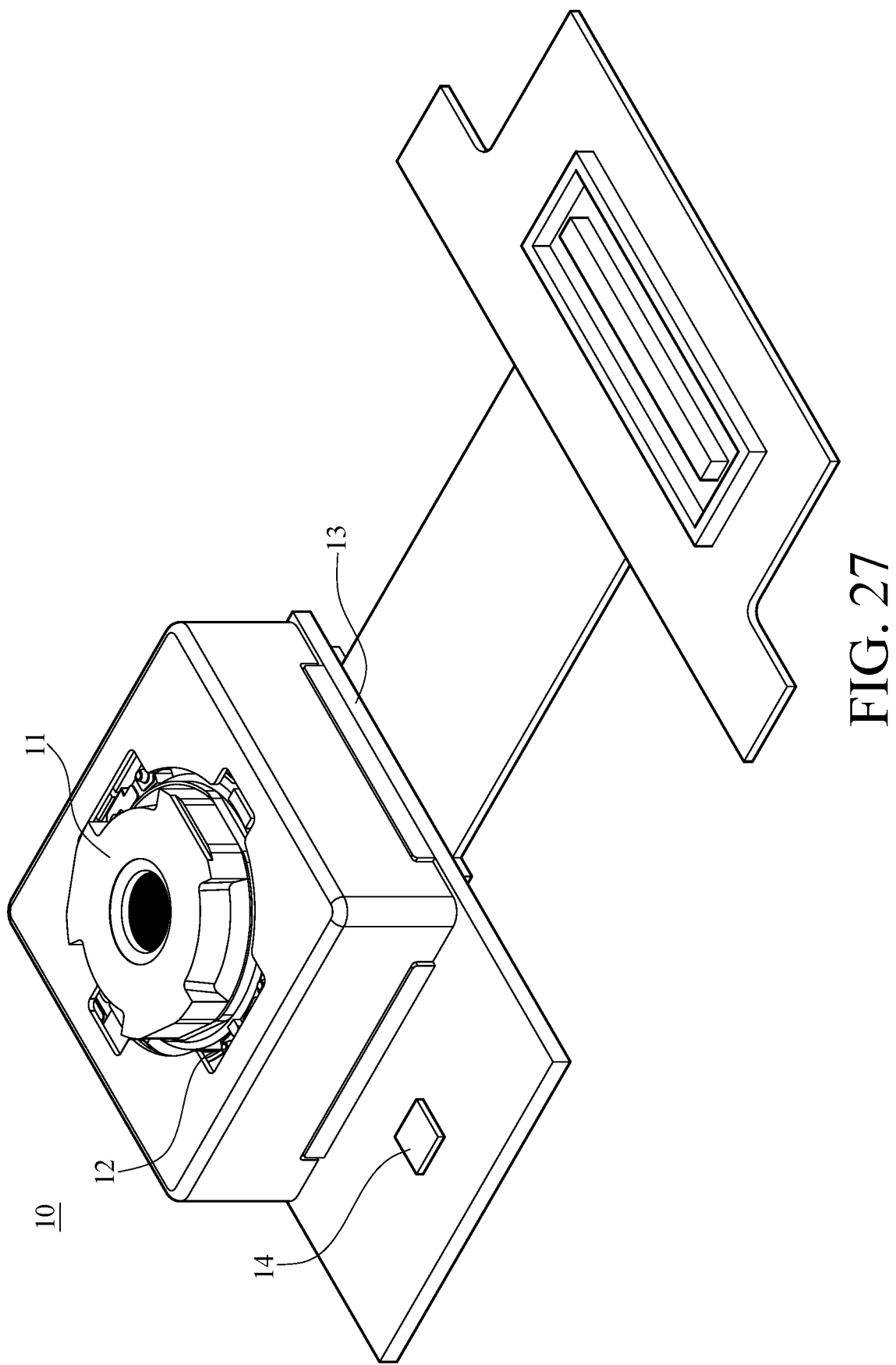
FIG. 27 is a perspective view of an image capturing unit according to the 14th embodiment of the present disclosure.

FIG. 27 is a perspective view of an image capturing unit according to the 14th embodiment of the present disclosure. In this embodiment, an image capturing unit 10 is a camera module including a lens unit 11, a driving device 12, an image sensor 13 and an image stabilizer 14. The lens unit 11 includes the imaging optical lens assembly disclosed in the 12th embodiment, a barrel and a holder member (their reference numerals are omitted) for holding the imaging optical lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging optical lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

15th Embodiment

Figure 28:
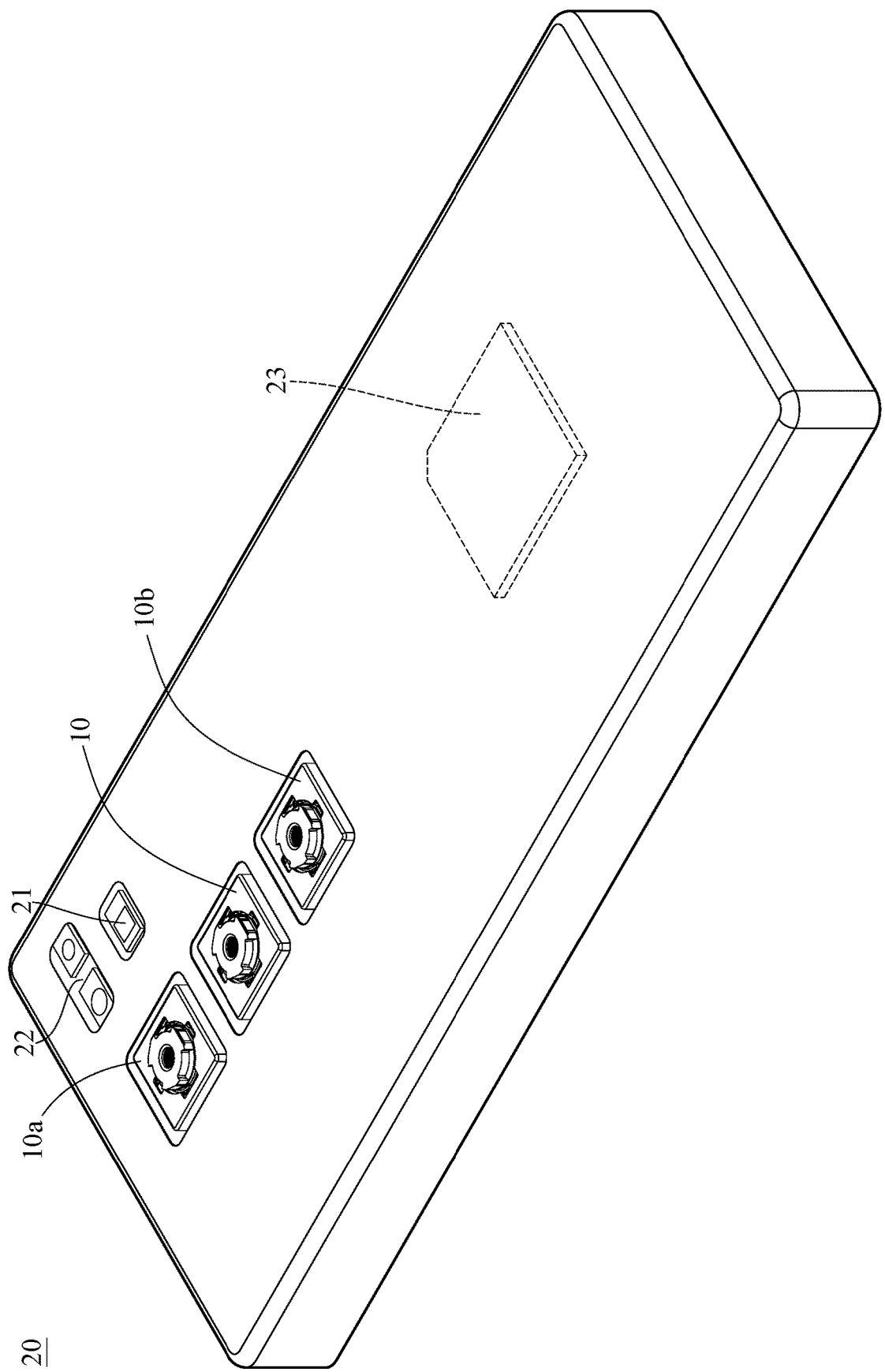
FIG. 28 is one perspective view of an electronic device according to the 15th embodiment of the present disclosure.
Figure 29:
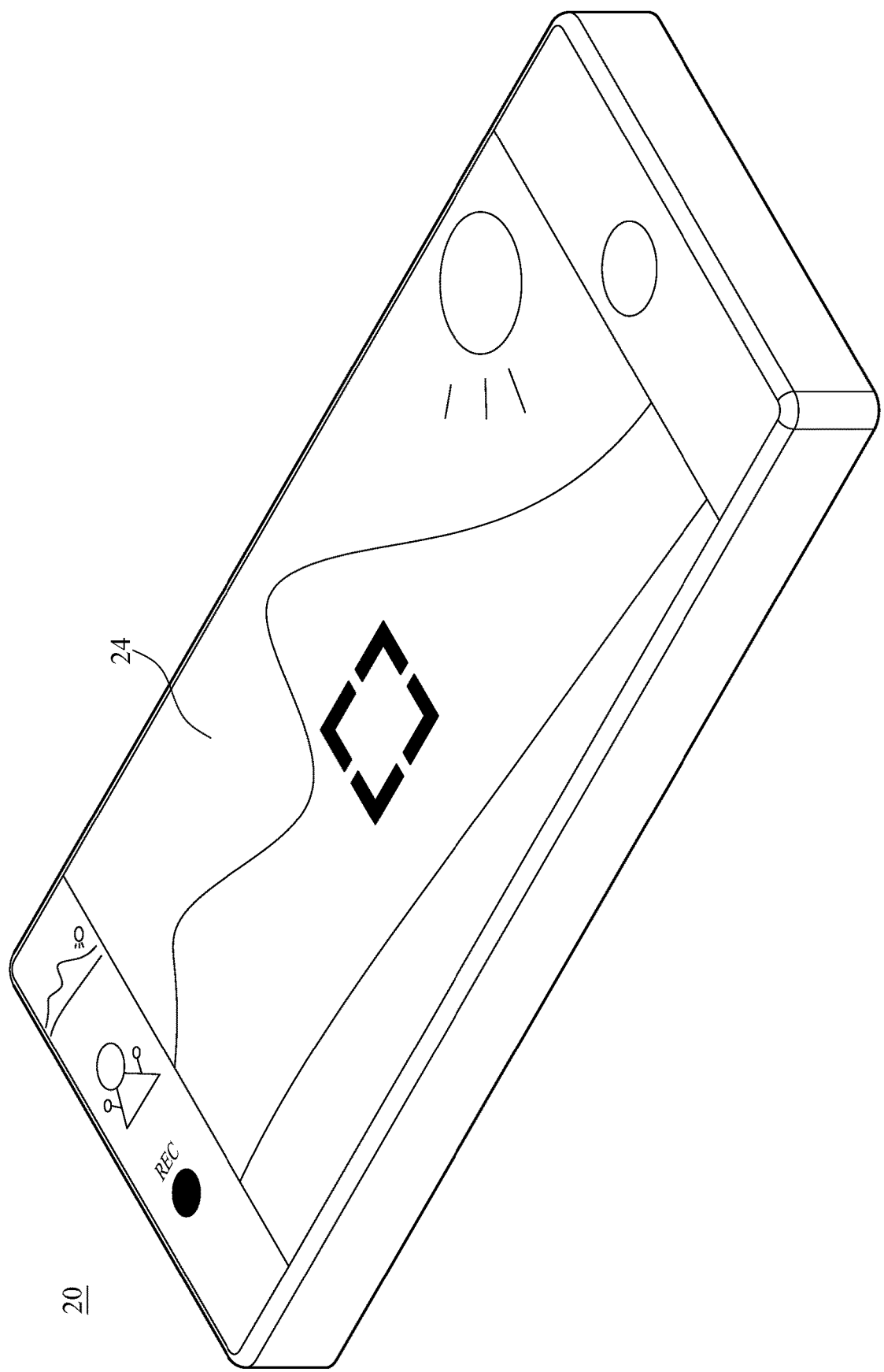
FIG. 29 is another perspective view of the electronic device in FIG. 28.
Figure 30:
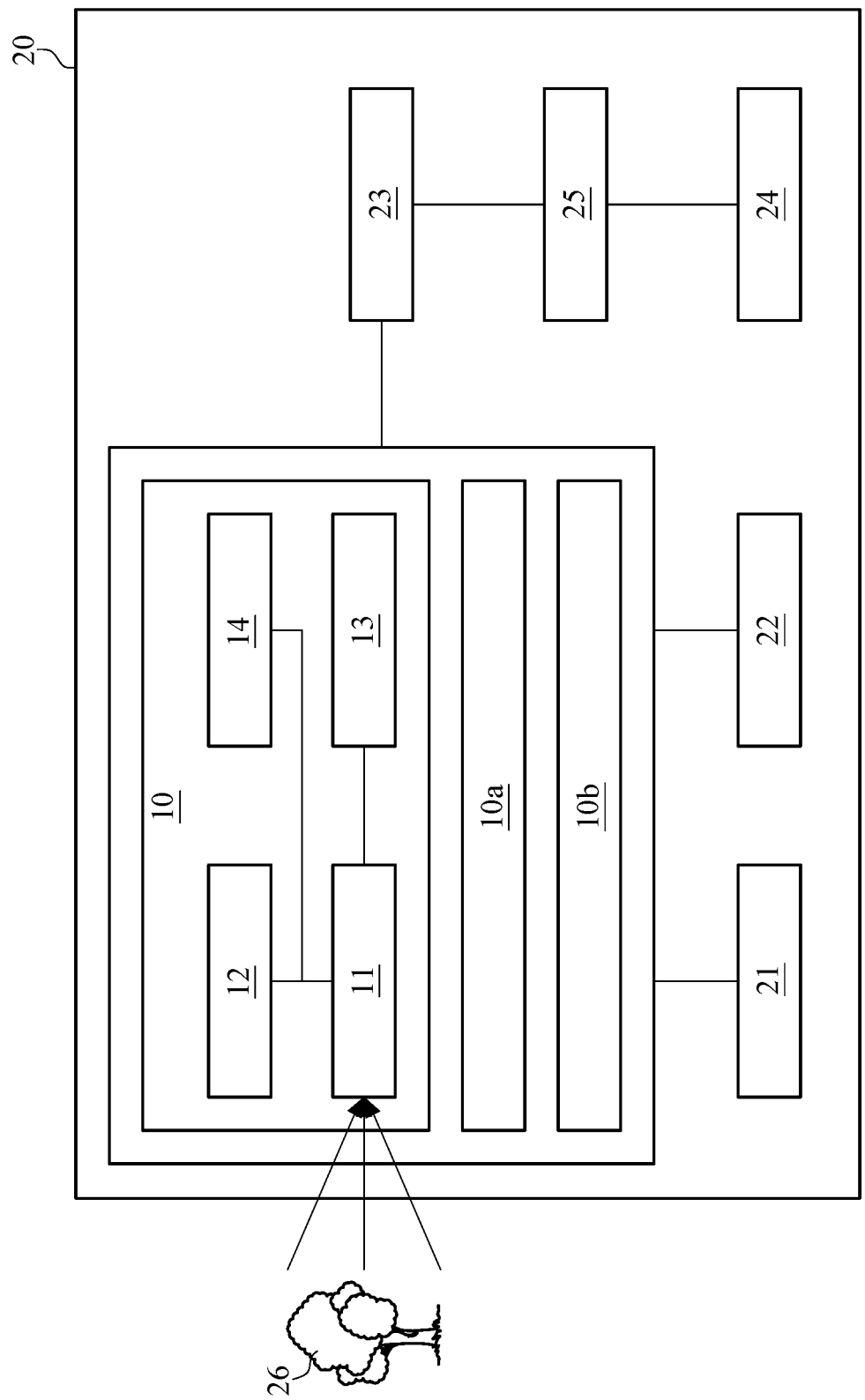
FIG. 30 is a block diagram of the electronic device in FIG. 28.

FIG. 28 is one perspective view of an electronic device according to the 15th embodiment of the present disclosure. FIG. 29 is another perspective view of the electronic device in FIG. 28. FIG. 30 is a block diagram of the electronic device in FIG. 28.

In this embodiment, an electronic device 20 is a smartphone including the image capturing unit 10 disclosed in the 14th embodiment, an image capturing unit 10a, an image capturing unit 10b, a flash module 21, a focus assist module 22, an image signal processor 23, a user interface 24 and an image software processor 25. The image capturing unit 10, the image capturing unit 10a and the image capturing unit 10b all face the same direction, and each of the image capturing units 10, 10a and 10b has a single focal point. Furthermore, the image capturing unit 10a and the image capturing unit 10b both have a configuration similar to that of the image capturing unit 10. In detail, each of the image capturing unit 10a and the image capturing unit 10b includes a lens unit, a driving device, an image sensor and an image stabilizer, and the lens unit includes a lens system, a barrel and a holder member for holding the lens system.

In this embodiment, the image capturing units 10, 10a, 10b have different fields of view (e.g., the image capturing unit 10a is a wide-angle image capturing unit, the image capturing unit 10b is a telephoto image capturing unit and the image capturing unit 10 has a field of view ranging between that of the image capturing unit 10a and the image capturing unit 10b), such that the electronic device 20 has various magnification ratios so as to meet the requirement of optical zoom functionality. In this embodiment, the electronic device 20 includes multiple image capturing units, but the present disclosure is not limited to the number of image capturing units.

When a user captures images of an object 26, the light rays converge in the image capturing unit 10, the image capturing unit 10a or the image capturing unit 10b to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the imaging optical lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-26 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising: four lens elements, the four lens elements being, in order from an object side to an image side, a first lens element, a second lens element, a third lens element and a fourth lens element; each of the four lens elements having an object-side surface facing toward the object side and an image-side surface facing toward the image side;
wherein the second lens element has positive refractive power, the fourth lens element has negative refractive power, at least one of all lens surfaces of the four lens elements is aspheric and has at least one inflection point, each of at least three of the four lens elements has an Abbe number smaller than 38.0, and either an absolute value of a curvature radius of the object-side surface of the fourth lens element or an absolute value of a curvature radius of the image-side surface of the fourth lens element is a minimum among absolute values of curvature radii of all lens surfaces of the four lens elements;
wherein an Abbe number of the first lens element is V1, an Abbe number of the second lens element is V2, an Abbe number of the third lens element is V3, an Abbe number of the fourth lens element is V4, an axial distance between the object-side surface of the first lens element and an image surface is TL, an entrance pupil diameter of the imaging optical lens assembly is EPD, and the following conditions are satisfied:

40.0<$V1+V2+V3+V4$<120.0; and 1.0<$TL/EPD$<3.0.

2. The imaging optical lens assembly of claim 1, wherein a central thickness of the third lens element is CT3, a central thickness of the fourth lens element is CT4, and the following condition is satisfied:

0<CT4/CT3<0.83.

3. The imaging optical lens assembly of claim 1, wherein a central thickness of the second lens element is CT2, a central thickness of the fourth lens element is CT4, and the following condition is satisfied:

90<CT2/CT4<3.0.

4. The imaging optical lens assembly of claim 1, wherein an axial distance between the second lens element and the third lens element is T23, a central thickness of the third lens element is CT3, a focal length of the imaging optical lens assembly is f, a focal length of the second lens element is f2, and the following condition is satisfied:

0<$T23/CT3$≤0.82; and

−2.0<$f/f2$≤0.77.

5. The imaging optical lens assembly of claim 1, wherein a curvature radius of the object-side surface of the second lens element is R3, a curvature radius of the image-side surface of the second lens element is R4, and the following condition is satisfied:

−3.9<$R3/R4$<3.0.

6. The imaging optical lens assembly of claim 1, wherein a focal length of the imaging optical lens assembly is f, a focal length of the first lens element is f1, a focal length of the second lens element is f2, a focal length of the third lens element is f3, a focal length of the fourth lens element is f4, and the following conditions are satisfied:

−1.0<$f/f3$<2.0;

−3.00<$f/f1+f/f2$≤1.00; and

0<$f/f3+f/f4$<4.0.

7. The imaging optical lens assembly of claim 1, wherein the first lens element has positive refractive power, the object-side surface of the first lens element is convex in a paraxial region thereof, the axial distance between the object-side surface of the first lens element and the image surface is TL, a maximum image height of the imaging optical lens assembly is ImgH, an f-number of the imaging optical lens assembly is Fno, and the following conditions are satisfied:

1.0<$TL$/ImgH<3.0; and 0.50<Fno<2.20.

8. The imaging optical lens assembly of claim 1, wherein the four lens elements of the imaging optical lens assembly are made of plastic material, each of at least three of the four lens elements has at least one critical point in an off-axis region thereof, a chief ray angle at a maximum image height of the imaging optical lens assembly is CRA, and the following condition is satisfied:

15.0 degrees <CRA<50.0 degrees.

9. An imaging optical lens assembly comprising: four lens elements, the four lens elements being, in order from an object side to an image side, a first lens element, a second lens element, a third lens element and a fourth lens element; each of the four lens elements having an object-side surface facing toward the object side and an image-side surface facing toward the image side;
wherein the object-side surface of the fourth lens element is convex in a paraxial region thereof, the image-side surface of the fourth lens element is concave in a paraxial region thereof, at least one of all lens surfaces of the four lens elements is aspheric and has at least one inflection point, and each of at least three of the four lens elements has an Abbe number smaller than 38.0;
wherein a central thickness of the second lens element is CT2, a central thickness of the third lens element is CT3, a central thickness of the fourth lens element is CT4, a curvature radius of the object-side surface of the fourth lens element is R7, a curvature radius of the image-side surface of the fourth lens element is R8, and the following conditions are satisfied:

0<$CT4/CT3$≤0.83;

0<$R7/R8$<1.41; and 0.90<CT2/CT4<3.0.

10. The imaging optical lens assembly of claim 9, wherein either an absolute value of a curvature radius of the object-side surface of the fourth lens element or an absolute value of a curvature radius of the image-side surface of the fourth lens element is a minimum among absolute values of curvature radii of all lens surfaces of the four lens elements, an Abbe number of the first lens element is V1, an Abbe number of the second lens element is V2, an Abbe number of the third lens element is V3, an Abbe number of the fourth lens element is V4, a focal length of the second lens element is f2, a focal length of the fourth lens element is f4, and the following conditions are satisfied:

$40.0 < V1 + V2 + V3 + V4 < 120.0$; and $-1.50 < f2/f4 < 4.00$.

11. The imaging optical lens assembly of claim 9, wherein an axial distance between the object-side surface of the first lens element and an image surface is TL, a maximum image height of the imaging optical lens assembly is ImgH, half of a maximum field of view of the imaging optical lens assembly is HFOV, and the following conditions are satisfied:

$0.50$ mm $< TL < 8.0$ mm $1.0 < TL/$ImgH $< 3.0$; and $20$ degrees $<$ HFOV $< 60$ degrees.

12. The imaging optical lens assembly of claim 9, wherein the second lens element has positive refractive power, the third lens element has positive refractive power, and there is an air gap in a paraxial region between each of all adjacent lens elements of the imaging optical lens assembly.

13. The imaging optical lens assembly of claim 9, wherein the image-side surface of the third lens element is convex in a paraxial region thereof, a curvature radius of the object-side surface of the second lens element is R3, a curvature radius of the image-side surface of the third lens element is R6, a focal length of the imaging optical lens assembly is f, and the following conditions are satisfied:

$-1.14 < R3/f < 36.0$; and $-2.08 \leq f/R6 < 0$.

14. The imaging optical lens assembly of claim 9, wherein the image-side surface of the third lens element is convex in a paraxial region thereof, a curvature radius of the object-side surface of the second lens element is R3, a curvature radius of the image-side surface of the second lens element is R4, a curvature radius of the image-side surface of the third lens element is R6, the curvature radius of the object-side surface of the fourth lens element is R7, and the following conditions are satisfied:

$-1.1 < R3/R4 < 1.3$; and $R6/R7 < -0.70$.

15. The imaging optical lens assembly of claim 9, wherein each of at least three of the four lens elements is meniscus in a paraxial region thereof, the image-side surface of the fourth lens element has at least one critical point in an off-axis region thereof, a maximum effective radius of the image-side surface of the fourth lens element is Y42, a vertical distance between a critical point on the image-side surface of the fourth lens element and an optical axis is Yc42, and the following condition is satisfied:

$0.10 < Yc42/Y42 < 0.90$.

16. An imaging optical lens assembly comprising: four lens elements, the four lens elements being, in order from an object side to an image side, a first lens element, a second lens element, a third lens element and a fourth lens element; each of the four lens elements having an object-side surface facing toward the object side and an image-side surface facing toward the image side;

wherein the object-side surface of the first lens element is convex in a paraxial region thereof, the image-side surface of the first lens element is concave in a paraxial region thereof, the object-side surface of the fourth lens element is convex in a paraxial region thereof, the image-side surface of the fourth lens element is concave in a paraxial region thereof, at least one of all lens surfaces of the four lens elements is aspheric and has at least one inflection point, and each of at least three of the four lens elements has an Abbe number smaller than 38.0;

wherein a central thickness of the third lens element is CT3, a central thickness of the fourth lens element is CT4, a curvature radius of the object-side surface of the first lens element is R1, a curvature radius of the image-side surface of the first lens element is R2, a curvature radius of the object-side surface of the fourth lens element is R7, a curvature radius of the image-side surface of the fourth lens element is R8, and the following conditions are satisfied:

$0 < CT4/CT3 \leq 0.83$;

$0 < R7/R8 < 1.41$; and $0 < R2/R1 < 2.65$.

17. The imaging optical lens assembly of claim 16, wherein an axial distance between the object-side surface of the first lens element and an image surface is TL, an entrance pupil diameter of the imaging optical lens assembly is EPD, a focal length of the imaging optical lens assembly is f, a focal length of the third lens element is f3, a focal length of the fourth lens element is f4, and the following conditions are satisfied:

$1.0 < TL/$EPD$ < 2.0$; and $0.35 \leq f/f3 + f/f4 < 3.0$.

18. The imaging optical lens assembly of claim 16, wherein a maximum value among Abbe numbers of all lens elements of the imaging optical lens assembly is Vmax, an f-number of the imaging optical lens assembly is Fno, and the following conditions are satisfied:

$14.0 < V\max < 32.0$; and $0.70 < $Fno$ < 1.70$.

19. The imaging optical lens assembly of claim 16, wherein the object-side surface of the fourth lens element has at least one critical point in an off-axis region thereof, a maximum effective radius of the object-side surface of the first lens element is Y11, a maximum effective radius of the image-side surface of the fourth lens element is Y42, a maximum value among maximum effective radii of all lens surfaces of the four lens elements of the imaging optical lens assembly is Ymax, a minimum value among maximum effective radii of all lens surfaces of the four lens elements of the imaging optical lens assembly is Ymin, and the following conditions are satisfied:

$1.0 < Y42/Y11 < 2.4$; and $1.0 < Y\max/Y\min < 2.5$.

20. The imaging optical lens assembly of claim 16, wherein the imaging optical lens assembly is operated within an infrared wavelength range of 750 nm to 1600 nm, an Abbe number of the first lens element is V1, an Abbe number of the second lens element is V2, an Abbe number of the third lens element is V3, an Abbe number of the fourth lens element is V4, an Abbe number of the i-th lens element is Vi, an Abbe number of the j-th lens element is Vj, and the following condition is satisfied:

$$0.55 < Vi/Vj < 1.80, \text{ wherein } i=1,2,3 \text{ or } 4; j=1,2,3 \text{ or } 4; \text{ and } i \neq j.$$

* * * * *